United States Patent [19]

Levy

[11] 4,218,760
[45] Aug. 19, 1980

[54] ELECTRONIC DICTIONARY WITH PLUG-IN MODULE INTELLIGENCE

[75] Inventor: Michael Levy, Plantation, Fla.

[73] Assignee: Lexicon, Miami, Fla.

[21] Appl. No.: 941,050

[22] Filed: Sep. 11, 1978

Related U.S. Application Data

[63] Continuation-in-part of Ser. No. 848,527, Nov. 3, 1977, Pat. No. 4,158,236, which is a continuation-in-part of Ser. No. 723,049, Sep. 13, 1976, abandoned.

[51] Int. Cl.² ............... G06F 15/02; G06F 15/38
[52] U.S. Cl. ..................... 364/900; 364/419; 35/35 R
[58] Field of Search ... 364/200 MS File, 900 MS File, 364/419, 706; 35/6, 8 R, 35 R, 9 B; 340/711, 782, 798; 400/109

[56] References Cited

U.S. PATENT DOCUMENTS

| | | | |
|---|---|---|---|
| 3,052,041 | 9/1962 | Luxton et al. | 35/9 |
| 3,271,743 | 9/1966 | Craft et al. | 364/900 |
| 3,312,946 | 4/1967 | Craft et al. | 364/900 |
| 3,388,380 | 6/1968 | Coffin et al. | 340/147 |
| 3,760,171 | 9/1973 | Wang et al. | 364/200 |
| 3,808,705 | 5/1974 | Schmoyer | 35/6 |
| 3,839,630 | 10/1974 | Olander et al. | 364/900 |
| 3,859,635 | 1/1975 | Watson et al. | 264/200 |
| 3,932,859 | 1/1976 | Krylakides et al. | 340/324 R |
| 3,938,099 | 2/1976 | Hyder | 364/900 |
| 3,940,758 | 2/1976 | Margolin | 340/365 R |
| 3,952,184 | 4/1976 | Bassard | 364/419 |
| 3,956,740 | 5/1976 | Jones et al. | 364/900 |
| 3,971,925 | 7/1976 | Wenninger et al. | 364/900 |
| 3,978,328 | 8/1976 | Fabry | 364/900 |
| 3,978,457 | 8/1976 | Check et al. | 364/200 |
| 4,005,388 | 1/1977 | Morley et al. | 364/200 |
| 4,007,443 | 2/1977 | Bromberg et al. | 364/200 |
| 4,012,725 | 3/1977 | Spangler et al. | 364/200 |
| 4,016,542 | 4/1977 | Azure et al. | 364/900 |
| 4,028,538 | 6/1977 | Olander et al. | 364/900 |
| 4,041,467 | 8/1977 | Cota et al. | 364/900 |
| 4,063,221 | 12/1977 | Watson et al. | 364/900 |
| 4,072,930 | 2/1978 | Lucero et al. | 340/152 T |
| 4,075,679 | 2/1978 | Christopher et al. | 364/200 |
| 4,091,446 | 5/1978 | Demonte et al. | 364/200 |
| 4,117,542 | 9/1978 | Klausner et al. | 364/900 |
| 4,130,882 | 12/1978 | Swanstrom et al. | 364/900 |
| 4,159,536 | 6/1979 | Kehoe et al. | 364/900 |

FOREIGN PATENT DOCUMENTS

| | | | |
|---|---|---|---|
| 1018330 | 1/1966 | United Kingdom . | |
| 1057946 | 2/1967 | United Kingdom . | |
| 1062999 | 3/1967 | United Kingdom . | |
| 1071726 | 6/1967 | United Kingdom . | |
| 1153067 | 5/1969 | United Kingdom . | |
| 1199022 | 7/1970 | United Kingdom . | |
| 1423281 | 2/1976 | United Kingdom . | |
| 1448211 | 9/1976 | United Kingdom | 364/900 |
| 1492376 | 11/1977 | United Kingdom . | |

*Primary Examiner*—Mark E. Nusbaum
*Attorney, Agent, or Firm*—Cushman, Darby & Cushman

[57] ABSTRACT

A portable electronic dictionary in a hand-held housing which mounts a plurality of alpha-numeric displays and a keyboard. A plug-in module contains a microcomputer and a ROM which stores a plurality of pairs of sequences of alpha-numeric characters and is searched by a central processing unit in the microcomputer under instructions stored as firmware in another ROM forming part of the microcomputer. One sequence of each stored pair is compared with a sequence which is entered into the keyboard and stored in a RAM also forming part of the microcomputer until a match is found. After one or more sequences have been entered into the keyboard and locations of matching pairs are stored in the microcomputer RAM, the pairs of stored sequences can be rolled across the display. Either sequence of each pair can be compared with a sequence entered into the keyboard.

12 Claims, 17 Drawing Figures

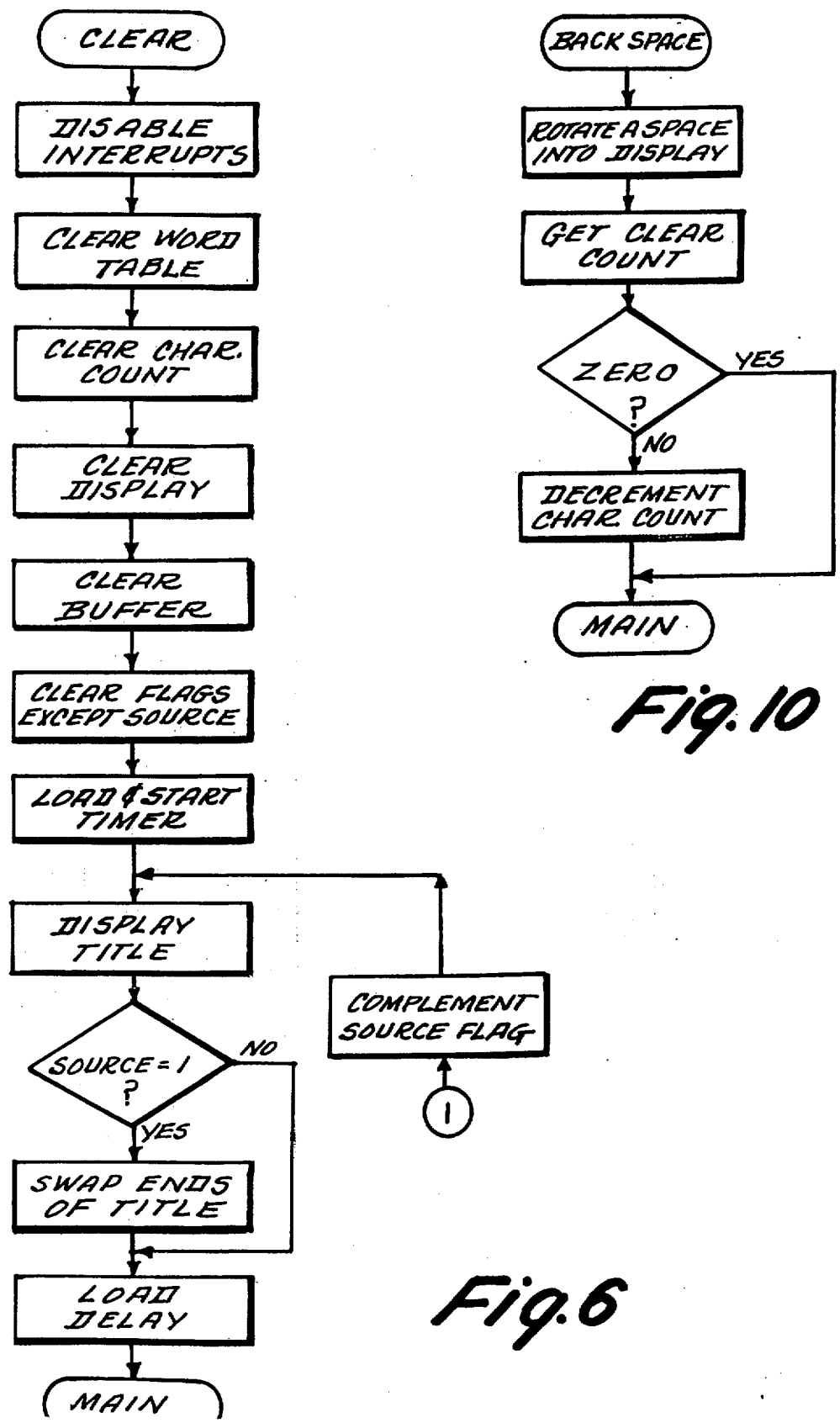

ELECTRONIC DICTIONARY WITH PLUG-IN MODULE INTELLIGENCE

BRIEF DESCRIPTION OF THE BACKGROUND AND SUMMARY OF THE INVENTION:

The present invention is a continuation-in-part of Ser. No. 848,527, filed Nov. 3, 1977, now /issued as U.S. Pat. No. 4,158,236, which in turn is a Continuation-In-Part of Ser. No. 723,049, filed Sept. 13, 1976, now abandoned. The contents of application Ser. No. 848,527 are incorporated herein by reference.

The invention relates to a portable, self-contained information storage apparatus into which a sequence of alpha-numerical characters can be entered via a keyboard and an associated stored sequence of characters displayed, e.g., defining a foreign language translation of an entered word.

The discovery that information can be stored external to the brain and retrieved when desired is one of the fundamental bases on which civilization rests. In general, the storage of information is accomplished by causing physical, chemical or electrical changes in different parts or portions of some object or material. The locations (i.e., addresses) of the changes are maintained separately to permit retrieval of the stored information, the efficiency and reliability of the storage and retrieval determining the effectiveness of the storage mechanism.

Printed dictionaries, phone books and the like are basic types of information storage devices which have been in use for centuries and which will continue to be useful. However, for many situations, information from such printed records cannot be retrieved either quickly or efficiently. Whenever a number of associated sets of information are to be sequentially retrieved, use of a printed dictionary, phone book or the like is a time-consuming and tiresome task. One activity where this is particularly true is in locating translations of words for use in either learning a foreign language or in immediately communicating in that language, defining terms unique to some technical subject or specialty, and the like. In learning a language, frequent interruptions of reading to look up definitions of foreign words not only increases the time required to complete the reading, but interrupts the concentration which is needed to efficiently learn the foreign language. To locate in a printed book a translation for immediate oral communication is often difficult because of poor light, distractions such as noises and vibrations, etc. Even when located, pronunciation may be difficult and the book difficult to show to a foreigner. Making word combinations requires looking up several entries and somehow putting the entries together.

Of course, many inventors have sought in the past to provide more efficient information retrieval and such devices are well known in the digital computer art. For example, U.S. Pat. Nos. to Ooba et al 3,612,676, Philipp, 3,457,010, Ashley, 3,414,985, Papayannopoulos, 3,302,513, and Rocca, 2,690,697, all disclose devices in which strips of microfilm having a plurality of discrete regions each with a word definition reduced in size are indexed to a given location and the discrete region at that location displayed. Operating a keyboard to form a certain sequential combination of letters defining a word causes either the filmstrip or microfilm to be moved in line with the light source to be moved to project light through a given part of the microfilm. These devices are inherently bulky, complex and expensive because of the need for mechanisms to locate and project an image through the correct portion of the film, and thus are not suitable for most uses.

Computers of all sizes are of course information storage and retrieval devices. In recent years, microelectronic elements have been perfected which permit computers to be packaged in portable units which have internal storage and programs. Hand-held calculators are one type of such portable units, and many varieties of hand-held calculators, some with programmable memories, are available. For example, U.S. Pat. Nos. 3,859,635 to Watson et al, and 4,012,725 to Spangler et al describe two complex microelectronic calculators.

The U.S. Pat. to Kyriakides et al, No. 3,932,859, describes an electronic dictionary which is designed to be a portable, hand-held unit with plug-in memory modules which can be accessed by the keyboard. A display is provided on the hand-held unit for displaying a retrieved definition. According to the disclosed embodiment of the Kyriakides et al patent, a counter provides an output indicating the number of characters which have been entered to form a given word. After all the characters forming the chosen word have been manually entered into the keyboard, a definition key on the keyboard is operated which in turn enables a clock which provides a pulse train which is applied to the counter to provide an output indicating the stored count. The output of the counter and a storage indicating which characters have been entered are then applied to decoder logic whch forms an address for a definition which is then retrieved and conventionally displayed.

U.S. Pat. No. 3,978,328 to Fabry et al describes a pocket calculator consisting of a main frame and a set of plug-in processor modules. The main frame consists of a keyboard and display. Each module consists of an arithmetic chip mount on a circuit board having an edge connector for connection with the main frame.

The present invention relates to an electronic information storage apparatus which superficially resembles a hand-held calculator of the type generally described above and widely available. However, the present invention differs from such conventional calculators in that it includes unique structure which provides for efficient and rapid retrieval of information which is stored in a plug-in module which can be readily changed to change the stored information. The plug-in module also contains the intelligence for the unit.

The present invention is not a general purpose computer which is programmed by software, but rather a combination of elements, preferably microelectronic elements, which carry out certain instructions permanently stored in a memory as firmware while the functions are carried out. The unit is designed to provide a multiplicity of desirable functions from a combination of elements which can be assembled and sold relatively inexpensively, and which operate with a high degree of reliability. The present invention has capabilities and structure which are quite different from anything found in conventional hand-held calculators or similar devices.

The present invention finds particular utility as an electronic dictionary in which pairs of "source" words and "translation" words are stored as entries in a read-/only memory (ROM) contained in a plug-in module. Thus, one sequence of each pair might be an English word and the other sequence a translation of that word in Spanish so that the electronic dictionary with that plug-in module operates as an English/Spanish or Spanish/English dictionary. Through proper manipulation of keys on a keyboard of the hand-held unit, a word entered in the keyboard can be displayed on a plurality of conventional displays and compared with either the source word or the translation word of each of the respective pairs until a match is found. Upon an appropriate command, produced by manual operation of one or more keys, both the source and translation of the match can be displayed.

The present invention further includes within the plug-in module a central processing unit, a read/write memory, preferably a random access memory, and a second read/only memory (ROM) which stores instructions for carrying out searches of the memory in the first ROM and searches of the keyboard for entered alpha-numeric characters, as well as controlling the display. These elements are preferably formed on a single microcomputer semiconductor chip to provide a simple and unique combination. The fact that the plug-in module contains the unit intelligence greatly increases the versatility of the device by permitting a change in the contents of the second read/only memory, and, therefore, the function of the unit, generally.

The ability of the present invention to translate phrases further increases its utility. As many as eight words of a source language may be entered at one time. As each word is entered a search is conducted for its match in the plug-in ROM. After the last search, upon an appropriate command, first all of the source words followed by all the translations of the source words are displayed.

In any information retrieval device, it is desirable to have the flexibility to display varying numbers of words of variable length so that each definition, e.g., is not constrained to a small number of characters. At the same time, it is desirable in the present invention to make the device as small and compact as possible. This latter desire can be best carried out by limiting the number of display units, each in which displays a single character. In the present invention it is desirable to limit the number of displays to 16.

The present invention resolves this apparent conflict between the desire for a small number of individual display units and the need for flexibility in order to display, when necessary, a number of characters in excess of the number of displays. This is accomplished by varying in time the display of individual characters of the sequence pair after the matches are found. More particularly, according to the present invention, the individual characters comprising first all of the source words followed by all of the translation words to be displayed are sequentially advanced, e.g., rolled across the display. This is accomplished by storing each of the characters currently being displayed and storing in a set of locations in the RAM forming part of the microcomputer the locations in the plug-in ROM where pairs of source and translation words to be displayed are found.

In order to provide maximum flexibility in the present invention, either sequence of the pair of sequences comprising each entry in the plug-in ROM can be the word which is compared with an alpha-numeric sequence entered in the keyboard. Thus, in an English/Spanish dictionary, an English word can be entered, and compared with one sequence of each pair. By operation of one of the manual keys, the other words of each pair can alternatively be searched. In this latter case a Spanish word can be entered and its English "translation" found. Both sequences of each pair of sequences found to match are preferably displayed upon operation of a definition key.

The unique apparatus of the present invention can be operated in any of a number of modes according to instructions which are stored as firmware in the second read/only memory (ROM) forming part of the microcomputer. In addition to the search routine described above, in which source words are entered in the keyboard, compared with one of a plurality of pairs of sequences in the plug-in ROM to ascertain if a match exists, with that matching pair then being displayed, the device can operate in a QUERY mode in order to check the spelling of a word or to retrieve all of the stored words or phrases which include certain combinations of words or letters. As much of the word or phrase as desired can be entered. When the query key is depressed, the ROM module is then searched with all combinations having the entered letters being sequentially displayed.

Many other objects and purposes of the invention will be clear from the following detailed description of the drawings.

BRIEF DESCRIPTION OF THE DRAWINGS:

FIG. 6 shows a flow diagram of the CLEAR subroutine;

FIG. 10 shows a flow diagram of the BACKSPACE subroutine;

DETAILED DESCRIPTION OF THE DRAWINGS:

I. HARDWARE DESCRIPTION

Figure 1:
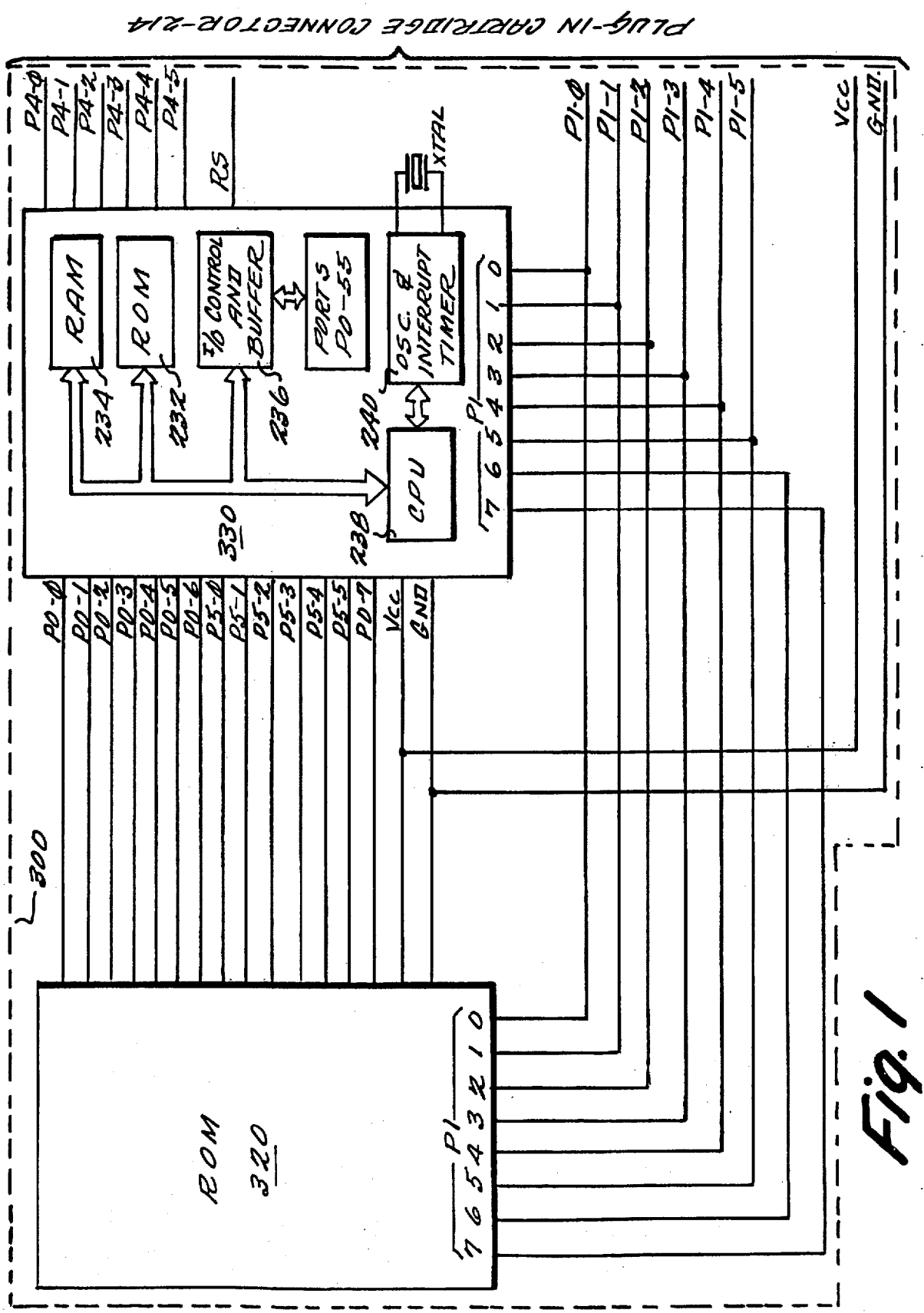
FIG. 1 shows a schematic view of the circuitry within the plug-in module of the invention.
Figure 4:
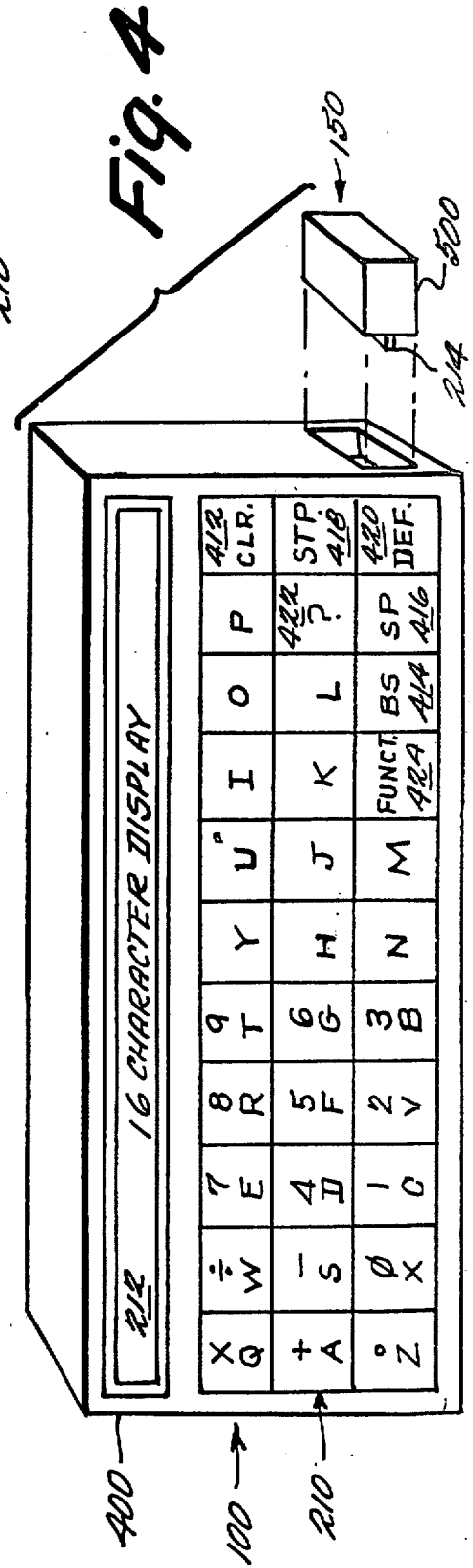
FIG. 4 shows a schematic view of the hand-held housing and plug-in module.

The preferred embodiment consists of keyboard-display unit 100 having circuitry 200 within housing 400 and plug-in module 150 having circuitry 300 within housing 500 (illustrated in FIGS. 1 and 4). Keyboard-display circuitry 200 provides for the entry of data and the display of entered and retrieved information. The circuitry consists of 33 position keyboard 210 organized mechanically in a three by eleven key format, 16 character, 16 segment per character alpha-numeric LED displays 212 and circuitry which provides for character generation, LED segment drive, LED character drive, keyboard interface, and power-on reset generation. Unit 100 also includes low-insertion force edge connector 214 for interface with plug-in module 150. Keyboard-display circuitry 200 has no intelligence and acts strictly as an input-output device for plug-in cartridge 500.

Plug-in module 150 interfaces with keyboard-display circuit 100 and provides total system function and intelligence. Plug-in module 150 consists of plastic housing 500, crystal 310, read-only memory 320 and microcomputer 330.

Microcomputer 330, as illustrated in FIG. 1, provides system intelligence through an internally stored firmware program which monitors keyboard inputs, updates and controls the display, performs calculations, searches for and finds entered words and corresponding translations in memory, and scrolls entered and translated word sequences through the display. The program instructions are stored in an on-chip read/only memory (ROM) as firmware; physical changes occur at unique physical locations which result in the structure having certain functions. While any suitable commercially available microcomputer chip may be used, the MOSTEK Model MK3870 single chip microcomputer is utilized in the preferred embodiment.

The chip conventionally contains 2048×8 bit program memory (ROM) 232, 64×8 bit random access data memory (RAM) 234 which serves as a read/write memory, 32 Input/Output lines fed by I/O control and Buffer logic 236 and an 8 bit central processing unit (CPU) 238, in addition to oscillator and timer 240. Microcomputer 330 is capable of carrying out a conventional set of instructions; for example, see the preliminary report entitled, "Single-Chip Microcomputer MK3870" by Mostek. The contents of this article are incorporated herein by reference. These instructions are well-known and not detailed herein, but can be easily assembled to carry out the desired functions, e.g., as detailed in FIGS. 5–13b. Use of these instructions in the firmware program stored in the on-chip program storage ROM 232 allows microcomputer 330 to serve as a controller for the electronic dictionary.

The 64 word read/write memory (RAM) 234 in microcomputer chip 330 serves as a memory for the various pointers to be described below and miscellaneous temporary storage required by the program. Timer 240 interrupts central processor (CPU) 238 approximately every millisecond at which time the display scrolling function is incremented and the next keyboard row is scanned (approximately four times a second). Oscillator and interrupt timer 240 interfere with external 4 megahertz crystal 310 to control the internal clock of microcomputer 330.

Central processor unit (CPU) 238 performs all instructions stored in the program memory, manipulating and storing data and controlling Input/Output transfers. The Input/Output (I/O) logic 236 buffers data and controls signals entering and leaving microcomputer 330. The I/O signals are as follows:

| Designation | Function |
| --- | --- |
| GND | Circuit ground potential. |
| Vcc | + 5V supply voltage. |
| P0-0-P0-7 (port 0) | 8-bit bidirectional port. |
| P1-0-P1-7 (port 1) | 8-bit bidirectional port. |
| P4-0-P4-7 (port 4) | 8-bit bidirectional port. |
| P5-0-P5-7 (port 5) | 8-bit bidirectional port. |

-continued

| Designation | Function |
| --- | --- |
| RS | Input which is used to initialize a processor. |
| X1 | One side of crystal input for internal oscillator 240. |
| X2 | Other side of crystal input. |

The read/only memory (ROM) 320 stores the translation or dictionary table which microcomputer 330 searches for a matching entry. Each entry is a pair of alpha-numeric sequences, the first sequence always being called hereinafter the source and the second always being called hereinafter the translation. Both sequences can be displayed following a match as described below. Microcomputer 330 may search either the source sequences or the translation sequences upon an appropriate command, for a match to the entered sequence. In the preferred embodiment, the sequences being searched appear first followed by the other sequences. The source sequences that begin with the same letter, together with the other sequences of the pairs are grouped in adjacent locations in ROM 320.

In the preferred embodiment, ROM 320 is the MK 36000 by Mostek, a 65,536 bit read/only memory organized as 8,192×8 bits. Any other ROM organized in a manner compatible with the particular microcomputer 330 and containing sufficient memory for the particular purpose may be used.

Plug-in module 150 including circuitry 300 and housing 500 is a small assembly which is easily plugged into and removed from hand-held housing 400 by means of connector 214 without the use of tools. The plug-in modules are made easily replaceable since it is contemplated that the unit can be changed from one pair of languages or type of dictionary to another by simply changing the plug-in module, e.g., from English/Spanish to German/Italian. Thus, each language or dictionary table may require a unique plug-in module.

As illustrated in FIG. 1 address lines P0-0–P0-6 and P5-0–P5-5 select one of the locations of ROM 320. Line P0-7 enables ROM 320 so that the contents of the location selected on the address lines will appear on lines P1-0–P1-7 to be read by microcomputer 330.

Figure 2:
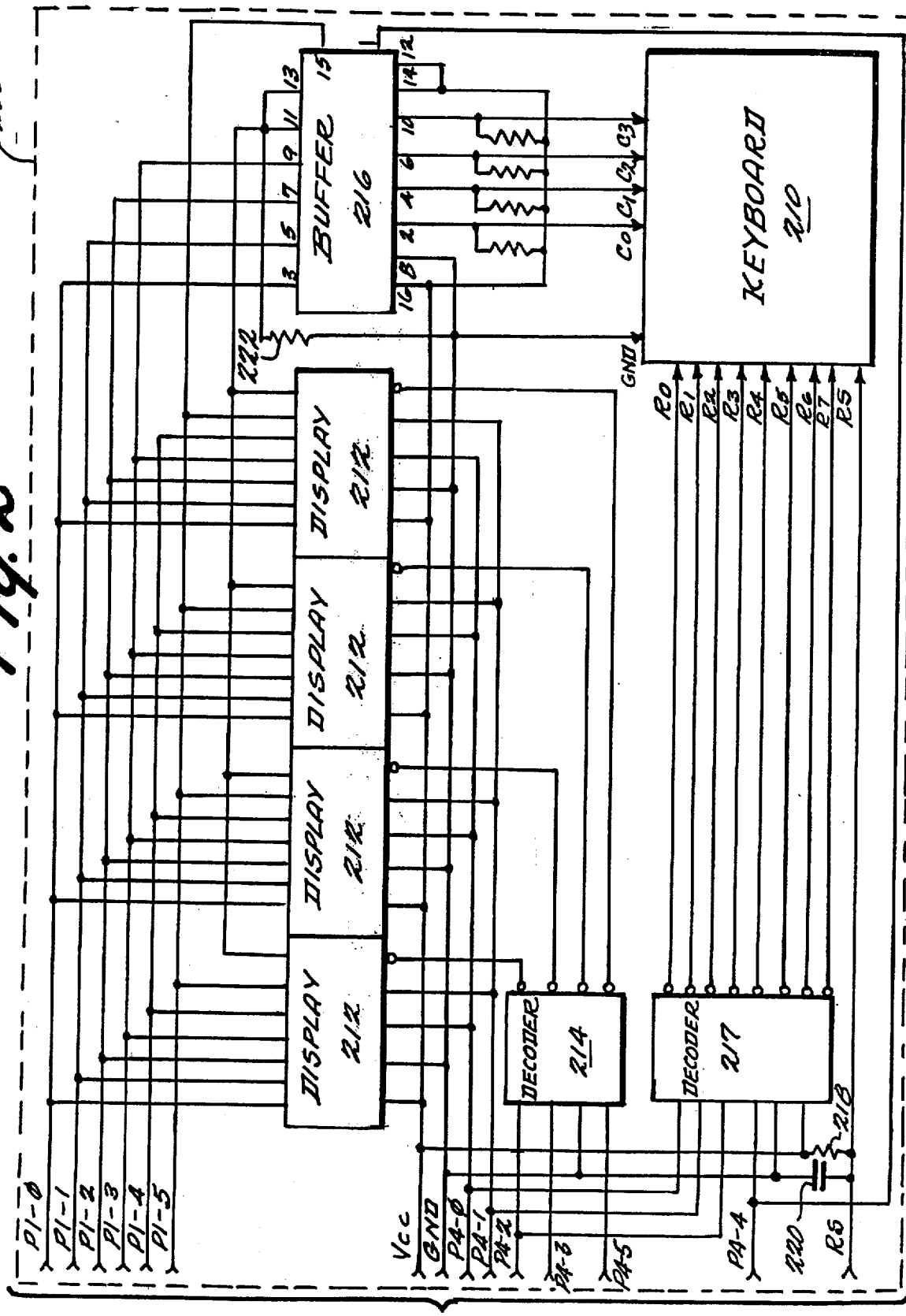
FIG. 2 shows a schematic view of the circuitry within the hand-held housing.

Keyboard-display circuitry 200 detailed in FIG. 2 consists of decoders 214 and 217, 16 character, 16 segment alpha-numeric LED displays 212, 33 position keyboard 210, buffer 216, and startup circuitry consisting of resistor 218 and capacitor 220. The RS signal is generated by the RC startup circuit, resistor 218 and capacitor 220, or by depression of clear key 412 of keyboard 210 in FIG. 4. Upon initial energization, capacitor 220 shorts the RS line to ground for a period sufficient to cause the resetting of microcomputer 330. As detailed below, the reset signal on the RS line prepares microcomputer 330 for operation and causes the entry of a given message identifying the contents of plug-in module 150, e.g., English/French, in displays 212.

The signals on lines P1-0–P1-5, P4-0–P4-5 and RS are transferred through connector 214 between module circuitry 300 and display-keyboard circuitry 200.

Circuitry 200 is entirely controlled by microcomputer 330.

Lines P1-0–P1-5 carry the ASC II equivalent of the character to be written in displays 212 from microcomputer 330 in order to update the displayed characters.

Displays 212 may be any alpha-numeric displays well known in the art, but in the preferred embodiment, are the 4 character by 16 segment LED displays model DL-1414 manufactured by Litronix. These preferred displays have a built-in memory for storing the characters currently being displayed, a built-in character generator from the ASC II code, and built-in multiplex and LED drive circuitry. Obviously, these functions can be performed by external components within the scope of this invention.

The signal on line P1-5 is also inverted in buffer 216 and applied to the display. Buffer 216 may be any hex buffer with at least one buffer enabled by one line and at least four buffers enabled by a second line, but in the preferred embodiment is the CMOS hex buffer Model MM80C97 manufactured by National Semiconductor. This particular chip is a tri-state chip in that the outputs may be made to appear open to the remainder of the circuit. When line P1-5 becomes high, the buffers connected between pins 12 and 13 and between pins 14 and 11 are disabled, so that as a result of resistor 222 connecting terminals 11 and 13 to ground, terminals 11 and 13 appear to be grounded. When P1-5 becomes low, the buffers connecting pin 12 to pin 13 and pin 14 to pin 11 become active, and since pins 12 and 14 are connected to Vcc, the signal on pins 11 and 13 become high. Thus, the voltage on pins 11 and 13 represents the inverted signal on line P1-5.

Lines P4-4 and P4-5 select which of ROM 320, displays 212 and keyboard 210 communicates with microcomputer 330. If the signals on both P4-4 and P4-5 are high, ROM 320 may supply data to microcomputer 330. If the signal on line P4-5 is low, microcomputer 330 supplies data on lines P1-0–P1-5 to the displays 212. If the signal on line P4-4 is low, buffer 216 is enabled, and microcomputer 330 accepts data on lines P1-0–P1-5 from the keyboard.

Decoders 214 and 217 control this selection process. These may be any BCD to decimal decoders, but in the preferred embodiment are the model MM74C42N CMOS 4 bit BCD to 10 bit decimal decoder manufactured by National Semiconductor. When the signal on line P4-5 is high, the utilized outputs of decoder 214 are high, thus prohibiting the transfer of new data to displays 212. When the signals on line P4-4 is high, the utilized outputs of decoder 216 are high.

The selection of the particular display of the four display chips 212 also takes place within decoder 214. Each of the four possible signal level combinations on lines P4-2 and P4-3 enable the the signal on one of the four output lines of decoder 214 to become low, thus enabling the display chip 212 to which it is attached. The signal on lines P4-0 and P4-1 are applied to each of the four display chips 212 and select which character within each display is selected.

The 16 characters which are displayed at any one time are stored in a read/write memory in each of display chips 212. Since refresh and character generation functions are accomplished by each display chip 212 internal circuitry, microcomputer 330 need only write new information into display chips 212 when the 16 display characters require modification.

The keys on keyboard 210 are selected for interrogation through a row-column technique. The particular row to be interrogated (R0-R7) is selected by the output of decoder 217. For any particular combination of high and low signals on lines P4-0-P4-2, one of the eight utilized output lines of decoder 217 becomes low, thus selecting the particular row to it is attached. As stated above, this row selection takes place upon the occurrence of a low signal on line P4-4. Keyboard columns C0-C3 are transferred through buffer 216 back to microcomputer 330 on lines P1-0 - P1-3. Buffer 216 is also enabled by a low signal on line P4-4.

Figure 3:
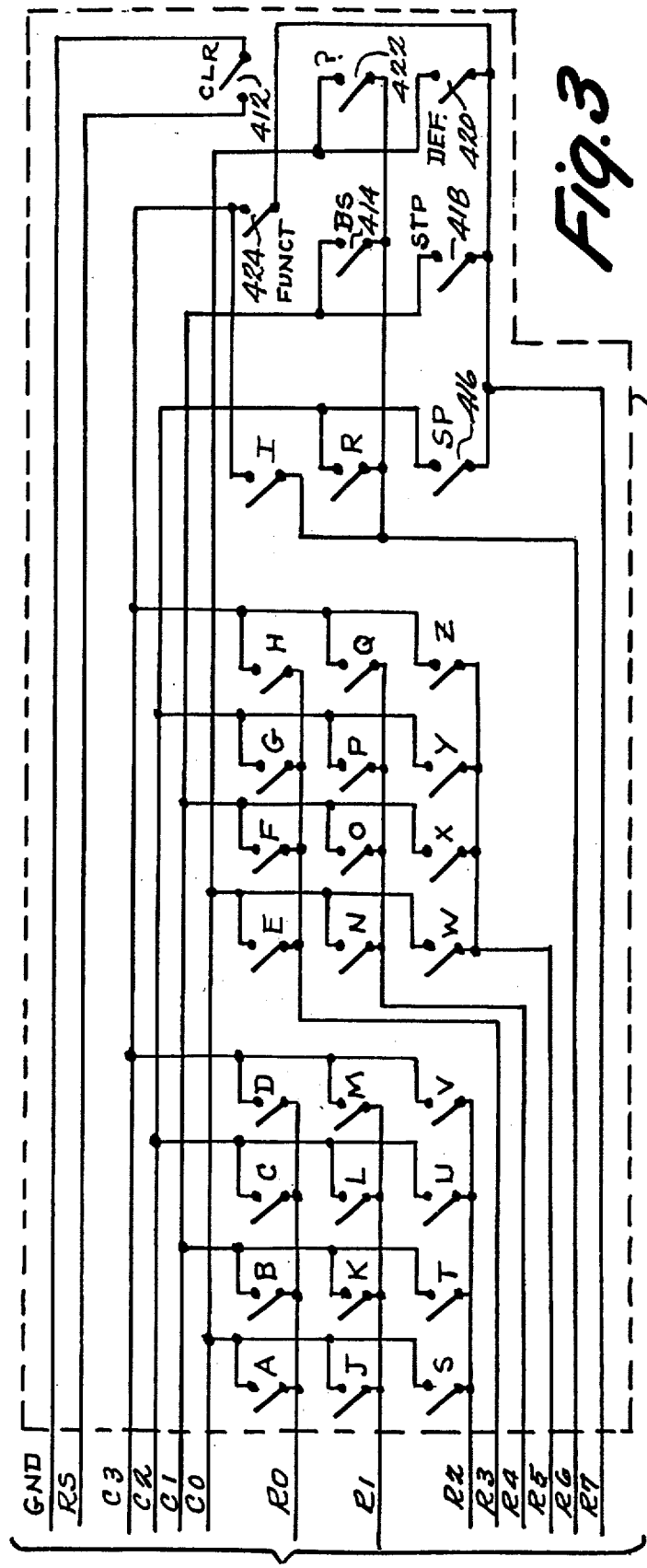
FIG. 3 shows a schematic view of the electrical arrangement of the keyboard.

As is illustrated in FIG. 3, keyboard 210 is arranged electrically as a 8×4 array with CLEAR key 412 separately generating the RS signal. Sequences of alpha-numeric characters and commands can be entered into the keyboard by sequential key manipulation. A signal is applied from microcomputer 330 on lines P4-0 - P4-2 to select each row in keyboard 210 in turn. If a key in that row is depressed while the row is selected, the signal will be fed back through buffer 216 on one of lines P1-0 - P1-3 to microcomputer 330 for storage in RAM 234.

II. DESCRIPTION OF GENERAL OPERATION

The firmware for the microcomputer system is a code pattern stored in microcomputer 330 program memory ROM 232 which provides for the intelligence of the unit, such as keyboard handling, display update and control, word translation search, and calculation. The firmware can be divided into three main categories: the interrupt service, the main line program, and the code or translation tables.

As mentioned above, the translation table is stored in ROM 320. Each entry in the table is comprised of a pair of alpha-numeric sequences: the first sequence referred to as the source e.g., an English word, and the second sequence referred to as the translation. Each ROM 320 entry may represent either a word or a phrase. The entries having a source beginning with the same letter are grouped adjacently within ROM 320. Each sequence of alpha-numeric characters is followed by a word mark, i.e., both between sequences of one entry and between entries. The end of the translation table is followed by at least two word marks.

To look up a source word or phrase, microcomputer 330 sequentially checks each of the words starting with the particular letter. A table in on-chip ROM 232 stores the ROM 320 tanslation table locations whereat entries with sources having a particular first letter begin. Thus, the first character of the entered word is compared to the on-chip ROM 232 table to determine the location in the ROM 320 translation table where source words or phrases beginning with that character first appear. The second character of the entered word is compared to the second character of the first source having the particular first letter. If there is a match, then the next character is checked, etc. If all the characters match, then the ROM 232 translation table location of the source is retrieved and stored within RAM 234 for later accessing. If a character does not match, then microcomputer 330 checks the first character of the next source and continues until a complete match is found or the table is exhausted. If no match is found after the entire table is search, "NOT FOUND" is displayed.

One important feature of the present invention is that the dictionary may be reversed, i.e., a foreign word may be typed in, the device will search for that word in the second half or translation of each pair of sequences and if a match is found, the "source" will be displayed. To look up a word when the dictionary is reversed, the system checks each of the bytes of each of the words stored entries in sequence. The first character of the entered word is compared to the first character of the stored translation. If there is a match, then the second character is checked, etc. If all the characters match, then the ROM 232 translation table location of the entry is retrieved and stored in RAM 234 for later accessing. If a character does not match, then the microcomputer 330 checks the first character of the next translation and continues until a complete match is found or the table is exhausted. If no match is found after the entire table is searched a "NOT FOUND" message is displayed.

An internal interrupt service controlled by oscillator and internal timer 240 and crystal 310 interrupts microcmputer 330 approximately once every millisecond. At that time, a counter controlling the scrolling feature of the display is decremented and a row of the keyboard is scanned in order to detect the depression of a key in that row.

The keyboard is entirely controlled by the firmware program as described above. Each entered key is debounced, translated from a row and column representation into an internal code set and then made available to the main line program.

The main line program, permanently stored as firmware in ROM 232, performs the intelligent functions of the system. This program selects the current function, based on the last entered function key, accepts data keys, places data into the display, performs word translation, and scrolls the display. FIG. 4 illustrates suitable arrangement of the alpha-numeric and command keys.

Microcomputer 330 is reset by turning on the device or depressing clear key 412. Upon reset, the display, all pointers, all keyboard storage and all flags are cleared. The interrupt timer is started and the title of the module is displayed. Depression of backspace key 414 immediately after reset, reverses the half of the pairs of sequences in ROM 320 which will be searched. This reversal is indicated on the display by a reversal of the title halves. For example, if the display initially reads, "English/Spanish" and backspace key 414 is depressed, the display will read "Spanish/English."

When data is being entered into the device, the user may either enter additional data into the display, terminate the word being entered, or select a different mode of operation. Data is entered into the display by indexing the desired keys. The displayed characters will shift one position to the left and the indexed character is inserted on the right. When backspace key 414 of FIG. 4 is entered, the displayed characters are shifted one position to the right, and the right-most character is lost. When space key 416 is operated, a space is entered on the display. When step key 418 is depressed, the displayed word is terminated, and will then be searched for in the ROM 320 translation table. If it is not found, the words "NOT FOUND" will be displayed; otherwise, the ROM 320 location of the match will be stored in the ROM address storage area or word table of RAM 234, and the address storage index in RAM 234 will be incremented The word count points to a location in the RAM 234 word table where either the ROM 320 address of the word curently being retrieved is stored, or the ROM 320 address of the next match will be stored. When definition key 420 is entered, the words previously entered are displayed, followed by their translations in a scrolling fashion. If a word has been entered into the display, it will be processed in a manner similar to if step key 418 had been depressed prior depression of definition key 420.

After definition key 420 has been depressed, depression of step key 418 steps the entries and matched translations, in that order, through the display a word or phrase a time.

Depression of function key 424 produces a promotional message on the display. Depression of query key 422 opens the dictionary to words or phrases beginning with the displayed entry. Step key 418 may then be depressed to increment the dictionary to the next pair of alpha-numeric sequences having a source beginning with the displayed entry. A second depression of query key 422 causes the translation of the displayed single word or a phrase.

If the dictionary search is extensive, "SEARCHING" is displayed. When no entry is made in the device for about 30 seconds, a row of decimal points are displayed across displays 212 in order to converse power. Any entry made after the decimal points appear will recall to the display, entries made after the last depression of step key 418.

In operation, upon turning on the device, the title of the module is displayed. Depression of backspace key 41 will cause the dictionary to be reversed. For example, if upon turning on the device "English/Spanish" is displayed, English words may be entered and the equivalent Spanish words will be displayed. Depression of the backspace key 414 will cause "Spanish/English" to appear in the display. Spanish words may then be entered and their English equivalents will be displayed.

In order to correct an entry, backspace key 414 may be depressed until the error is removed from the right side of the display. The proper entry may then be typed.

The entire word or phrase to be translated need not be entered in its entirety. For example, the first few letters of the first word may be entered. Depression of query key 422 opens the dictionary to words or phrases beginning with those few letters. Depression of step key 418 displays the next word in ROM 320 which begins with the same letters. Further depression of step key 418 produces the succeeding entries in ROM 320 which begin with the same letters. A second depression of query key 422 causes the displayed word or phrase to be translated. If the translation is not found, "NOT FOUND" is displayed after the search.

As indicated above, phrases not stored as a single ROM 320 data table entry may be translated. After entry of a word or phrase, step key 418 is depressed, causing that particular word or phrase to be searched. If a match is found, the TOM 320 location of the match in is stored in the word table of RAM 234. The next word or phrase is then entered and the step key is again depressed causing this word or phrase to be searched.

The query function may also be utilized in this translation process. The first few letters of a word may be entered, after which query key 422 may be depressed. Step key 418 may then be depressed until the desired word appears in the display. The next word in the phrase to be translated may then be entered.

After the last word in the phrase is entered, definition key 420 is depressed, causing the entire entered phrase and its translation to scroll through to the display. That is, the display will be constantly moving, similar to a theatre marquee, with the entire source and then the entire translation entering from the right and exiting from the left. Definition key 420 may again be depressed in order to scroll the source sentence and its translation through the display. Depression of step key 418 will cause one word at a time from first the source and then the translation to shift into the display as the previous contents are shifted out.

III. FIRMWARE DESCRIPTION

Figure 5:
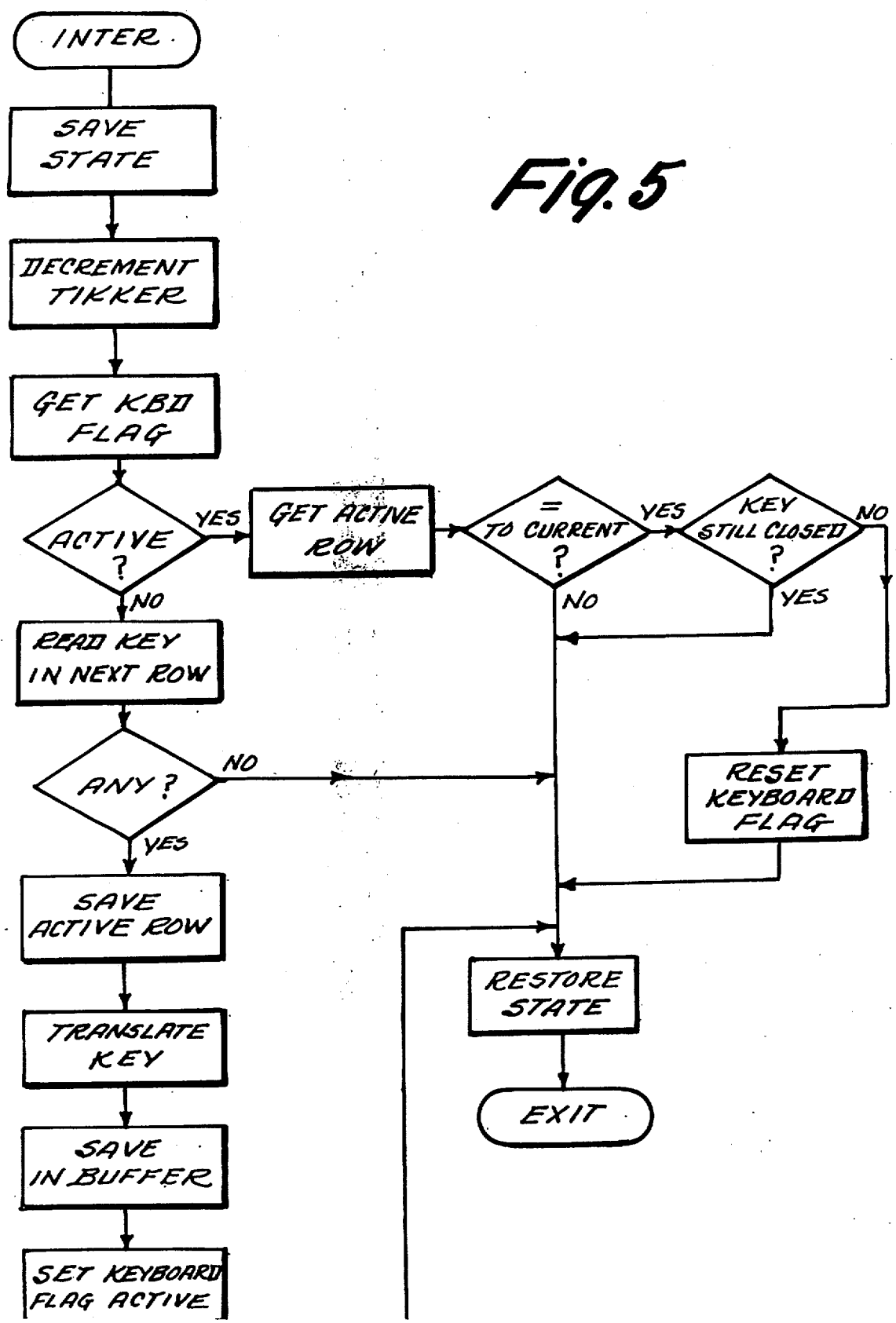
FIG. 5 shows a flow diagram of the INTERRUPT subroutine.

FIGS. 5 through 13b represent the steps that microcomputer 330 takes to carry out the functions of the electronic dictionary. FIG. 5 represent the INTERRUPT subroutine that controls the scrolling mode and services the keyboard. Upon the occurrence of an interrupt signal from oscillator and interrupt timer 240 (which occurs approximately once every millisecond) the INTERRUPT subroutine is entered. The current state of microcomputer 330 is saved so that microcomputer 330 may go back to what it had been doing before the interrupt. A location in RAM 234 of microcomputer 330 called "tikker" stores a count. This count is decremented with each interrupt. As will become clear below, this count called "tikker" controls the scrolling and the display power saving functions.

After tikker is decremented, the keyboard flag is retrieved from the appropriate location in RAM 234. The keyboard flag indicates whether a key was detected as being held down during any one of the last eight INTERRUPT subroutines. If the keyboard flag does not indicate that the keyboard is active, the keys are read in the row next to the row that was most recently read. CPU 238 then determines whether any of the keys in that row are depressed. If none of the keys are depressed, the state of microcomputer 330 is restored and the INTERRUPT subroutine is left.

If a key is depressed, the row in which the key is located is stored in a location in RAM 234, and the particular key is translated by means of the row and column lines indicated as active. This particular key is saved in a location in RAM 234 called "buffer". The keyboard flag is also set active, the state of microcomputer 330 is restored and the INTERRUPT subroutine ends.

If the keyboard flag was active, the active row is retrieved from RAM 234. CPU 238 then determines whether the row about to be read is indeed the row that was previously active. Obviously, this will not occur until the seven rows after the active row have been read. Thus, the row which was active will not be the row presently being read until eight INTERRUPT routines after the particular row was determined as being active. If the current row being considered is not the row that was previously active, the state of microcomputer 330 is restored and the INTERRUPT subroutine ends.

If the row being considered is the row that was previously active, microcomputer 330 determines whether the key that was stored in "buffer" is still depressed. If it is, the state of microcomputer 330 is restored and the INTERRUPT subroutine is exited. If the key is still depressed, it would be improper to enter that same character again (or any other character) so that two characters would be displayed. If the key has been released, the keyboard flag is reset to indicate the key has been released and the keyboard is inactive, the state of microcomputer 330 is restored and the INTERRUPT subroutine is exited.

FIG. 6 represents the CLEAR subroutine which is entered whenever microcomputer 330 is reset. This happens whenever clear switch 412 is depressed or whenever the unit is turned on. Upon entry into the CLEAR subroutine, the interrupt service is disabled. The RAM 234 word table wherein ROM 320 locations of matches are stored is cleared. The location in RAM 234 that stores the number of characters currently being displayed, i.e., the character count, the display and the buffer, which stores keyboard entries, are cleared. Furthermore, all of the flags to be discussed below are cleared, except the source flag which indicates which half of each pair of sequences is to be searched. For example, with the English/Spanish plug-in module, if one has reversed the dictionary so that Spanish words are being searched, it has been found undesirable that this should revert back so that English is being searched upon depression of the clear key. Thus, the source flag is not reversed.

Next, oscillator and interrupt timer 240 is loaded and started so that the first interrupt will occur approximately one millisecond therefrom. The title of the particular plug-in module is then displayed. As indicated above, the source flag determines which of the pair of alpha-numeric sequences is searched. If the source flag is "0", the first portion of each pair of sequences is searched, but if the source flag is "1" the second half of each pair of sequences is searched. If CPU 238 determines that the source flag is equal to "1", the two portions of the title are reversed. That is, if the title is "English/Spanish", the portions of the title are swapped so that the display reads "Spanish/English". If the source flag is not "1", obviously the portions of the title are not reversed.

As mentioned above, if an entry is not made in approximately 30 seconds, a series of decimal points appear across the display. The time at which this occurs is controlled by a location in RAM 234 storing a count called "delay". At this point in the CLEAR subroutine, the delay counter is loaded. As will be described below, at particular instances, the counter is decremented. When the delay counter is decremented to "0", the display is cleared and the decimal points appear. After delay is loaded, microcomputer 330 returns to the MAIN subroutine.

Figure 7A:
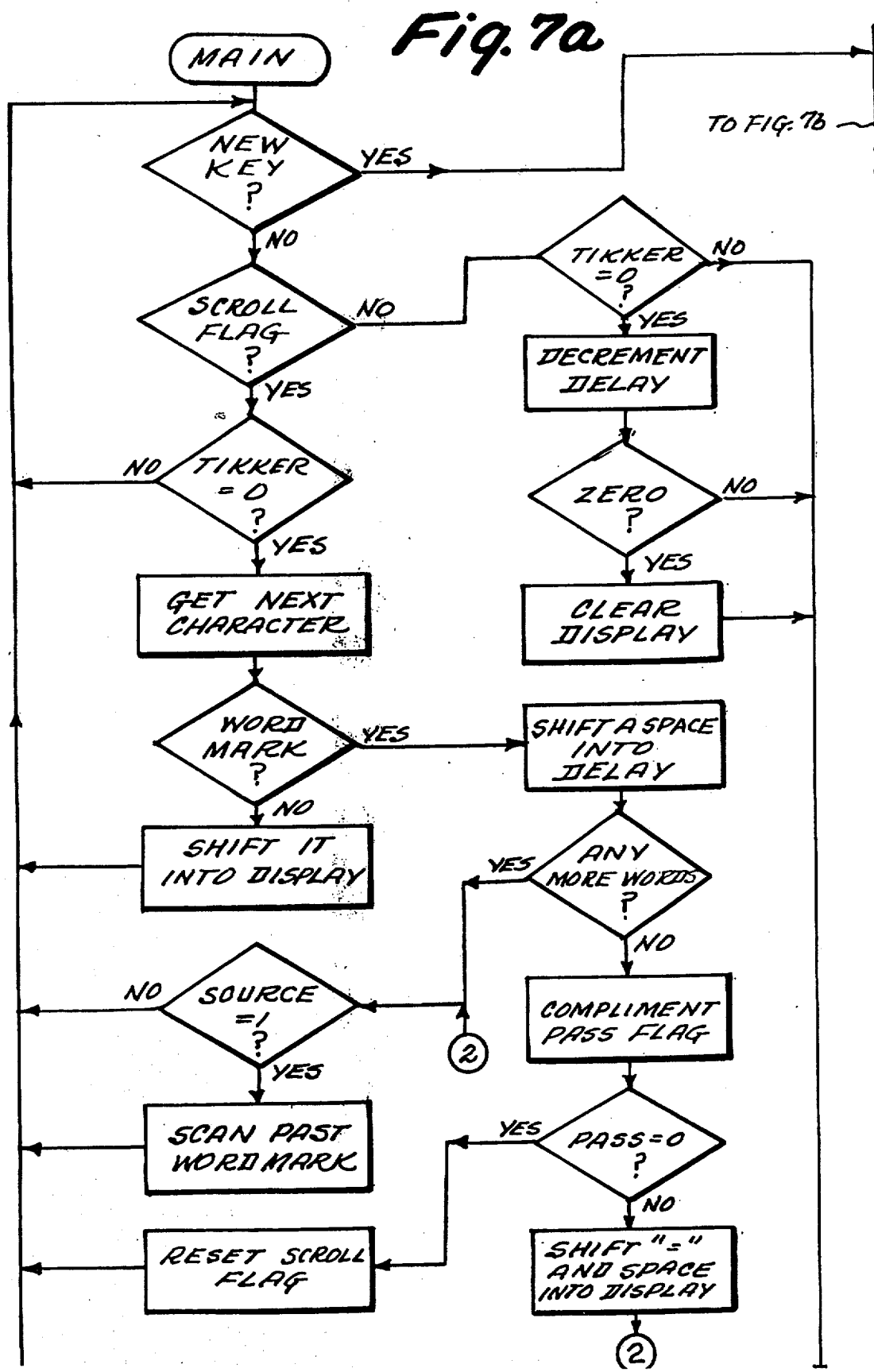
FIGS. 7a, 7b and 7c show a flow diagram of the MAIN subroutine that controls the operation of the microcomputer when a key is depressed.
Figure 7B:
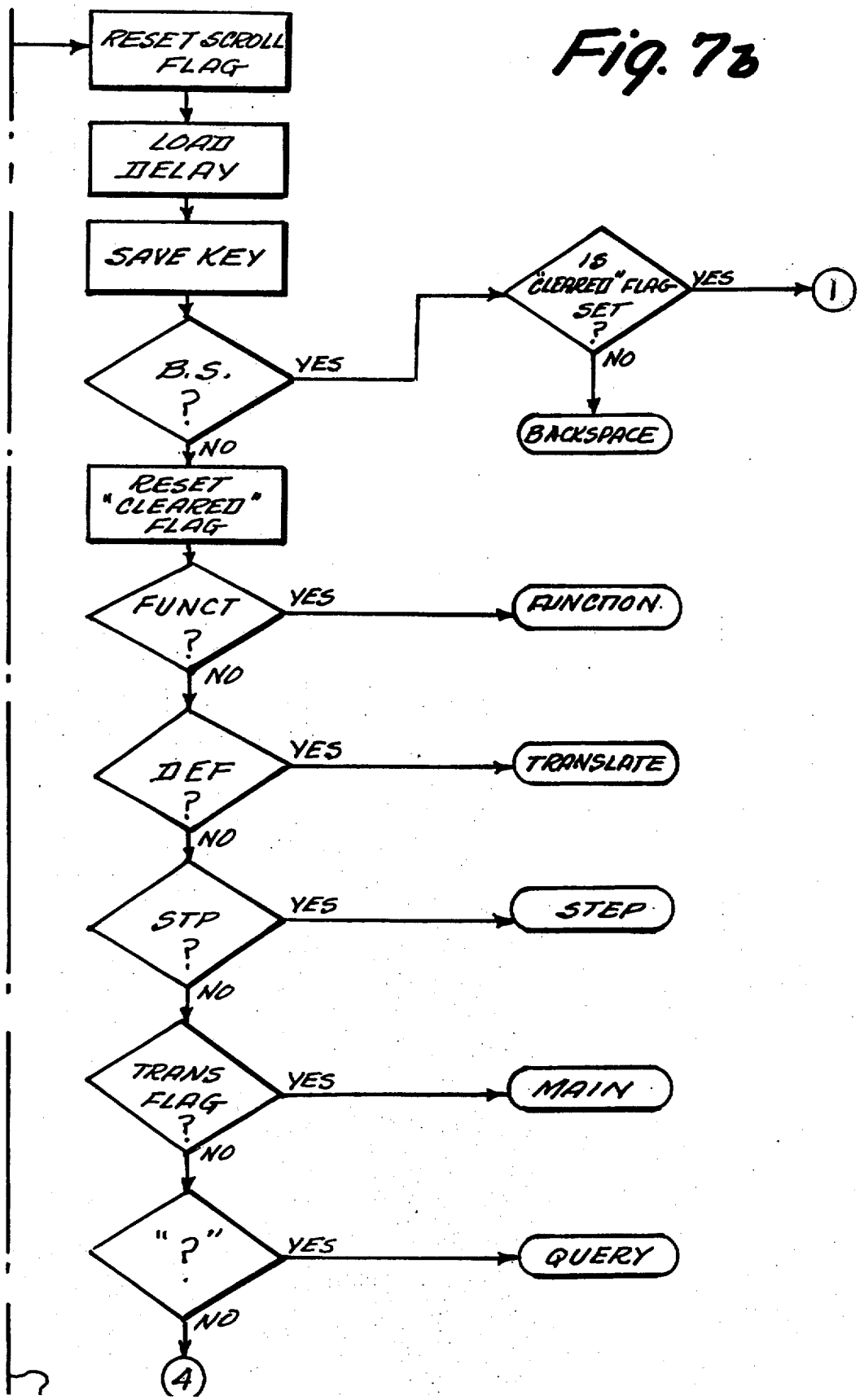
Figure 7C:
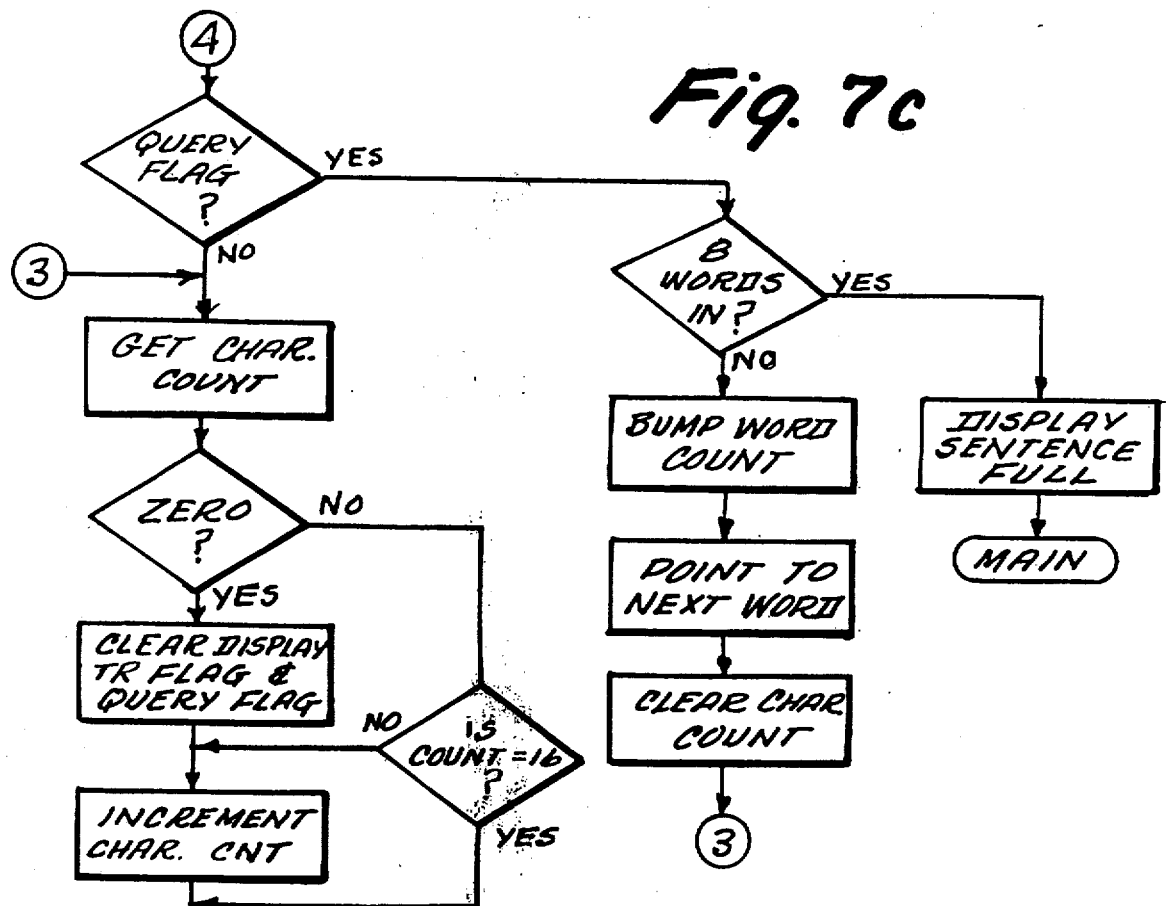

The MAIN subroutine, illustrated in FIGS. 7a, 7b, and 7c, controls the operation of microcomputer 330 when a key is depressed, and also controls the scrolling action of the display.

As indicated in FIG. 7a, when the MAIN subroutine is entered, CPU 238 retrieves the contents of the keyboard buffer location in RAM 234 to determine if a new key has been pressed. If a new key has not been pressed, CPU 238 then determines whether the scroll flag is set. The scroll flag is set while the display is scrolling.

If the scroll flag is not set, CPU 238 then determines whether tikker equals "0". As indicated above, tikker is a counter utilized to increment the scrolling function. Tikker counts down to "0" approximately four times a second at which time the display is shifted. If tikker does not equal "0", CPU 238 returns to the beginning of the MAIN subroutine. If tikker does equal "0", CPU 238 then decrements delay. As indicated above, delay is a location in RAM 234 which contains a count, which when decremented to "0", causes the display to be cleared and decimal points to appear to save power.

As is evident from this portion of the flow chart, the delay is decremented each time tikker equals "0" and the scroll flag is not set. After delay is decremented, CPU 238 then determines whether delay is "0". If it is not, CPU 238 returns to the beginning of the MAIN subroutine. If delay is "0", the display is cleared and decimal points appear across it. CPU 238 then returns to the beginning of the MAIN subroutine.

If the scroll flag has been set, such as when the device is scrolling, CPU 238 determines whether tikker is "0".

If tikker is not "0", the characters are not ready to be shifted to the next display position, and CPU 238 returns to the beginning of the MAIN subroutine. If tikker is "0", the characters are ready to be shifted and the next character to be displayed is obtained. CPU 238 then determines whether this character is a word mark. If it is not, this next character is shifted into the display and CPU 238 returns to the beginning of the MAIN subroutine.

If the next character is a word mark, a space is shifted into the display. CPU 238 then determines whether there are any more words to be displayed. As will be recalled, a pointer in RAM 234 called word count points to another location in RAM 234 which stores the location in ROM 320 where the translation for that particular word was found. As words are entered, word count is incremented to the next RAM 234 word table location which will store the ROM 320 location of a match. As the matches are scrolled through the display, word count indicates the RAM 234 word table location storing the ROM 320 location from which the word currently being displayed was retrieved. CPU 238 compares the number of words that have already been displayed with the maximum word count while words were being entered. If there is a difference then there are more words to be displayed.

If the difference is not "0", CPU 238 causes word count to point to the next RAM 234 word table location to determine the next character to be displayed and that address is loaded. In addition, CPU 238 determines whether the source flag is "1", i.e., whether the second half of each pair of sequences is being searched. If the source flag is not "1", the first half of each pair of sequences is being displayed and CPU 238 returns to the MAIN subroutine.

If the source flag is "1", then the second half of each pair of sequences is being displayed, so that CPU 238 scans past the word mark separating the two halves of the next matching pair of sequences (as indicated by word count) in order to reach the beginning of the second half of the sequence. CPU 238 then returns to the beginning of the MAIN subroutine.

If there are no more words to be displayed, the pass and source flags are complemented. Initially, the pass flag is "0". After the end of all the words of a given language, the pass flag is complemented or made equal to "1". After all the words of the second language have been displayed, the pass flag again is complemented so that it equals "0". Thus, the pass flag is "0" only after both halves of the pairs of matching sequences have been displayed.

After the pass and source flags have been complemented, CPU 238 determines whether the pass flag is "0". If it is not, indicating that only the entered words have been displayed, an equal sign and a space are shifted into the display and CPU 238 again determines whether the source flag is "1". If the source flag is not "1", the first half of each pair of sequences are being displayed, so that CPU 238 may return to the beginning of the MAIN subroutine with no further action. If source does equal "1", the second half of the pairs of matching sequences are being displayed, and CPU 238 scans past the intermediate word mark between each sequence of a pair in order to arrive at the characters to be displayed. CPU 238 then returns to the beginning of the MAIN subroutine.

If the pass flag was "0", the scrolling of the entered words followed by their translation has been complete. The scroll flag is reset indicating the end of a scroll function, and CPU 238 returns to the beginning of the MAIN subroutine.

The above description relates to the case where no new key was pressed. If CPU 238 determines that a key code has been placed in keyboard buffer in RAM 234, the scroll flag is reset as illustrated in FIG. 7b. The scroll function automatically ends upon the depression of a key. Delay is reloaded, since a key has been depressed and the 30 second time period begins to run again. CPU 238 then transfers the key code from keyboard buffer in RAM 234 to a different location in RAM 234.

CPU 234 then determines if the key pressed is backspace key 414. If it is, CPU 238 then determines whether the cleared flag is set. If it is set, then, as discussed above, the dictionary is reversed by means of the second half of the CLEAR subroutine in FIG. 6. The source flag is complemented, the title is displayed, and if the source flag equals "1", the ends of the titles are switched. Delay is loaded and CPU 238 returns to the MAIN subroutine illustrated in FIG. 7a. If the cleared flag was not set, CPU 238 enters the BACKSPACE subroutine as illustrated in FIG. 10 and discussed below.

If the backspace key was not pressed, then since another key has been entered, the cleared flag is reset. CPU 238 then determines whether function key 424 has been depressed. If it has, the FUNCTION subroutine, illustrated in FIG. 8 and as discussed below, is entered.

If function key 424 was not depressed, CPU 238 then determines whether definition key 420 has been depressed. If it has, the TRANSLATE subroutine, illustrated in FIG. 12 and discussed below, is entered. If definition key 420 was not depressed, CPU 238 then determines whether step key 418 has been depressed. If it has, the STEP subroutine, illustrated in FIGS. 11a and 11b and discussed below is entered.

If step key 418 has not been depressed, CPU 238 then determines whether the translation flag is set. The translation flag is set when definition key 420 is depressed. If the translation flag is set, CPU 238 returns to the main subroutine. If CPU 238 reaches this portion of the MAIN subroutine, only query key 422 or one of the alpha-numeric keys could have been depressed. Once definition key 420 is depressed, it is not desirable that any more data or that the query mode be entered. Therefore, CPU 238 basically ignores the key that was depressed and returns to the beginning of the MAIN subroutine.

If the translation flag was not set, CPU 238 then determines whether query key 422 has been depressed. If it has, the QUERY subroutine, illustrated in FIG. 9 and discussed below, is entered.

If the query key 422 has not been depressed, one of the alpha-numeric keys must have been depressed. As illustrated in FIG. 7c, CPU 238 first determines whether the query flag is set. As discussed above, to utilize the query feature of the device, a portion of a word or phrase is entered and query key 422 is depressed, thus setting the query flag. Step key 418 is then depressed repeatedly until the desired word appears. In order to continue building a sentence to be translated, the next word is then simply entered, without the depression of any key after the last depression of step key 418.

Thus, entry of a character when the query flag is set indicates that a new word is being entered and that the query mode is being left. Thus, if the query flag is set, CPU 23B first determines whether eight words have already been entered. In the preferred embodiment, a maximum of eight words may be translated at one time. If eight words have been entered, "SENTENCE FULL" is displayed, and CPU 238 returns to the beginning of the MAIN subroutine without entering or displaying the new character.

If eight words have not already been entered, word count, which points to the place in RAM 234 word table where the next ROM 320 address of the next match will be stored, is incremented to point to the next word table location to be filled with a ROM 320 address. The character count and the display are then cleared.

CPU 238 then continues as if the query flag has not been set. The character count is obtained, and CPU 238 determines whether the count is "0", thus indicating that this is the first character of a word being entered. If the character count is not "0", CPU 238 then determines whether the character count is 16, or whether the display is full. If the character count does equal 16, the new character is shifted into the display, thus losing the lefthand character, and CPU 238 returns to the beginning of the MAIN subroutine. If the character count is not 16, the character count is incremented, the character is shifted into the right side of the display, and CPU 238 returns to the beginning of the MAIN subroutine. If the character count is "0", the entered character is the first letter of a new word. The display, translation flag and query flag are cleared, the character count is incremented, and the new character is shifted into the righthand side of the display. CPU 238 then returns to the beginning of the MAIN subroutine.

Figure 8:
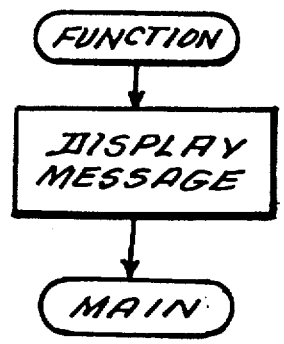
FIG. 8 shows a flow diagram of the FUNCTION subroutine.

FIG. 8 illustrates the steps taken by CPU 238 when the FUNCTION subroutine is entered by depression of function key 424. Quite simply, a promotional message is displayed and CPU 238 returns to the MAIN subroutine illustrated in FIG. 7a.

Figure 9:
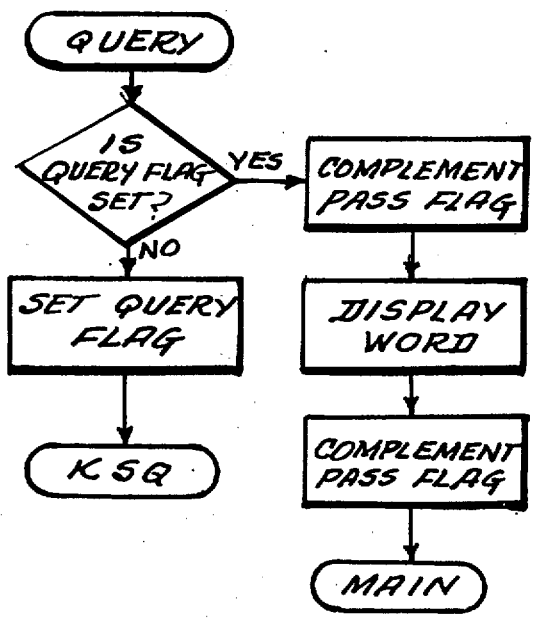
FIG. 9 shows a flow diagram of the QUERY subroutine.

FIG. 9 illustrates the QUERY subroutine, entered when query key 422 is depressed. CPU 238 first determines whether the query flag has already been set. If it has not, the query flag is set and CPU 238 jumps to the middle of the STEP subroutine to be described below and as is illustrated in FIG. 11b. In this portion of the STEP subroutine, a search is performed for the entered characters by entering the SEARCH subroutine illustrated in FIG. 13a and if a match is found it is displayed.

If the query flag has already been set, query key 422 has been depressed a second time within the same query mode. As was related above, if the query flag is set and query key 422 is depressed a second time, a translation is displayed of the word found in the search. Thus, the pass flag is complemented to indicate that the other sequence of the matching pair will be displayed, that particular sequence of the matching pair is displayed, and the pass flag is again complemented so that normal operation may resume. CPU 238 then returns to the MAIN subroutine illustrated in FIG. 7a.

FIG. 10 illustrates the BACKSPACE subroutine which is entered by depression of backspace key 414 when the key most recently depressed was not clear key 412. A space is entered on the left side of the display, and the characters in the display are shifted one space to the right so that the righthand character originally on the far right is lost. The character count is obtained and if it is not "0", it is decremented. CPU 238 then returns to the MAIN subroutine illustrated in FIG. 7a. If the character count is equal to "0", no characters are in the display, so that the character count need not be decremented and CPU 238 returns directly to the MAIN subroutine illustrated in FIG. 7a.

Step key 418 is a multifunction key. The particular function it performs depends on the state of the device. First, when a word or phrase is being entered into the device, step key 418 is depressed to indicate the end of the particular word or phrase. That particular word or phrase is then searched in ROM 320 translation table. Second, after a sentence has been entered and definition key 420 depressed, the entry and the translation will scroll through to the display. Depression of step key 418 will cause the scrolling mode to be ended and the next word to be displayed in the sequence will flash on the display. Further depression of step key 418 will cause the succeeding words of the entry and translation to be stepped through the display. Third, after query key 422 has been depressed, depression of step key 418 will cause the ROM 320 translation table to be searched for the next entry which matches the letters that have been entered. Upon finding a match, it is displayed.

Figure 11A:
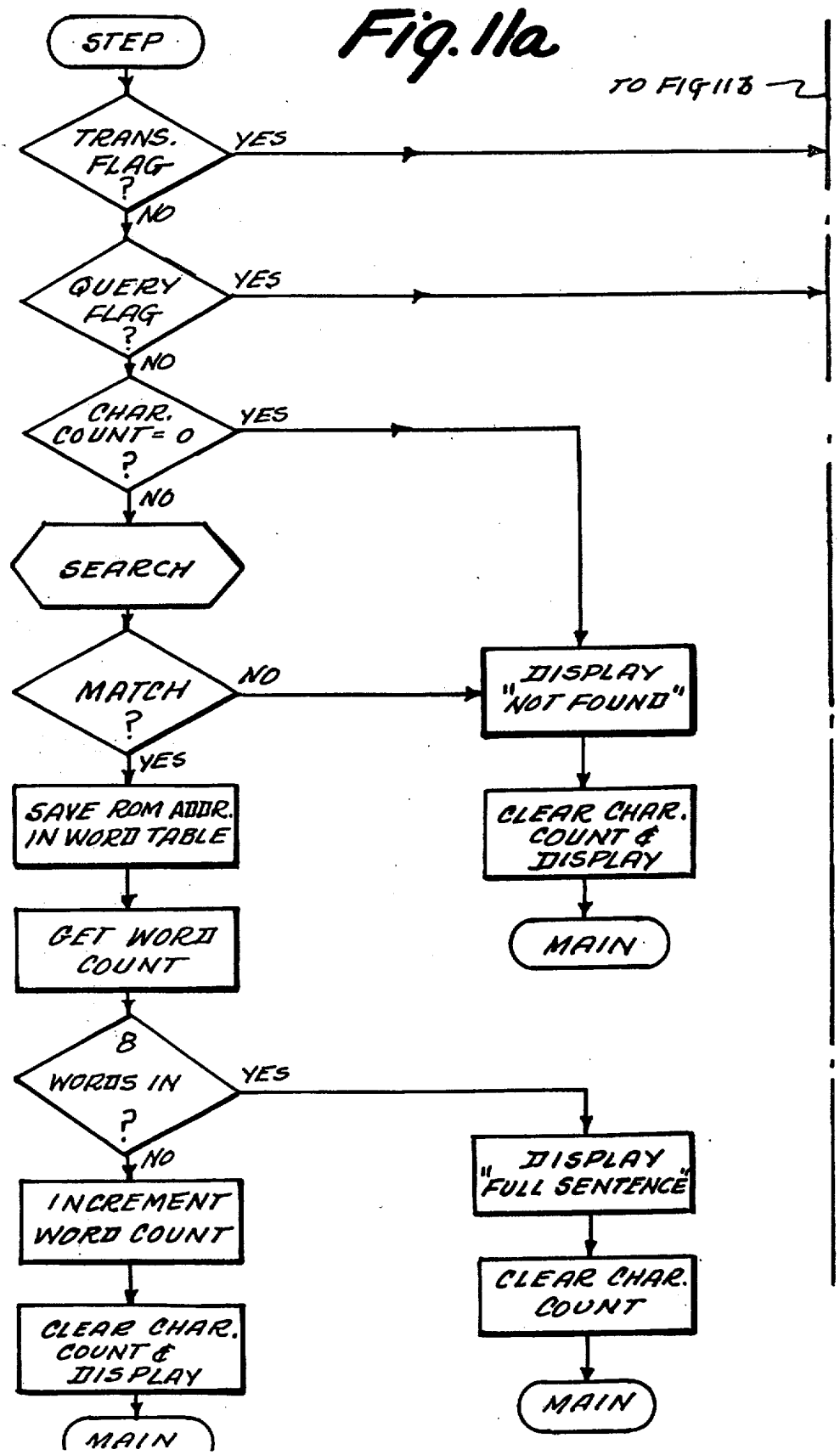
FIGS. 11a and 11b show a flow diagram of the STEP subroutine.
Figure 11B:
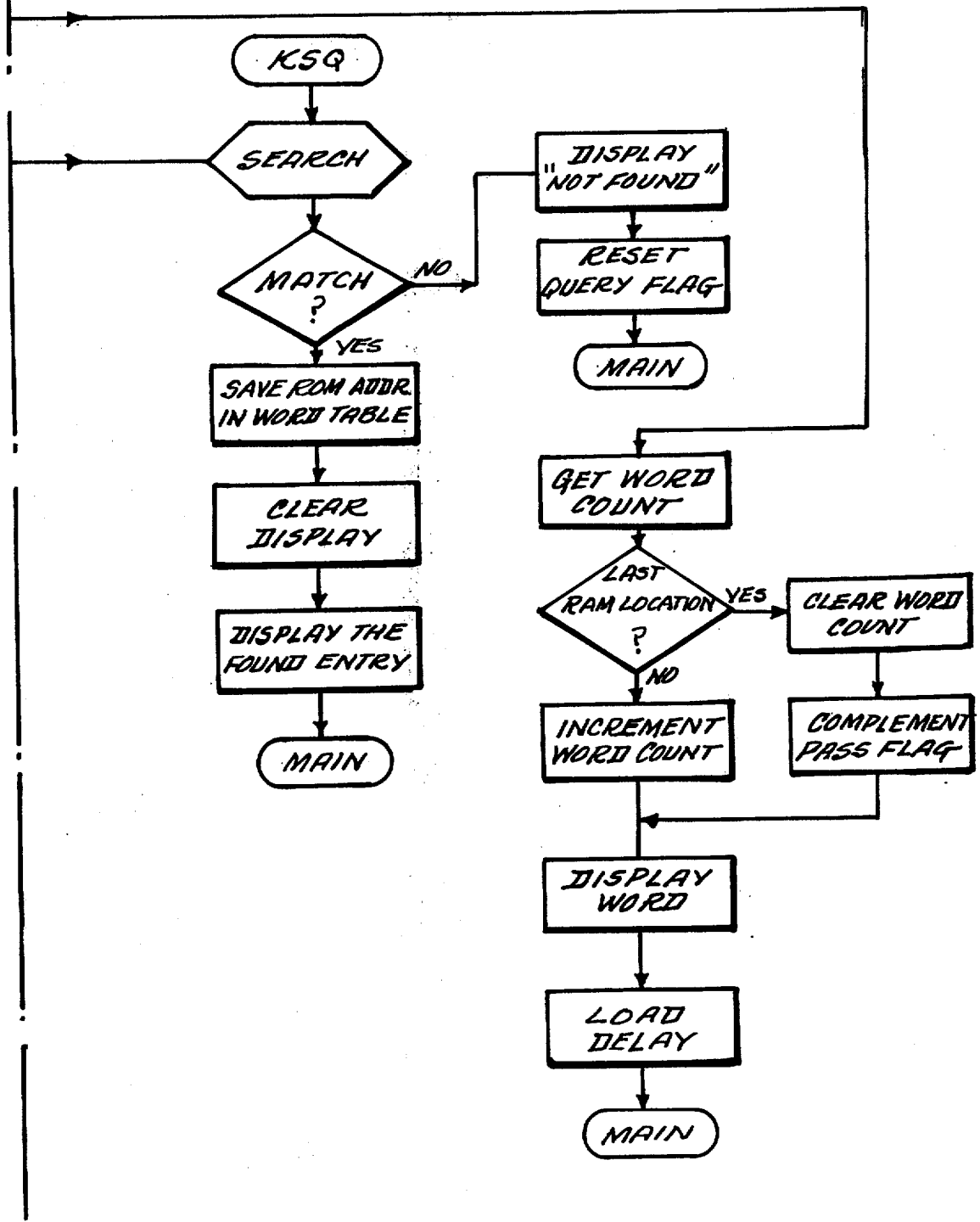

The STEP subroutine illustrated in FIGS. 11a and 11b perform these three functions when step key 418 is depressed. As illustrated in FIG. 11a, CPU 238 first determines whether the translation flag is set, thus indicating that step key 418 is to perform the second function detailed above. As illustrated in FIG. 11b, if the translate flag is set, word count is obtained. As will be recalled, word count is a pointer to RAM 234 word table locations storing ROM 320 locations with previous matches. As the entries and their matches are being displayed, the word count points to the table location storing the ROM 320 location whose contents are currently being displayed.

CPU 238 determines from word count whether the last word table location storing a ROM 320 location is being pointed to by word count. If it is, all of the words of either the entry or the translation have been displayed, and the other of either the entry or the translation must be displayed. Accordingly, CPU 238 clears word count so that the first word table location is being pointed to, and the pass flag is complemented to indicate that the other halves of the pairs of sequences are to be displayed. The word stored in ROM 320 at the location indicated by the RAM 234 location pointed to by word count is displayed, delay is loaded and CPU 238 returns to the MAIN subroutine indicated in FIG. 7a.

If the last RAM 234 location is not being pointed to by word count, word count is incremented and the word stored in the ROM 320 location indicated at the word table location pointed to by word count is displayed, delay is loaded and CPU 238 returns to the MAIN subroutine indicated in FIG. 7a.

As indicated in FIG. 11a, if the translation flag is not set, CPU 238 then determines whether the query flag is set. If it is, step key 418 has been depressed to accomplish the third function defined above—namely, to search for and display words beginning with the letters entered. Thus, as illustrated in FIG. 11b, if the query flag is set, CPU 238 searches the ROM 320 data table by entering the SEARCH subroutine illustrated in FIG. 13a. This searching step is also the first step performed by CPU 238 in the QUERY subroutine after the query flag is set if the query flag had not previously been set. If a match is not found, there are no more matches in ROM 320, thus the query mode has been finished unsuccessfully. "NOT FOUND" is displayed, the query flag is reset and CPU 238 returns to the MAIN subroutine illustrated in FIG. 7a.

If a match is found, the location of the match in ROM 320 is stored in the word table located in RAM 234 pointed to by word count. The display is cleared, and the word that has been found is displayed. CPU 238 then returns to the MAIN subroutine illustrated in FIG. 7a.

If neither the translation flag nor the query flag have been set, step key 418 has been depressed to perform the first function set out above—namely, to indicate the end of a word or phrase and to cause a search to be performed for that word or phrase. As indicated in FIG. 11a, CPU 238 first determines whether the character count is "0". If it is, there are no characters in the display so that there is nothing to search. "NOT FOUND" is displayed, the character count is cleared and CPU 238 returns to the MAIN subroutine in FIG. 7a. If the character count is not "0", a search is performed by entry into the SEARCH subroutine illustrated in FIG. 13a.

If a match is not found, "NOT FOUND" is displayed, the display and the character count are cleared and CPU 238 returns to the MAIN subroutine in FIG. 7a. If a match is found, the ROM 320 address of the match is stored in the RAM 234 word table location indicated by word count. Word count is then obtained by CPU 238 which determines whether the ROM 320 location of eight matches (including the most recent match) have been stored. If there have been "FULL SENTENCE" is displayed, the character count and the display are cleared and CPU 238 returns to the MAIN subroutine in FIG. 7a to determine if another key has been depressed—typically definition key 420.

If eight ROM 320 addresses have not already been entered in the word table, word count is incremented to point to the next word table location table which will store the ROM 320 address of the next match, the character count and the display are cleared, and CPU 238 returns to the MAIN subroutine of FIG. 7a to determine if a new key has been depressed. In this case, the next key is typically either an alpha-numeric character or definition key 420.

Figure 12:
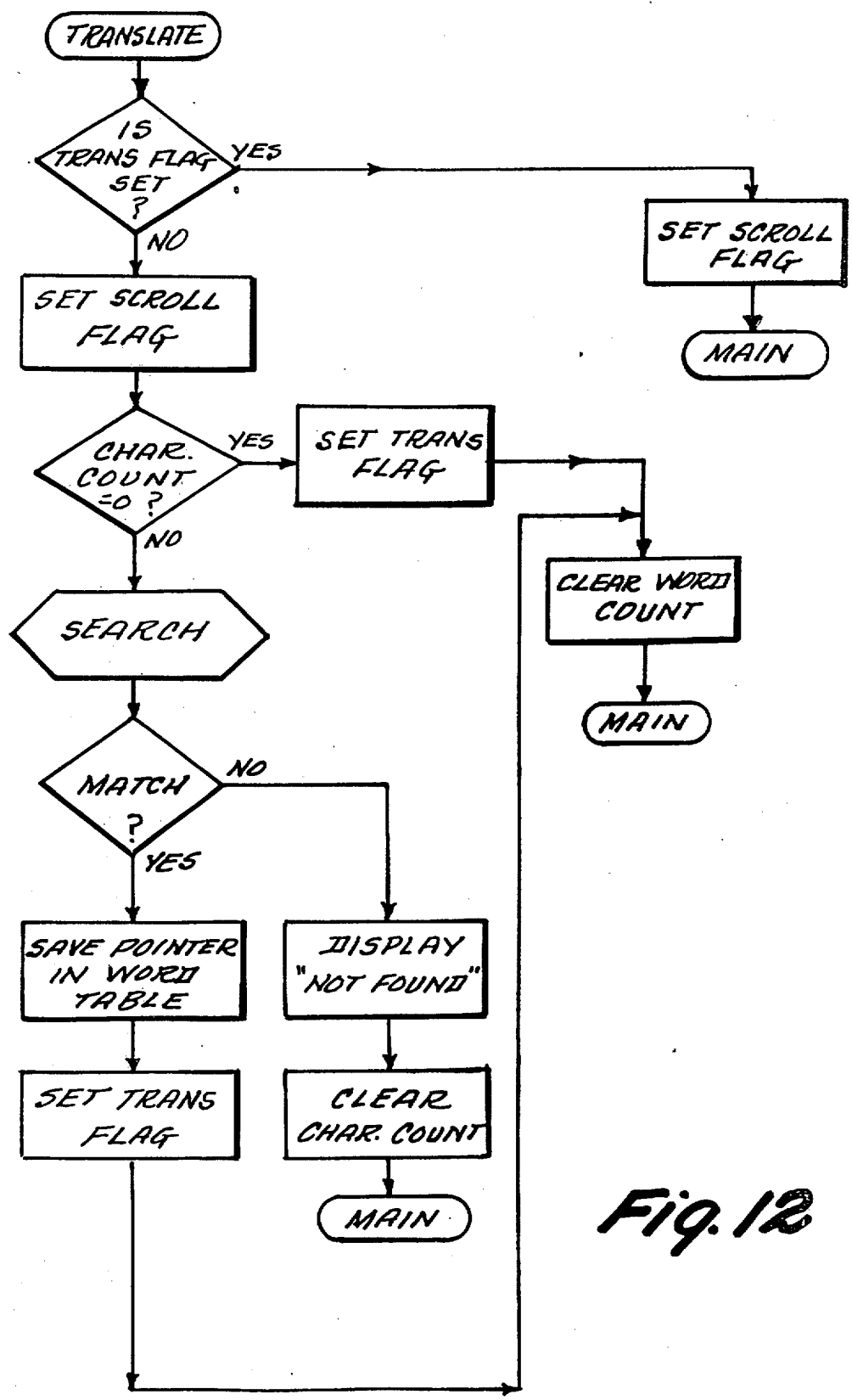
FIG. 12 shows a flow diagram of the TRANSLATE subroutine.

The TRANSLATE subroutine illustrated in FIG. 12 is entered by depression of definition key 420. Upon entry into this subroutine, CPU 238 first determines whether the translation flag is set, indicating that definition key 420 was the key most recently pressed. A user would press definition key 420 a second time in order to have the entered sentence and its translation scrolled again through the display. Thus, if the translation flag is set, CPU 238 sets the scroll flag and returns to the MAIN subroutine of FIG. 7a.

If the translation flag is not set, CPU 238 sets the scroll flag, determines if the character count is "0". As will be recalled from above, in the process of entering a sentence for translation, step key 418 is depressed after the entry of each unit to be searched. Step key 418 may be depressed after the last word is entered and before definition key 420 is depressed. As discussed above, with respect to the STEP subroutine illustrated in FIG. 11a, the display and character count are cleared by depression of step key 418. Therefore, if translation key 420 is then pressed, there are no characters in the display and the character count would be "0". In this instance, CPU 238 sets the translation flag, clears word count so that it points to the RAM 234 location in which is stored the ROM 320 address of the first match, and returns to the MAIN subroutine illustrated in FIG. 7a.

As related above, after the entry of the last word to be translated, step key 418 need not be depressed. Translation key 420 may be depressed immediately after entry of the last word. In this situation, the character count does not equal "0". Upon this determination, CPU 238 performs a search for the displayed word by entering the SEARCH subroutine illustrated in FIG. 13a. If a match is not found, "NOT FOUND" is displayed, the character count is cleared and CPU 238 returns to the MAIN subroutine in FIG. 7a. If a match is found, the ROM 320 address of the match is saved in the word table portion of RAM 234 pointed to by word count. The translation flag is set and word count is cleared so that the word table location of the ROM 320 address of the first match is pointed to so that CPU 238 may immediately obtain the contents of the ROM 320 address in the first word table location so that the first word to be matched may be displayed in the scroll mode. CPU 238 then returns to the MAIN subroutine in FIG. 7a.

Figure 13A:
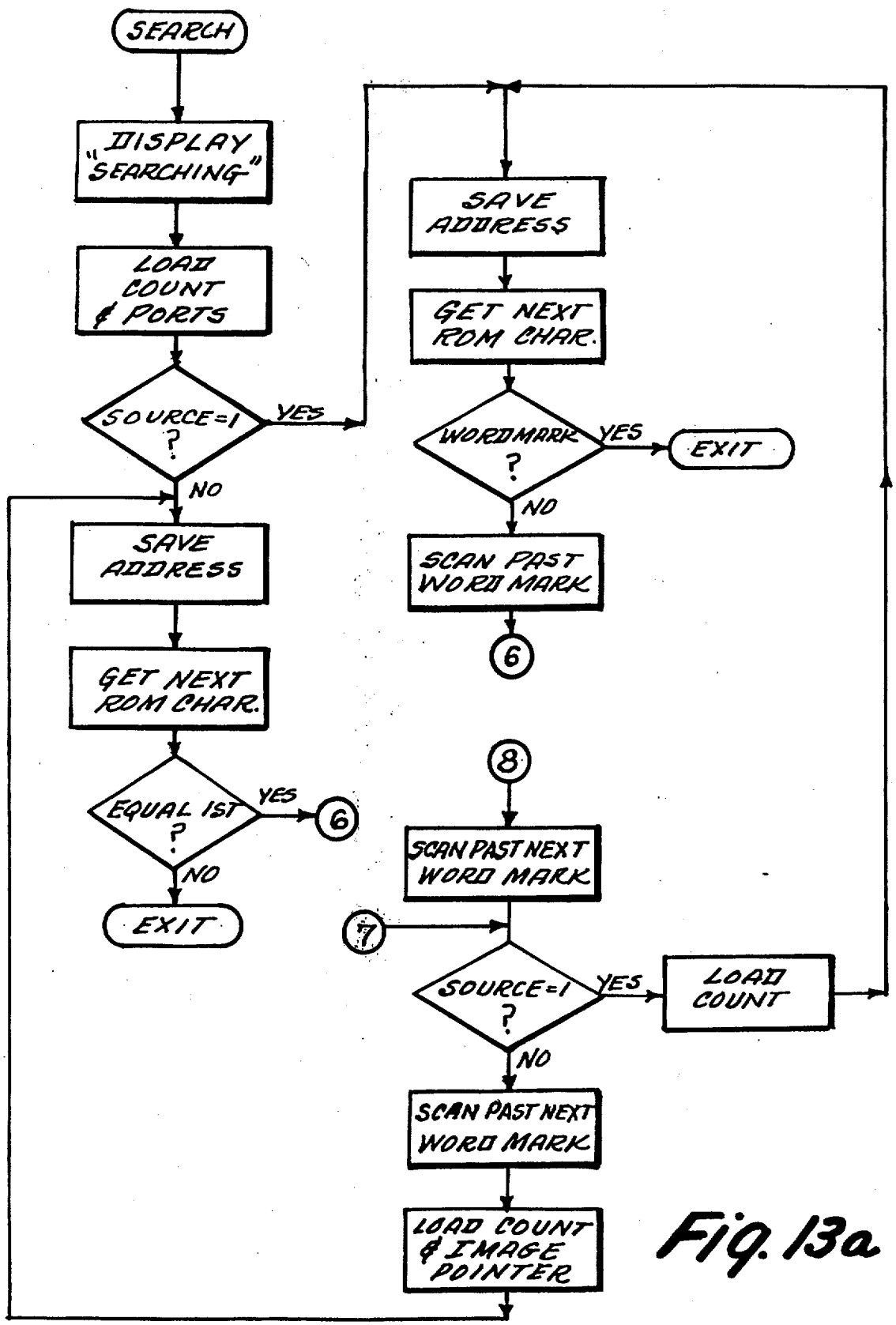
FIGS. 13a and 13b show a flow diagram of the SEARCH subroutine.
Figure 13B:
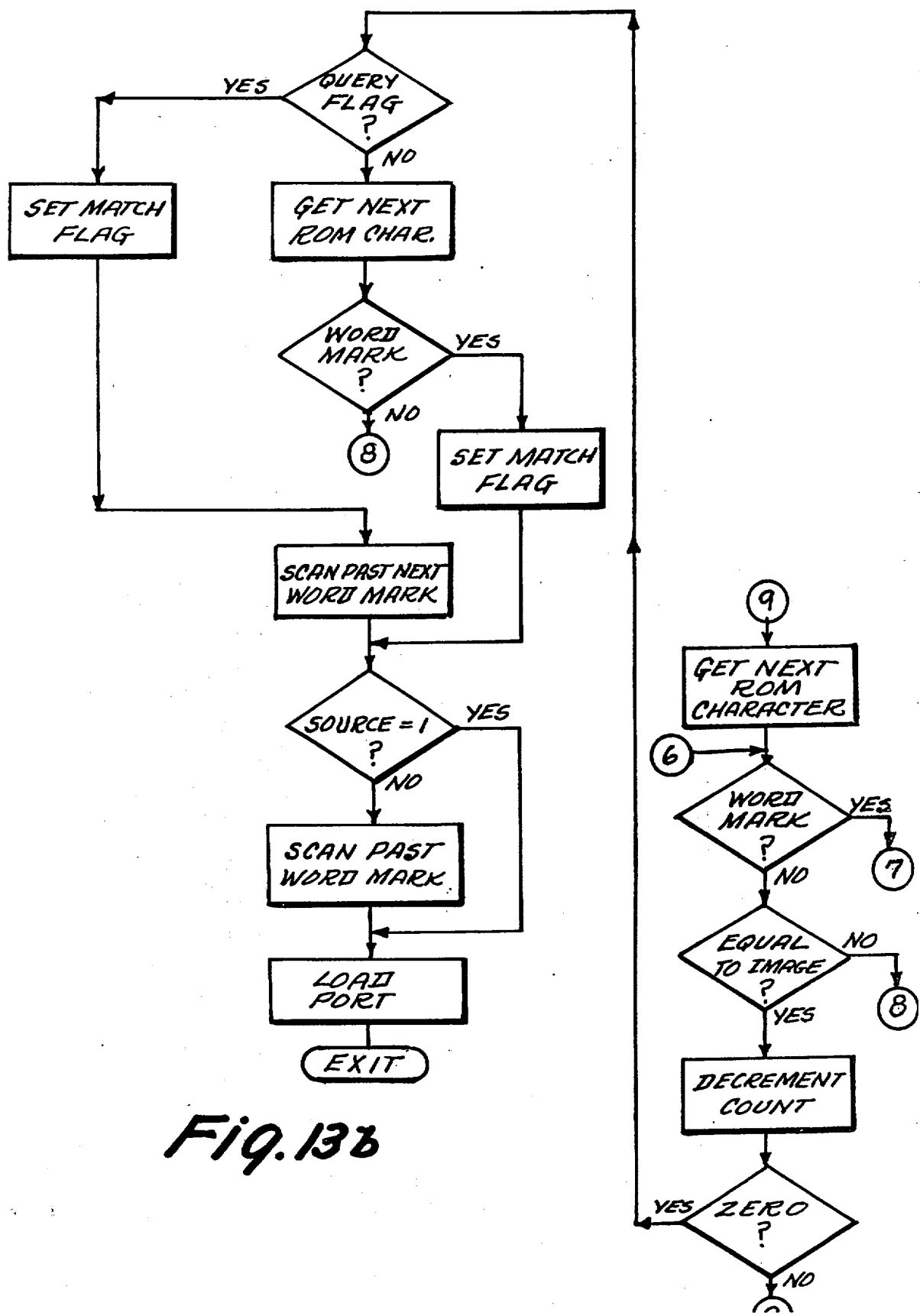

FIGS. 13 and 13b illustrate the SEARCH subroutine which may be entered from either the STEP subroutine or the TRANSLATE subroutine. As illustrated in FIG. 13a, upon entry of the SEARCH subroutine, "SEARCHING" is displayed, and count and ports are loaded. Count is a location in RAM 234 which stores the number of characters in the word being searched. This is a copy of character count. During the SEARCH subroutine, count points to the character which is currently being compared with a similarly positioned character in the word stored in the ROM 320 location currently being accessed. Ports is a location in RAM 234 which stores the ROM 320 address at which the search will start.

As indicated above, ROM 320 is organized in such a way that all pairs of sequences having a first sequence which begins with the same letter are grouped together in ROM 320. A table is stored in on-chip ROM 232 of the addresses at which entries stored in ROM 320 having a first sequence which begins with a given character begin. Thus, if English is the language of the first half of each pair of sequences, the table in on-chip chip ROM 232 stores the location in ROM 320 where the English words beginning with "A" and their translations begin, etc.

Thus, if the source flag is "0", indicating that the first half of each pair of sequences are being searched, an address is put in ports which indicates the ROM 320 address of the first word beginning with the same letter as the first letter of the image. Obviously, the second half of each pair of sequences cannot be organized in a similar fashion if the first half of each pair of sequences are so organized. Therefore, if the source flag is "1" indicating that the second half of each pair of sequences is being searched, ports is loaded with "0" so that the search begins at the beginning of the ROM translation 320 table.

CPU 230 then reaches the first decision point, namely, whether the source flag is "1". The situation where the source flag is "0" will be discussed first.

If the source flag is not equal "1", the next character stored in ROM 320 (initially, the first letter of the word) is retrieved from ROM 320 and its address is saved. CPU then determines whether the first character of the stored word is the same as the first character in the image. The image is the word that has been entered and is being searched. If it is not, since all words starting with the same letter are grouped together, there can be no other locations to find a match. Thus, the SEARCH subroutine is exited and CPU 238 returns to the position from which it left to enter the SEARCH subroutine. If the first ROM character does match the first image character, as illustrated in FIG. 13b, CPU 238 then determines whether the character is a word mark, indicating the end of either a source word or its translation. If the character is a word mark, there can be no match since the word in the ROM 320 table currently being examined is shorter than the word in the display being searched. Therefore, as indicated in FIG. 13a, CPU 238 again determines whether the source flag is "1". If it is not, CPU 238 scans (in the ROM 320 translation table) past the next word mark, i.e., past the end of the translation of the source word just rejected. Count is reloaded, the first character of the next source word in the ROM 320 translation table is obtained and the address is saved.

Returning to FIG. 13b, if the next ROM character was not a word mark, CPU 238 then determines whether the ROM character is equal to the similarly positioned character in the image. If it is not, there is no match. As indicated in FIG. 13a, CPU 238 then scans past the next word mark, i.e., the end of the source word that did not match. CPU 238 again determines whether the source flag is "1". If it does not, CPU 238 scans past the next word mark, i.e., the word mark after the translation of the source word which has just been rejected. Count is loaded, the next ROM character, i.e., the first character in the next source word, is retrieved from the ROM 320 translation table and its address is saved.

Returning to FIG. 13b, if the character obtained from ROM 320 is equal to the equivalent character in the image, count is decremented. CPU 238 then determines whether count is "0". If it is not, more characters in the image must be compared to the equivalent characters in the ROM. CPU 238 then gets the next ROM 320 character from the ROM 320 translation table and again determines whether this character is a word mark.

This process continues until a match is found, i.e., until, for all the letters of a given ROM 320 entry, no word mark is found, all of the ROM 320 characters match the corresponding image characters and the count is decremented to "0". When count is decremented to "0", all the characters in the image match the corresponding characters in the ROM word being accessed. However, the ROM word may have more characters than the image word.

As related above, in the query mode, one or more letters may be entered in the display and the device will find all of the words that begin with these letters. Thus, the ROM word would most likely be longer than the entered word. However, when the device is translating, or trying to determine a definition, the number of characters in the ROM word must not exceed the number of characters in the image.

Therefore, CPU 238 determines whether the query flag is set. If the query flag is set, the match flag is set, indicating that a match has been found, and CPU 238 scans past the next word mark in ROM data table 320, i.e., past the end of the word that has been found to match. CPU 238 then determines whether the source flag is "1". If it is not, CPU 238 then scans past the next word mark, i.e., past the translation of the source word that has been found to match in order to arrive at the beginning of the next word that should be compared if further words are desired which begin with the given letters. This address is entered in ports, which address is the ROM address at which the next search should start. CPU 238 then returns to the point from which it left to enter the SEARCH subroutine.

If the query flag is not set, the next ROM character is retrieved. CPU 238 then determines whether this character is a word mark. Remember that a determination has been made that the device is not in the query mode, and therefore must be in the definition mode. In order for a match to exist, the ROM word must precisely match the image word with no extra characters. If there are no extra characters, the character after the count ha been decremented to "0" should be a word mark. If it is a word mark, CPU 238 sets the match flag indicating a match, and determines whether the source flag is "1". If it is not, CPU 238 then scans past the next word mark, i.e., the end of the translation of the matching source word. This address, i.e., the address of the next source word after the match is loaded into ports and CPU 238 returns to the point from which it left to enter the SEARCH subroutine.

If the next character from ROM data table 320 was not a word mark, there is no match. As indicated in FIG. 13a, CPU 238 scans past the next word mark at the end of the word that was determined not to be a match, and CPU 238 determines whether source equals "1". If it does not, CPU 238 scans past the next word mark, i.e., at the end of the translation of the word that does not match, and count is reloaded. The next ROM character, i.e., the first character of the next English word is retrieved from ROM table 320 and its address is saved. The subroutine then proceeds as discussed above.

If the source flag is "1", i.e., the second half of each pair of alpha-numeric sequences are being searched, after count and ports are loaded, the next ROM character is obtained and its address is saved. If a word mark is found at this point, it indicates the end of the ROM 320 translation table so that no match exists. Therefore, CPU 238 returns to the point from which it left to enter the SEARCH subroutine. If the character is not a word mark, CPU 238 scans past the next word mark, i.e., past the end of the source word to the beginning of the translation word to be searched. As indicated in FIG. 13b, CPU 238 then determines whether the next character is a word mark. Obviously, in the first pass through this loop, the next character will not be a word mark since the previous word mark was just passed. CPU 238 then determines whether the ROM 320 character is the same as the corresponding character in the image. If it is not, there is no match and, as indicated in FIG. 13a, CPU 238 scans past the next word mark, i.e., past the end of the word that is not a match. CPU 238 then determines whether the source flag is "1". If it is, count is reloaded and the next ROM character is obtained and its address is saved.

As indicated in FIGS. 13b, if the ROM character was the same as the corresponding image character, count is decremented and CPU 238 determines whether count then equals "0". If it does not, indicating that there are further characters in the image to be compared, the next ROM character is obtained.

CPU 238 then determines whether the next character is a word mark. If it is, it indicates there is no match because the word in the dictionary is shorter than the word being searched. In such a case, as shown in FIG. 13a, CPU 238 then determines whether the source flag is "1". If it is, count is loaded and the next ROM character is obtained with its address being saved. Ideally, a match is eventually found. This happens when the ROM character being displayed is not a word mark, the character is equal to the similarly positioned character in the image and after decrementation, count equals "0" (see FIG. 13b). The subroutine then continues as described above, except that after the match flag has been set, it is necessary to load in ports the address of the first character of the first half of the next pair of alphanumeric sequences in ROM 320. Therefore, CPU 238 determines whether the source flag is "1". If it does, the word mark that was most recently scanned past represented the end of the translation so that the address currently being accessed in ROM 320 is the first letter of the first half of the next word in the ROM 320 translation table. CPU 238 then exits the SEARCH subroutine and returns to the subroutine from which it previsously left.

Referring to FIG. 4, circuitry 200, keyboard 210 and display 212 are mounted on or in housing 400 which may be of any suitable material, e.g., a hard plastic. The unique apparatus of this invention finds particularly utility as a hand-held unit. For example, the unit can be 6"×3"×1¼" thick. Module 150, containing microcomputer 330 and ROM 320 is mounted in housing 500 made of any suitable material such as hard plastic. A low-insertion force edge connector 214 is utilized to electrically and mechanically connect keyboard-display unit 100 with plug-in module 150.

The basic unit can, if desired, be built into or temporarily coupled with a portable desk unit which can contain a magnetic tape cartridge drive and/or a small thermal printer and/or an accoustic coupler. In this mode, keyboard-display unit 100 may act as a remote terminal for a computer. With a system of this type, up to 500,000 characters of storage could be used to allow for storage of large dictionaries, phone directories, sections of legal or medical information and books of facts. A print capability would then allow for hard copy recording of retrieved information. Telephone interface capability would permit sending and receiving of stored information to and from a remotely located computer.

This unit is preferably powered by rechargeable batteries and may include, as an accessory, a compact battery charge unit capable of fully recharging the unit within 16 hours.

IV. DETAILED PROGRAM LISTINGS

The following lists all of the specific steps for carrying out the functions described above using the instructions in the above-mentioned "Single-Chip Microcomputer M3870" publication.

```
              16 *     DEFINITIONS
              17 *
              18 *
000C          19 IX    EQU    H'C'    INDEX TO SCRATCH PAD
000D          20 IXI   EQU    H'D'    INDEX AND INCREMENT
000E          21 IXD   EQU    H'E'    INDEX AND DECREMENT
000A          22 HU    EQU    10
000B          23 HL    EQU    11
              24 *
              25 *
              26 *
              27 *     FLAGS 1
              28 *
              29 *     SCROLL FLAG       01    1 => ROLL SENTENCE THRU
              30 *     SOURCE FLAG       02    1 => LOOK UP 2ND, 0 => 1ST
              31 *     PASS FLAG         04    0 => SOURCE LANG, 1 => XLATED
              32 *     MODE FLAG         08    0 => ALPHA, 1 => NUMERIC
              33 *     TRANS FLAG        10
              34 *     QUERY FLAG        20
              35 *     ROM ODD DIGIT FLAG 40
              36 *     CLEARED FLAG      80
              37 *
              38 *
              39 *     FLAGS 2
              40 *
              41 *     QUERY STEPPED     01    1 => THE STEP HAS BEEN PRESSED
              42 *     SEARCH MATCH      02    1 => MATCH
              43 *     SEARCH DIRECTION  04    0 => FORWARD, 1 => BACKWARD
              44 *                       08
              45 *                       10
              46 *                       20
              47 *                       40
              48 *                       80
              49 *
              50 $TITLE ('START UP PROCEDURES ')
0000          51       ORG    D'0'
```

```
0000 1A      52 ZEROO   DI
0001 2028    53         LI    D'40'      TIMER COUNTER
0003 B7      54         OUTS  7
0004 20EA    55         LI    H'EA'      PRESCALE, START TIMER
0006 B6      56         OUTS  6
0007 201E    57         LI    30
0009 0B      58         LR    IS,A
000A 74      59         LIS   4
000B 5E      60         LR    IXD,A      4HZ TIKKER
000C 70      61         CLR
000D 5E      62         LR    IXD,A      KBACTIVE
000E 5E      63         LR    IXD,A      ROW
000F 5E      64         LR    IXD,A      COLUMN
0010 18      65         COM
0011 5E      66         LR    IXD,A      KBBUFFER
0012 2017    67         LI    23
0014 0B      68         LR    IS,A
0015 70      69         CLR
0016 B0      70         OUTS  0
0017 5C      71         LR    IX,A       COUNT OF WORDS
0018 290089  72         JMP   START
             73 *TITLE ('INTERRUPT SERVICE ')
0020         74         ORG   H'0020'
0020 1A      75         DI               SAVE STATE
0021 1E      76         LR    J,W        SAVE STATUS REG
0022 50      77         LR    0,A        SAVE ACCUMULATOR
0023 0A      78         LR    A,IS
0024 51      79         LR    1,A        SAVE ISAR
0025 201E    80         LI    30         POINT TO 4HZ TIKKER
0027 0B      81         LR    IS,A
0028 3E      82         DS    IXD        DECREMENT 4HZ TIKKER (IS = 29)
0029 70      83         CLR
002A CE      84         AS    IXD        GET KBD ACTIVE FLAG (IS = 28)
002B 9444    85         BNZ   ACTIV
002D 4C      86         LR    A,IX       GET CURRENT ROW
002E 3E      87         DS    IXD        DECREMENT ROW FOR NEXT TIME
             88 *                        (IS = 27)
002F 2107    89         NI    7          ISOLATE ROW BITS
0031 52      90         LR    2,A        SAVE THEM
0032 2220    91         OI    H'20'
0034 18      92         COM
0035 B4      93         OUTS  4          ENABLE KEYS
0036 70      94         CLR
0037 B1      95         OUTS  1
0038 A1      96         INS   1          READ THEM
             97 *
0039 15      98         SL    4          LEFTIFY THEM
003A 9118    99         BM    NKC3       COLUMN 3?
003C 13      100        SL    1
003D 9113    101        BM    NKC2       2?
003F 13      102        SL    1
0040 9116    103        BM    NKC1       1?
0042 13      104        SL    1
0043 9118    105        BM    NKC0       0?
0045 41      106 RESTR  LR    A,1
0046 0B      107        LR    IS,A       RESTORE ISAR
0047 40      108        LR    A,0        RESTORE ACCUM
0048 1D      109        LR    W,J        RESTORE STATUS
0049 1B      110        EI
004A 1C      111        POP
004B 78      112 NKC3   LIS   8
004C 5E      113        LR    IXD,A      SAVE COLUMN (IS = 26)
004D 2018    114        LI    24         COLUMN * 8
004F 900F    115        BR    NEWKEY
0051 74      116 NKC2   LIS   4
0052 5F      117        LR    IXD,A      (IS = 26)
```

| | | | | |
|---|---|---|---|---|
| 0053 2010 | 118 | LI | 16 | |
| 0055 9009 | 119 | BR | NEWKEY | |
| 0057 72 | 120 NKC1 | LIS | 2 | |
| 0058 5E | 121 | LR | IXD,A | (IS = 26) |
| 0059 78 | 122 | LIS | 8 | |
| 005A 9004 | 123 | BR | NEWKEY | |
| 005C 71 | 124 NKC0 | LIS | 1 | |
| 005D 5E | 125 | LR | IXD,A | (IS = 26) |
| 005E 78 | 126 | LIS | 8 | |
| 005F 2C | 127 NEWKEY | XDC | | SAVE DATA COUNTER |
| 0060 2A0353 | 128 | DCI | KBTBL | |
| 0062 C2 | 129 | AS | 2 | ADD ROW TO COL * 8 |
| 0064 8E | 130 | ADC | | XLATE ADDRESS |
| 0065 16 | 131 | LM | | GET KEY VALUE |
| 0066 2C | 132 | XDC | | |
| 0067 5C | 133 | LR | IX,A | PUT IT IN BUFFER |
| 0068 2010 | 134 | LI | 29 | |
| 006A 0B | 135 | LR | IS,A | |
| 006B 42 | 136 | LR | A,2 | ROW |
| 006C 1F | 137 | INC | | |
| 006D 5C | 138 | LR | IX,A | SET ACTIVE FLAG |
| 006E 9006 | 139 | BR | RESTR | |
| | 140 * ISAR | IS | 28 | |
| 0070 52 | 141 ACTIV | LR | 2,A | SAVE ACTIVE ROW |
| 0071 32 | 142 | DS | 2 | WHICH WAS + 1 |
| 0072 4C | 143 | LR | A,IX | GET CURRENT ROW |
| 0073 3E | 144 | DS | IXD | DECREMENT ROW FOR NEXT TIME |
| | 145 * | | | (IS = 27) |
| 0074 2107 | 146 | NI | 7 | IS IT = ACTIVE? |
| 0076 E2 | 147 | XS | 2 | |
| 0077 94CD | 148 | BNZ | RESTR | NO => EXIT |
| 0079 42 | 149 | LR | A,2 | GET ROW |
| 007A 2220 | 150 | OI | H'20' | SET KBD BIT |
| 007C 18 | 151 | COM | | |
| 007D B4 | 152 | OUTS | 4 | |
| 007E 70 | 153 | CLR | | |
| 007F B1 | 154 | OUTS | 1 | |
| 0080 A1 | 155 | INS | 1 | READ KEYS |
| 0081 FD | 156 | NS | IXI | AND WITH ACTIVE COLUMN (IS = 28) |
| 0082 94C2 | 157 | BNZ | RESTR | STILL CLOSED => EXIT |
| 0084 4D | 158 | LR | A,IXI | POINT TO ACTIVE FLAG (IS = 29) |
| 0085 70 | 159 | CLR | | |
| 0086 5C | 160 | LR | IX,A | CLEAR KB ACTIVE FLAG |
| 0087 90BD | 161 | BR | RESTR | EXIT |
| | 162 $TITLE ('START UP') | | | |
| 0089 1A | 163 START | DI | | |
| 008A 2A05D9 | 164 | DCI | MESS3 | |
| 008D 48 | 165 | LR | A,8 | |
| 008E 2102 | 166 | NI | 2 | |
| 0090 58 | 167 | LR | 8,A | |
| 0091 8404 | 168 | BZ | ZX | |
| 0093 2A05E9 | 169 | DCI | MESS4 | |
| 009E 2801A7 | 170 ZX | PI | MESSAG | |
| 0099 28014D | 171 | PI | CLIMAG | |
| 009C 28015D | 172 | PI | CLWORD | |
| 009F 71 | 173 | LIS | 1 | |
| 00A0 56 | 174 | LR | 6,A | |
| 00A1 2805D9 | 175 | PI | SEARCH | |
| 00A4 48 | 176 | LR | A,8 | |
| 00A5 2280 | 177 | OI | H'80' | SET CLEARED FLAG |
| 00A7 58 | 178 | LR | 8,A | |
| 00A8 2012 | 179 | LI | 18 | |
| 00AA 0B | 180 | LR | IS,A | |
| 00AB 70 | 181 | CLR | | |
| 00AC 5D | 182 | LR | IXI,A | CLEAR FLAGS2 |

```
00AD 5C      183          LR    IX,A     CLEAR WORD #
00AE 56      184          LR    6,A      CLEAR CHAR COUNT
00AF B4      185          OUTS  4
00B0 B0      186          OUTS  0
00B1 2080    187          LI    H'80'    PULSE CHIP ENABLE
00B3 B0      188          OUTS  0
00B4 A1      189          INS   1
00B5 70      190          CLR
00B6 B0      191          OUTS  0
00B7 1B      192          EI
00B8 290416  193          JMP   DELAY
             194  *TITLE ('DEBUG UTILITY')
             195  *DEBUG  EI
             196  *        LR    A,HU    ADDRESS
             197  *        NI    H'3F'
             198  *        LR    HU,A    RANGE LIMIT
             199  *        SR    4       MS DIGIT
             200  *        NI    15
             201  *        OI    H'30'
             202  *        COM
             203  *        DI
             204  *        OUTS  1       DATA FOR DISPLAY
             205  *        LIS   15      POSITION
             206  *        LR    0,A
             207  *        PI    DISPLY  LOAD DISPLAY
             208  *        LR    A,HU
             209  *        NI    15      ISOLATE LS DIGIT
             210  *        LR    0,A
             211  *        PI    ZONIT
             212  *        LR    A,0
             213  *        COM
             214  *        OUTS  1       DATA
             215  *        LIS   14
             216  *        LR    0,A
             217  *        PI    DISPLY  DISPLAY ADDRESS
             218  *        LI    H'C2'   EQUALS SIGN
             219  *        OUTS  1
             220  *        LIS   13
             221  *        LR    0,A
             222  *        PI    DISPLY  DISPLAY EQUALS
             223  *        LR    A,HU
             224  *        LR    IS,A
             225  *        LR    A,IX
             226  *        SR    4
             227  *        NI    15
             228  *        LR    0,A
             229  *        PI    ZONIT
             230  *        LR    A,0
             231  *        COM
             232  *        OUTS  1       MSB OF DATA
             233  *        LIS   12
             234  *        LR    0,A
             235  *        PI    DISPLY
             236  *        LR    A,IX
             237  *        NI    15
             238  *        LR    0,A
             239  *        PI    ZONIT
             240  *        LR    A,0
             241  *        COM
             242  *        OUTS  1       LSB OF DATA
             243  *        LIS   11
             244  *        LR    0,A
             245  *        PI    DISPLY
             246  *GEKEY   DI
             247  *        PI    GETKEY
```

```
248 *         EI
249 *         BZ      DBKEY   WAIT FOR KEY
250 **
251 *         LI      H'3A'
252 *         XS      3       IS KEY = FUNCTION?
253 *         BZ      DBEXIT
254 **
255 *         LI      H'38'
256 *         XS      3       IS KEY = STEP?
257 *         BZ      DBSTEP
258 **
259 *         LI      H'30'
260 *         XS      3       IS KEY = DEFINE?
261 *         BZ      DBADDR
262 **
263 *         LR      A,3
264 *         NI      15
265 *         SL      4       LEFTIFY IT
266 *         LR      HU,A
267 *DBDATA   DI
268 *         PI      GETKEY
269 *         EI
270 *         BZ      DBDATA  WAIT FOR SECOND KEY
271 *         LR      A,HU
272 *         LR      IS,A    ADDRESS
273 *         LR      A,3
274 *         NI      15
275 *         AS      HL      JOIN DATA
276 *         LR      IX,A    PUT IT
277 *         JMP     DEBUG
278 **
279 *DBADDR   DI
280 *         PI      GETKEY  WAIT FOR KEY
281 *         EI
282 *         BZ      DBADDR
283 *         LR      A,3
284 *         NI      3
285 *         SL      4
286 *         LR      HU,A    MSD OF ADDRESS
287 *DBALSD   DI
288 *         PI      GETKEY  WAIT FOR LSD
289 *         EI
290 *         BZ      DBALSD
291 *         LR      A,3
292 *         NI      15
293 *         AS      HU      JOIN ADDRESS
294 *         LR      HU,A    SAVE NEW ADDRESS
295 *         JMP     DEBUG
296 *DBSTEP   LR      A,HU    INCREMENT ADDRESS
297 *         INC             MAIN LOOP WRAPS IT
298 *         LR      HU,A
299 *         JMP     DEBUG
300 *DBEXIT   LR      P0,Q    EXIT TO CONTENTS OF Q
301 *
302 * END OF DEBUG
303 *
304 ***********************************************
305 $TITLE ('TABLES ')
306 *
307 *       KEYBOARD TRANSLATE TABLE
308 *
309 *
310 *       LOOKUP VALUE IS ROW + (8 * COLUMN) + (32 * MODE)
311 *
312 *
313 *       MODE = 0        ROW     COLUMN  GRAPHIC
```

```
              314 *
 00BB 41      315 KBTBL  DC    H'41'   0   0   A
 00BC 4A      316        DC    H'4A'   1   0   J
 00BD 53      317        DC    H'53'   2   0   S
 00BE 45      318        DC    H'45'   3   0   E
 00BF 4E      319        DC    H'4E'   4   0   N
 00C0 57      320        DC    H'57'   5   0   W
 00C1 3F      321        DC    H'3F'   6   0   ?
 00C2 30      322        DC    H'30'   7   0   DEFINE
 00C3 42      323        DC    H'42'   0   1   B
 00C4 4B      324        DC    H'4B'   1   1   K
 00C5 54      325        DC    H'54'   2   1   T
 00C6 46      326        DC    H'46'   3   1   F
 00C7 4F      327        DC    H'4F'   4   1   O
 00C8 58      328        DC    H'58'   5   1   X
 00C9 3C      329        DC    H'3C'   6   1   BACKSPACE
 00CA 3B      330        DC    H'3B'   7   1   STEP
 00CB 43      331        DC    H'43'   0   2   C
 00CC 4C      332        DC    H'4C'   1   2   L
 00CD 55      333        DC    H'55'   2   2   U
 00CE 47      334        DC    H'47'   3   2   G
 00CF 50      335        DC    H'50'   4   2   P
 00D0 59      336        DC    H'59'   5   2   Y
 00D1 52      337        DC    H'52'   6   2   R
 00D2 20      338        DC    H'20'   7   2   SPACE
 00D3 44      339        DC    H'44'   0   3   D
 00D4 4D      340        DC    H'4D'   1   3   M
 00D5 56      341        DC    H'56'   2   3   V
 00D6 48      342        DC    H'48'   3   3   H
 00D7 51      343        DC    H'51'   4   3   Q
 00D8 5A      344        DC    H'5A'   5   3   Z
 00D9 49      345        DC    H'49'   6   3   I
 00DA 3B      346        DC    H'3B'   7   3   FUNCTION
              347 *
              348 *   MODE = 1
              349 $TITLE ('MESSAGES')
 00DB ACBA    350 MESS1  DC    HL2'ACBA'    SE
 00DD B1AB    351        DC    HL2'B1AB'    NT
 00DF BAB1    352        DC    HL2'BAB1'    EN
 00E1 BCBA    353        DC    HL2'BCBA'    CE
 00E3 DFDF    354        DC    HL2'DFDF'    --
 00E5 B9AA    355        DC    HL2'B9AA'    FU
 00E7 B3B3    356        DC    HL2'B3B3'    LL
 00E9 DFDF    357        DC    HL2'DFDF'    --
              358 *
 00EB B1B0    359 MESS2  DC    HL2'B1B0'    NO
 00ED ADDF    360        DC    HL2'ADDF'    T-
 00EF B9B0    361        DC    HL2'B9B0'    FO
 00F1 AAB1    362        DC    HL2'AAB1'    UN
 00F3 BBDF    363        DC    HL2'BBDF'    D-
 00F5 DFDF    364        DC    HL2'DFDF'    --
 00F7 DFDF    365        DC    HL2'DFDF'    --
 00F9 DFDF    366        DC    HL2'DFDF'    --
              367 *
              368 *
 00FB ACBA    369 MESS5  DC    HL2'ACBA'    SE
 00FD BEAD    370        DC    HL2'BEAD'    AR
 00FF BCB7    371        DC    HL2'BCB7'    CH
 0101 B6B1    372        DC    HL2'B6B1'    IN
 0103 B8DF    373        DC    HL2'B8DF'    G-
 0105 DFDF    374        DC    HL2'DFDF'    --
 0107 DFDF    375        DC    HL2'DFDF'    --
 0109 DFDF    376        DC    HL2'DFDF'    --
              377 *
              378 $TITLE ('SUBROUTINES')
              379 *
```

```
0168        380 DISPLY* PULSES THE DISPLAY POSITION IN R0
            381 *
0168 40     382         LR      A,0
016C 18     383         COM
016D 210F   384         NI      15        ISOLATE POSITION
016F B4     385         OUTS    4
0110 2220   386         OI      H'20'
0112 B4     387         OUTS    4
0113 210F   388         NI      15
0115 B4     389         OUTS    4
0116 1C     390         POP
            391 *
            392 *
0117        393 GETKEY*         COPIES THE KEYBOARD BUFFER INTO
            394 *               RAM LOC 3. Z => EMPTY
            395 *
0117 201A   396         LI      26        BUFFER ADDRESS
0119 0B     397         LR      IS,A
011A 4C     398         LR      A,IX      GET THE KEY
011B 53     399         LR      3,A       CURRENT KEY REGISTER
011C 20FF   400         LI      255
011E 5C     401         LR      IX,A      SET BUFFER EMPTY
011F 43     402         LR      A,3
0120 1F     403         INC               Z => NO KEY IN BUFFER
0121 1C     404         POP
            405 *
            406 *
0122        407 CLDISP* CLEAR DISPLAY
            408 *
0122 0S     409         LR      K,P       SAVE RETURN
0123 2010   410         LI      16        LOOP CONTROL
0125 54     411         LR      4,A
0126 200F   412 CLDLUP  LI      H'0F'     A SPACE
0128 B1     413         OUTS    1         DATA
0129 34     414         DS      4         DECREMENT POSITION
012A 44     415         LR      A,4       GET POSITION
012B 50     416         LR      0,A
012C 280108 417         PI      DISPLY    PULSE DATA INTO DISPLAY
012F 70     418         CLR
0130 C4     419         AS      4         IS THIS POS 0?
0131 94F4   420         BNZ     CLDLUP
0133 0C     421         PK
            422 $TITLE ('SUBROUTINES')
            423 *
0134        424 COPY*   IMAGE TO DISPLAY
            425 *
0134 08     426         LR      K,P       SAVE RETURN
0135 202F   427         LI      47        LEFT END OF IMAGE
0137 0B     428         LR      IS,A
0138 2010   429         LI      16        LOOP CONTROL
013A 54     430         LR      4,A
013B 4C     431 COPLUP  LR      A,IX      NEXT BYTE OF IMAGE
013C 18     432         COM
013D B1     433         OUTS    1         DATA OUT
013E 0A     434         LR      A,IS
013F 24FF   435         AI      255       DECREMENT INDEX
0141 0B     436         LR      IS,A
0142 34     437         DS      4         DECREMENT POSITION
0143 44     438         LR      A,4       GET POSITION
0144 50     439         LR      0,A
0145 280108 440         PI      DISPLY    DISPLAY BYTE
0148 70     441         CLR
0149 C4     442         AS      4         POS ZERO?
014A 94F8   443         BNZ     COPLUP
014C 0C     444         PK
```

|        |          | 445 * |        |           |                            |
|--------|----------|-------|--------|-----------|----------------------------|
|        | 014D     | 446 * |        |           |                            |
|        |          | 447 CLIMAG* | SET IMAGE TO SPACES |     |                            |
|        |          | 448 * |        |           |                            |
| 014D 2010 |        | 449   | LI     | 16        |                            |
| 014F 50  |        | 450   | LR     | 0,A       | LOOP CONTROL               |
| 0150 2020 |       | 451   | LI     | H'20'     | BASE OF IMAGE AND SPACE    |
| 0152 08 |        | 452   | LR     | IS,A      |                            |
| 0153 5C |        | 453 CILOOP | LR | IX,A      |                            |
| 0154 0A |        | 454   | LR     | A,IS      |                            |
| 0155 1F |        | 455   | INC    |           | INCREMENT INDEX            |
| 0156 08 |        | 456   | LR     | IS,A      |                            |
| 0157 2020 |       | 457   | LI     | H'20'     |                            |
| 0159 30 |        | 458   | DS     | 0         |                            |
| 015A 94F8 |       | 459   | BNZ    | CILOOP    |                            |
| 015C 1C |        | 460   | POP    |           |                            |
|        |          | 461 * |        |           |                            |
|        |          | 462 * |        |           |                            |
|        | 015D     | 463 CLWRD* | CLEARS THE WORD TABLE TO ZEROS |  |               |
|        |          | 464 * |        |           |                            |
| 015D 203F |       | 465   | LI     | 63        | TOP OF TABLE               |
| 015F 50  |       | 466   | LR     | 0,A       |                            |
| 0160 2010 |       | 467   | LI     | 16        | LOOP CONTROL               |
| 0162 51  |       | 468   | LR     | 1,A       |                            |
| 0163 40  |       | 469 CWLOOP | LR | 0,A       |                            |
| 0164 08  |       | 470   | LR     | IS,A      |                            |
| 0165 70  |       | 471   | CLR    |           |                            |
| 0166 5C  |       | 472   | LR     | IX,A      |                            |
| 0167 30  |       | 473   | DS     | 0         | ADDRESS ADJUST             |
| 0168 31  |       | 474   | DS     | 1         | CONTROL                    |
| 0169 94F9 |      | 475   | BNZ    | CWLOOP    |                            |
| 016B 1C  |       | 476   | POP    |           |                            |
|        |          | 477 * |        |           |                            |
|        |          | 478 * |        |           |                            |
|        | 016C     | 479 ZOXIT* | PUT ASCII ZONES ON R0 |       |                    |
|        |          | 480 * |        |           |                            |
|        |          | 481 * |        |           |                            |
| 016C 40  |       | 482   | LR     | A,0       |                            |
| 016D 2230 |      | 483   | OI     | H'30'     |                            |
| 016F 50  |       | 484   | LR     | 0,A       |                            |
| 0170 2539 |      | 485   | CI     | H'39'     |                            |
| 0172 8205 |      | 486   | BC     | ZOXIT     |                            |
| 0174 40  |       | 487   | LR     | A,0       |                            |
| 0175 2407 |      | 488   | AI     | 7         |                            |
| 0177 50  |       | 489   | LR     | 0,A       |                            |
| 0178     |       | 490 ZOXIT |     |           |                            |
| 0178 1C  |       | 491   | POP    |           |                            |
|        |          | 492 * |        |           |                            |
|        |          | 493 $TITLE ('SUBROUTINES') |  |  |                           |
|        |          | 494 * |        |           |                            |
|        | 0179     | 495 SHIFT* | THE IMAGE LEFT AND INSERT R0 |  |              |
|        |          | 496 * |        |           |                            |
| 0179 2020 |      | 497   | LI     | 32        | BASE OF DISPLAY            |
| 017B 08  |       | 498   | LR     | IS,A      |                            |
| 017C 4C  |       | 499 SLOOP | LR | A,IX      | GET NEXT DISPLAY BYTE      |
| 017D 51  |       | 500   | LR     | 1,A       | SAVE IT                    |
| 017E 40  |       | 501   | LR     | A,0       |                            |
| 017F 5C  |       | 502   | LR     | IX,A      | PUT IT                     |
| 0180 0A  |       | 503   | LR     | A,IS      |                            |
| 0181 1F  |       | 504   | INC    |           | BUMP INDEX                 |
| 0182 08  |       | 505   | LR     | IS,A      |                            |
| 0183 4C  |       | 506   | LR     | A,IX      | NEXT BYTE                  |
| 0184 50  |       | 507   | LR     | 0,A       |                            |
| 0185 41  |       | 508   | LR     | A,1       |                            |
| 0186 5C  |       | 509   | LR     | IX,A      | PUT IT - ROUTINE WORKS BY PAIRS |
| 0187 0A  |       | 510   | LR     | A,IS      |                            |

```
0188 1F      511        INC
0189 06      512        LR    IS,A
018A 210F    513        NI    H'F'      ISOLATE 4 LS BITS OF ISAR
018C 94EF    514        BNZ   SLOOP
018E 1C      515        POP
             516 *
018F         517 ROTATE* THE IMAGE RIGHT AND INSERT A
             518 *
018F 202F    519        LI    47        TOP OF DISPLAY
0191 0B      520        LR    IS,A
0192 4C      521 RLOOP  LR    A,IX
0193 51      522        LR    1,A
0194 40      523        LR    A,0
0195 5C      524        LR    IX,A      1ST BYTE OF PAIR
0196 0A      525        LR    A,IS
0197 24FF    526        AI    255       DEBUMP
0199 06      527        LR    IS,A
019A 4C      528        LR    A,IX
019B 50      529        LR    0,A
019C 41      530        LR    A,1
019D 5C      531        LR    IX,A      2ND BYTE
019E 0A      532        LR    A,IS
019F 24FF    533        AI    255
01A1 06      534        LR    IS,A
01A2 231F    535        XI    31
01A4 94ED    536        BNZ   RLOOP
01A6 1C      537        POP
             538 *
             539 *
             540 $TITLE ('MORE SUBROUTINES')
             541 *
01A7         542 MESSAG* DISPLAYS 16 BYTES FOUND AT DC
             543 *
             544 *
01A7 08      545        LR    K,P       SAVE RETURN
01A8 2010    546        LI    16
01AA 54      547        LR    4,A       LOOP CONTROL AND POSITION PLUS 1
01AB 16      548 MLOOP  LM              GET NEXT MESSAGE BYTE
01AC B1      549        OUTS  1
01AD 44      550        LR    A,4
01AE 24FF    551        AI    255       DECREMENT LCTL FOR POS
01B0 50      552        LR    0,A
01B1 2801B6  553        PI    DISPLY    PULSE POSITION SELECT
01B4 34      554        DS    4
01B5 94F5    555        BNZ   MLOOP
01B7 0C      556        PK
             557 *
             558 *
01B8         559 DWORD* DISPLAYS THE WORD POINTED TO BY THE
             560 *      CURRENT WORD TABLE ENTRY AND SELECTED
             561 *      BY PASS FLAG
             562 *
             563 *
01B8 08      564        LR    K,P       SAVE RETURN
01B9 00      565        LR    A,KU      IN A SAFE PLACE
01BA 06      566        LR    QU,A
01BB 01      567        LR    A,KL
01BC 07      568        LR    QL,A
01BD 280122  569        PI    CLDISP
01C0 2012    570        LI    18
01C2 0B      571        LR    IS,A
01C3 4C      572        LR    A,IX
01C4 2107    573        NI    7
01C6 13      574        SL    1
01C7 2430    575        AI    48
```

```
01C9 08        576            LR      IS,A
01CA 2A0225    577            PI      ROMADD    POINT TO DATA
01CD 2010      578            LI      16        LOOP CONTROL AND POSITION PLUS 1
01CF 54        579            LR      4,A
01D0 48        580            LR      A,8
01D1 2104      581            NI      4         IS PASS = FOREIGN?
01D3 8408      582            BZ      DWLOOP    NO => GET IT
01D5 2A0256    583 DWSCAN     PI      GETROM    YES => SCAN PAST WORD MARK
01D8 70        584            CLR
01D9 C7        585            AS      7
01DA 94FA      586            BNZ     DWSCAN
01DC 2A0256    587 DWLOOP     PI      GETROM    GET NEXT BYTE
01DF 70        588            CLR
01E0 C7        589            AS      7
01E1 8400      590            BZ      DWEND
01E3 18        591            COM
01E4 E1        592            OUTS    1         DISPLAY DATA
01E5 44        593            LR      A,4
01E6 24FF      594            AI      255
01E8 50        595            LR      0,A
01E9 2A010F    596            PI      DISPLY    PULSE POSITION SELECT
01EC 34        597            DS      4         DECREMENT LOOP CONTROL
01ED 94EE      598            BNZ     DWLOOP
01EF 00        599 DWEND      LR      P0,Q      RETURN
               600 *
01F0           601 GETADD* COPIES THE ADDRESS IN THE PORTS AND FLAGS
               602 *          INTO 21,22
               603 *
01F0 48        604            LR      A,8       FLAGS1
01F1 14        605            SR      4
01F2 12        606            SR      1
01F3 12        607            SR      1
01F4 2101      608            NI      1         ISOLATE ODD DIGIT FLAG
01F6 9402      609            BNZ     SPX       1 => 1
01F8 72        610            LIS     2         0 => 2
01F9 18        611 SPX        COM
01FA 1F        612            INC               2'S COMPLEMENT
01FB 54        613            LR      4,A
01FC 2015      614            LI      21
01FE 08        615            LR      IS,A      POINT TO ADDRESS SAVE SPACE
01FF A0        616            INS     0         READ LSB
0200 18        617            COM
0201 13        618            SL      1
0202 C4        619            AS      4         SUBTRACT 1 OR 2
0203 50        620            LR      IXL,A
0204 8206      621            BC      SPXX
0206 A5        622            INS     5
0207 1F        623            INC
0208 18        624            COM
0209 5C        625            LR      IX,A
020A 1C        626            POP
020B A5        627 SPXX       INS     5
020C 18        628            COM
020D 5C        629            LR      IX,A
020E 1C        630            POP
               631 *
020F           632 SAVPNT* COPIES SCRATCH PAD 21,22 INTO CURRENT
               633 *          ENTRY IN WORD TABLE
               634 *
               635 *
               636 *
020F 2015      637            LI      21
0211 08        638            LR      IS,A
0212 40        639            LR      A,IXL     GET LSB
0213 54        640            LR      4,A
```

```
0214 4C    641         LR    A,IX     MSB
0215 55    642         LR    5,A
0216 2012  643         LI    18
0218 0B    644         LR    IS,A     POINT TO WORD #
0219 4C    645         LR    A,IX
021A 2107  646         NI    7
021C 13    647         SL    1
021D 2430  648         AI    48
021F 0B    649         LR    IS,A
0220 44    650         LR    A,4      LSB - AGAIN
0221 5D    651         LR    IXL,A
0222 45    652         LR    A,5
0223 5C    653         LR    IX,A
0224 1C    654         POP
           655 $TITLE ('ROM ACCESS ROUTINES')
           656 *
           657 *
           658 *
0225       659 ROMADD*          CORRECT POINTER LSB ADDR
           660 *                IS IN ISAR - NOW
           661 *                CLEAR BUFFER AND 2ND
           662 *                CHAR, AND SET UP PORTS
           663 *
           664 * ROM POINTERS ARE DIGIT ADDRESSES - SO
           665 * THE LSB TELLS ABOUT WHICH HALF
           666 * OF THE FIRST BYTE TO USE. THE OTHER
           667 * 7 BITS GO INTO PORT 0 WITH THE
           668 * MS BIT SET. THE MS BYTE GOES INTO
           669 * PORT 5.
           670 *
           671 * EVEN DIGIT ADDRESS => FLAG1 H'40' =0
           672 *                ROM BUFFER FULL
           673 *                PORTS INCREMENTED
           674 *
           675 * ODD DIGIT ADDRESS => FLAG1 H'40' =1
           676 *                ROM BUFFER LSD FULL
           677 *                PORTS INCREMENTED
           678 *
0225 4D    679         LR    A,IXL    GET LSB OF ADDRESS
0226 54    680         LR    4,A      SAVE IT
0227 18    681         COM
0228 12    682         SR    1
0229 B0    683         OUTS  0        LOAD PORT
022A 4C    684         LR    A,IX     GET MSB OF ADDRESS
022B 18    685         COM
022C B5    686         OUTS  5
022D 48    687         LR    A,8      FLAGS
022E 21BF  688         NI    H'BF'    RESET ODD DIGIT FLAG
0230 58    689         LR    8,A
0231 44    690         LR    A,4      ADDRESS
0232 2101  691         NI    1        IS IT AN ODD ADDRESS
0234 8405  692         BZ    RROM     NO => SKIP
0236 48    693         LR    A,8
0237 2240  694         OI    H'40'    SET ODD DIGIT FLAG
0239 58    695         LR    8,A
           696 *
023A       697 RROM*   THE PORTS ARE LOADED. READ
           698 *       THE ROM INTO THE BUFFER AND
           699 *       INCREMENT THE ADDRESS IN THE
           700 *       PORTS
023A 70    701         CLR
023B B4    702         OUTS  4        SELECT ROM
023C 2010  703         LI    16
023E 0B    704         LR    IS,A     ISAR = ROM BUFFER
023F A0    705         INS   0        READ ROM ADDRESS
```

```
0240 52      706         LR     2,A
0241 2280    707         OI     H'80'    CHIP ENABLE
0243 F0      708         OUTS   0
0244 70      709         CLR
0245 E1      710         OUTS   1
0246 A1      711         INS    1
0247 18      712         COM
0248 5C      713         LR     IX,A     PUT BYTE IN BUFFER
0249 32      714         DS     2        BUMP COMP ADDRESS
024A 42      715         LR     A,2      GET ADDRESS
024B F0      716         OUTS   0        RELOAD PORT - LSB
024C 8108    717         BP     FREXIT   EXIT IF NO CARRY
024E 207F    718         LI     H'7F'
0250 F0      719         OUTS   0        RELOAD PORT - LSB
0251 A5      720         INS    5
0252 24FF    721         AI     H'FF'    BUMP MSB
0254 B5      722         OUTS   5        RELOAD PORT - MSB
0255         723 FREXIT
0255 1C      724         POP
             725 *
             726 *
             727 *
0256         728 GETROM* THE PORTS AND STORAGE ARE LOADED.
             729 *       THE NEXT CHARACTER IN THE ROM IS RETURNED,
             730 *       TRANSLATED, IN RAM LOC 7.
             731 *
0256 08      732         LR     K,P      SAVE RETURN
0257 2011    733         LI     17
0259 68      734         LR     IS,A     POINT TO SECOND
025A 70      735         CLR
025B CC      736         AS     IX       GET IT
025C 57      737         LR     7,A
025D 9418    738         BNZ    GRGOT
025F 280291  739         PI     GRGET4   GET NEXT 4 BITS INTO #7
0262 47      740         LR     A,7      GET CHAR
0263 230F    741         XI     15       IS IT EXTENSION?
0265 840E    742         BZ     GREXT
0267 2A0285  743         DCI    ROMTT
026A 47      744 GRXLAT  LR     A,7      GET 4 BITS
026B 8E      745         ADC             ADD TO TABLE BASE
026C 16      746         LM
026D 57      747         LR     7,A      TRANSLATED VALUE
026E 2011    748 GRGOT   LI     17
0270 68      749         LR     IS,A
0271 70      750         CLR
0272 5C      751         LR     IX,A     RESET 2ND CHAR
0273 0C      752         PK
             753 *
0274 2A0695  754 GREXT   DCI    ROMEXT
0277 280291  755         PI     GRGET4   GET NEXT 4 BITS INTO #7
027A 47      756         LR     A,7      GET THEM
027B 250C    757         CI     12
027D 82EC    758         BC     GRXLAT   ISOLATE D,E,F
027F 2A057F  759         DCI    MCT      BASE OF MULTIPLE CHAR TABLE
0282 2011    760         LI     17
0284 68      761         LR     IS,A     POINT TO 2ND CHAR SPACE
             762 *
             763 *NOW CHANGE D INTO 0
             764 *             E INTO 2
             765 *             F INTO 4
             766 *
0285 47      767         LR     A,7
0286 2403    768         AI     3
0288 2103    769         NI     3        NOW 0,1,2
028A 13      770         SL     1        0,2,4
```

| | | | | |
|---|---|---|---|---|
| 028B 8E | 771 | ADC | | INDEX INTO TABLE |
| 028C 16 | 772 | LM | | GET 1ST BYTE |
| 028D 57 | 773 | LR | 7,A | INTO ROM BUFFER |
| 028E 16 | 774 | LM | | GET 2ND BYTE |
| 028F 5C | 775 | LR | IX,A | INTO 2ND BYTE SPACE |
| 0290 0C | 776 | PK | | EXIT |
| | 777 * | | | |
| | 778 * | | | |
| 0291 | 779 GRGET4* | DELIVERS THE NEXT 4 BITS FROM THE | | |
| | 780 * | ROM BUFFER TO RAM LOC 7, MAINTAINS | | |
| | 781 * | THE ROM ODD DIGIT FLAG (40), AND | | |
| | 782 * | RELOADS THE ROM BUFFER IF | | |
| | 783 * | REQUIRED. | | |
| 0291 2010 | 784 | LI | 16 | FULL BYTE CASE |
| 0293 66 | 785 | LR | IS,A | |
| 0294 48 | 786 | LR | A,8 | GET FLAGS |
| 0295 2340 | 787 | XI | H'40' | COMPLEMENT ODD DIGIT FLAG |
| 0297 58 | 788 | LR | 8,A | |
| 0298 2140 | 789 | NI | H'40' | ISOLATE FLAG - NOW REVERSED |
| 029A 8407 | 790 | BZ | GRGOOD | |
| 029C 4C | 791 | LR | A,IX | |
| 029D 14 | 792 | SR | 4 | |
| 029E 210F | 793 | NI | 15 | RIGHTIFY 4 BITS |
| 02A0 57 | 794 | LR | 7,A | |
| 02A1 1C | 795 | POP | | RETURN |
| 02A2 4C | 796 GRGOOD | LR | A,IX | |
| 02A3 210F | 797 | NI | 15 | |
| 02A5 57 | 798 | LR | 7,A | |
| 02A6 9093 | 799 | BR | RROM | RELOAD, RETURN FROM THERE |
| | 800 $TITLE ('SEARCH SETUP') | | | |
| 02A8 | 801 SSETUP* | LI | 19 | |
| 02A8 68 | 802 | LR | IS,A | |
| 02A9 70 | 803 | CLR | | |
| 02AA 5C | 804 | LR | IX,A | CLEAR MATCH FLAG |
| 02AB 48 | 805 | LR | A,8 | |
| 02AC 2102 | 806 | NI | 2 | |
| 02AE 941B | 807 | BNZ | SSBACK | BACKWARDS |
| 02B0 261F | 808 | LI | 31 | |
| 02B2 C6 | 809 | AS | 6 | |
| 02B3 6B | 810 | LR | IS,A | POINT TO 1ST CHAR |
| 02B4 4C | 811 | LR | A,IX | GET IT |
| 02B5 54 | 812 | LR | 4,A | |
| 02B6 2014 | 813 | LI | 20 | |
| 02B8 6B | 814 | LR | IS,A | |
| 02B9 2A06B5 | 815 | DCI | DIT | BASE OF INDEX TABLE |
| 02BC 44 | 816 | LR | A,4 | |
| 02BD 5C | 817 | LR | IX,A | SAVE 1ST LETTER IN ITS PLACE |
| 02BE 24BF | 818 | AI | H'BF' | CORRECT TO ZERO |
| 02C0 8E | 819 | ADC | | ADD 1ST LETTER |
| 02C1 8E | 820 | ADC | | TWICE |
| 02C2 2016 | 821 | LI | 22 | |
| 02C4 6B | 822 | LR | IS,A | |
| 02C5 16 | 823 | LM | | MSB OF INDEX |
| 02C6 5E | 824 | LR | IXD,A | |
| 02C7 16 | 825 | LM | | LSB |
| 02C8 5C | 826 | LR | IX,A | |
| 02C9 1C | 827 | POP | | |
| 02CA 2016 | 828 SSBACK | LI | 22 | |
| 02CC 6B | 829 | LR | IS,A | |
| 02CD 70 | 830 | CLR | | |
| 02CE 5E | 831 | LR | IXD,A | CLEAR ADDRESS |
| 02CF 5C | 832 | LR | IX,A | |
| 02D0 1C | 833 | POP | | |
| | 834 $TITLE ('MAIN IDLE LOOP') | | | |
| | 835 * | | | |
| | 836 * | | | |

```
02D1 1A       837 MAIN      DI
02D2 280117   838           PI    GETKEY
02D5 1B       839           EI
02D6 8404     840           BZ    MCON
02D8 2903B6   841           JMP   MKEYIN
02DB 48       842 MCON      LR    A,8    GET FLAGS
02DC 2101     843           NI    1
02DE 943B     844           BNZ   SCROLL IS SCROLL FLAG SET?
02E0 201E     845           LI    30     DELAY TEST - 4HZ TIKKER
02E2 0B       846           LR    IS,A
02E3 70       847           CLR
02E4 CC       848           AS    IX     IS 4HZ TIKKER A ZERO?
02E5 94EB     849           BNZ   MAIN
02E7 30       850           DS    IXL    YES => RESET IT
02E8 CC       851           AS    IX     IS DELAY ZERO?
02E9 84E7     852           BZ    MAIN   YES => IGNORE IT
02EB 3C       853           DS    IX     ELSE, DECREMENT IT
02EC 94E4     854           BNZ   MAIN   UNEXPIRED => CONTINUE
              855 *
02EE          856 FLASH*
              857 *
02EE 201E     858           LI    30
02F0 0B       859           LR    IS,A
02F1 70       860           CLR
02F2 CC       861           AS    IX     IS TIKKER = ZERO?
02F3 840B     862           BZ    FLNEXT
02F5 1A       863           DI
02F6 280117   864           PI    GETKEY IS A KEY IN?
02F9 1B       865           EI
02FA 84F3     866           BZ    FLASH
02FC 2903B6   867           JMP   MKEYIN YES => HANDLE IT
              868 *
02FF 1A       869 FLNEXT    DI
0300 280122   870           PI    CLDISP
0303 2018     871           LI    24
0305 0B       872           LR    IS,A
0306 4C       873           LR    A,IX
0307 3C       874           DS    IX     ADJUST TRAVELLING POS
0308 210F     875           NI    15
030A 50       876           LR    0,A    SET POSITION
030B 2001     877           LI    H'01'  DECIMAL POINT COMPLEMENT
030D B1       878           OUTS  1
030E 28010B   879           PI    DISPLY
0311 201E     880           LI    30
0313 0B       881           LR    IS,A
0314 2040     882           LI    64
0316 5C       883           LR    IX,A   LOAD TIKKER WITH 1/8 SEC
0317 1B       884           EI
0318 9005     885           BR    FLASH
              886 $TITLE ('SCROLL HANDLER')
              887 *
031A 201E     888 SCROLL    LI    30
031C 0B       889           LR    IS,A
031D 70       890           CLR
031E CC       891           AS    IX     GET 4HZ TIKKER
031F 217F     892           NI    H'7F'
0321 94AF     893           BNZ   MAIN
0323 1A       894           DI
0324 280256   895           PI    GETROM
0327 1B       896           EI
0328 70       897           CLR
0329 C7       898           AS    7      IS CHAR = WORD MARK?
032A 840D     899           BZ    SWM
032C 47       900           LR    A,7    NEW CHAR
032D 1A       901           DI
032E 50       902           LR    0,A    FOR SHIFT
```

| | | | | | |
|---|---|---|---|---|---|
| 032F 280179 | 903 | | PI | SHIFT | INSERT IT INTO IMAGE |
| 0332 280134 | 904 | | PI | COPY | DISPLAY IT |
| 0335 1B | 905 | | EI | | |
| 0336 909A | 906 MAIN2 | BR | MAIN | | |
| | 907 * | | | | |
| 0338 2020 | 908 SWM | LI | H'20' | SCROLL WORD MARK | |
| 033A 50 | 909 | | LR | 8,A | |
| 033B 1A | 910 | | DI | | |
| 033C 280179 | 911 | | PI | SHIFT | SHIFT A SPACE INTO IMAGE |
| 033F 280134 | 912 | | PI | COPY | DISPLAY IT |
| 0342 1B | 913 | | EI | | |
| 0343 2017 | 914 | | LI | 23 | GET TOTAL WORD COUNT |
| 0345 0B | 915 | | LR | IS,A | |
| 0346 4C | 916 | | LR | A,IX | |
| 0347 54 | 917 | | LR | 4,A | |
| 0348 2012 | 918 | | LI | 18 | |
| 034A 0B | 919 | | LR | IS,A | POINT TO WORD POINTER |
| 034B 4C | 920 | | LR | A,IX | |
| 034C 1F | 921 | | INC | | BUMP IT |
| 034D 5C | 922 | | LR | IX,A | |
| 034E E4 | 923 | | XS | 4 | HAVE ALL BEEN DISPLAYED |
| 034F 8420 | 924 | | BZ | SEOP | ZERO => END OF PASS |
| 0351 77 | 925 | | LIS | 7 | |
| 0352 FC | 926 | | NS | IX | |
| 0353 841C | 927 | | BZ | SEOP | HAS ENTRY #7 BEEN DISPLAYED? |
| 0355 2030 | 928 NEWSC | LI | 48 | BASE OF WORD POINTERS | |
| 0357 CC | 929 | | AS | IX | |
| 0358 CC | 930 | | AS | IX | ADD WORD POINTER TWICE |
| 0359 0B | 931 | | LR | IS,A | |
| 035A 1A | 932 | | DI | | |
| 035B 280225 | 933 | | PI | ROMADD | SET UP ROM ADDRESS IN PORTS |
| 035E 1B | 934 | | EI | | |
| 035F 48 | 935 SLANG | LR | A,8 | | |
| 0360 2104 | 936 | | NI | 4 | IS PASS =1? |
| 0362 8403 | 937 | | BZ | MAIN2 | YES => LOOP |
| | 938 * | | | | NO => SCAN PAST WORD MARK |
| 0364 1A | 939 SSCAN | DI | | | |
| 0365 280256 | 940 | | PI | GETROM | SCROLL SCAN |
| 0368 1B | 941 | | EI | | |
| 0369 70 | 942 | | CLR | | |
| 036A C7 | 943 | | AS | 7 | IS IT A WORD MARK? |
| 036B 94F8 | 944 | | BNZ | SSCAN | |
| 036D 290201 | 945 | | JMP | MAIN | |
| | 946 * | | | | |
| 0370 5C | 947 SEOP | LR | IX,A | CLEAR WORD NUMBER | |
| 0371 2030 | 948 | | LI | 48 | |
| 0373 0B | 949 | | LR | IS,A | POINT AT 1ST ONE |
| 0374 1A | 950 | | DI | | |
| 0375 280225 | 951 | | PI | ROMADD | SET UP ADDRESS |
| 0378 1B | 952 | | EI | | |
| 0379 74 | 953 | | LIS | 4 | PASS FLAG MASK |
| 037A E8 | 954 | | XS | 8 | COMPLEMENT PASS FLAG |
| 037B 58 | 955 | | LR | 8,A | |
| 037C 2104 | 956 | | NI | 4 | ISOLATE PASS FLAG |
| 037E 12 | 957 | | SR | 1 | |
| 037F 54 | 958 | | LR | 4,A | |
| 0380 48 | 959 | | LR | A,8 | |
| 0381 2102 | 960 | | NI | 2 | ISOLATE SOURCE FLAG |
| 0383 E4 | 961 | | XS | 4 | ARE THEY =? |
| 0384 9408 | 962 | | BNZ | EQUAL | YES => END OF SCROLL |
| | 963 | | | | |
| 0386 48 | 964 | | LR | A,8 | FLAGS |
| 0387 21FE | 965 | | NI | H'FE' | RESET SCROLL FLAG |
| 0389 58 | 966 | | LR | 8,A | |
| 038A 290416 | 967 | | JMP | DELAY | |
| | 968 * | | | | |

```
038D 201E    969 EQUAL   LI     30
038F 0B      970         LR     IS,A
0390 70      971         CLR
0391 CC      972         AS     IX
0392 94FA    973         BNZ    EQUAL
0394 2C      974         DS     IX
0395 1A      975         DI
0396 2030    976         LI     H'30'   EQUALS SIGN
0398 50      977         LR     0,A
0399 280179  978         PI     SHIFT
039C 280134  979         PI     COPY
039F 1B      980         EI
03A0 201E    981 EQSP    LI     30
03A2 0B      982         LR     IS,A
03A3 70      983         CLR
03A4 CC      984         AS     IX
03A5 94FA    985         BNZ    EQSP
03A7 2C      986         DS     IX
03A8 1A      987         DI
03A9 2020    988         LI     H'20'   SPACE
03AB 50      989         LR     0,A
03AC 280179  990         PI     SHIFT
03AF 280134  991         PI     COPY
03B2 1B      992         EI
03B3 29035F  993         JMP    SLANG
             994 $TITLE ('KEY ENTERED')
03B6 203C    995 MKEYIN  LI     H'3C'
03B8 E3      996         XS     3       IS KEY = BACKSPACE?
03B9 9404    997         BNZ    MKC7
03BB 29043F  998         JMP    KBS
03BE 48      999 MKC7    LR     A,8
03BF 217F    1000        NI     H'7F'   RESET CLEARED FLAG
03C1 58      1001        LR     8,A
03C2 203A    1002        LI     H'3A'
03C4 E3      1003        XS     3       IS KEY = FUNCTION?
03C5 9404    1004        BNZ    MKCON
03C7 29046F  1005        JMP    KFUNC
03CA 2038    1006 MKCON  LI     H'38'
03CC E3      1007        XS     3       IS KEY = STEP?
03CD 9404    1008        BNZ    MKC3
03CF 290498  1009        JMP    KSTEP
03D2 2030    1010 MKC3   LI     H'30'
03D4 E3      1011        XS     3       IS KEY = DEFINE?
03D5 9404    1012        BNZ    MKC2
03D7 290572  1013        JMP    KXLAT
03DA 48      1014 MKC2   LR     A,8     TRANS FLAG => EXIT
03DB 2110    1015        NI     H'10'
03DD 8404    1016        BZ     MKC6
03DF 290201  1017        JMP    MAIN
03E2 48      1018 MKC6   LR     A,8     RESET SCROLL FLAG
03E3 21FE    1019        NI     H'FE'
03E5 58      1020        LR     8,A
03E6 203F    1021        LI     H'3F'
03E8 E3      1022        XS     3       IS KEY = QUERY?
03E9 9404    1023        BNZ    MKC5
03EB 29054E  1024        JMP    KQUERY
03EE 48      1025 MKC5   LR     A,8
03EF 2120    1026        NI     H'20'   WERE WE QUERIED?
03F1 9434    1027        BNZ    MKQ
03F3 70      1028 MKC4   CLR
03F4 06      1029        AS     6       GET CHAR COUNT
03F5 9429    1030        BNZ    MCHECK
03F7 48      1031        LR     A,8
03F8 214F    1032        NI     H'4F'   CLEAR TRANS FLAG
             1033 *                     CLEARED FLAG
             1034 *                     AND QUERY FLAG
```

| | | | | |
|---|---|---|---|---|
| 03FA 58 | 1035 | LR | 8,A | |
| 03FB 2102 | 1036 | NI | 2 | ISOLATE SOURCE |
| 03FD 13 | 1037 | SL | 1 | |
| 03FE 54 | 1038 | LR | 4,A | |
| 03FF 20FB | 1039 | LI | H'FB' | |
| 0401 F8 | 1040 | NS | 8 | TURN OFF OLD PASS FLAG |
| 0402 C4 | 1041 | AS | 4 | COPY SOURCE FLAG IN |
| 0403 58 | 1042 | LR | 8,A | PUT 'EM BACK |
| 0404 1A | 1043 | DI | | |
| 0405 28014D | 1044 | PI | CLIMAG | CLEAR IMAGE |
| 0408 1B | 1045 | EI | | |
| 0409 46 | 1046 MK1 | LR | A,6 | |
| 040A 1F | 1047 | INC | | INCREMENT CHAR COUNT |
| 040B 56 | 1048 | LR | 6,A | |
| 040C 43 | 1049 MK2 | LR | A,3 | CURRENT CHAR |
| 040D 50 | 1050 | LR | 0,A | |
| 040E 1A | 1051 | DI | | |
| 040F 280179 | 1052 | PI | SHIFT | |
| 0412 280134 | 1053 | PI | COPY | |
| 0415 1B | 1054 | EI | | |
| 0416 201F | 1055 DELAY | LI | 31 | |
| 0418 0B | 1056 | LR | IS,A | |
| 0419 201E | 1057 | LI | 30 | |
| 041B 5C | 1058 | LR | IX,A | SET DELAY TO 30 SEC |
| 041C 2903D1 | 1059 | JMP | MAIN | |
| 041F 46 | 1060 MCHECK | LR | A,6 | CHAR COUNT |
| 0420 2110 | 1061 | NI | 16 | |
| 0422 84E6 | 1062 | BZ | MK1 | |
| 0424 90E7 | 1063 | BR | MK2 | |
| 0426 2017 | 1064 MK0 | LI | 23 | |
| 0428 0B | 1065 | LR | IS,A | |
| 0429 4C | 1066 | LR | A,IX | GET WORD COUNT |
| 042A 2108 | 1067 | NI | 8 | |
| 042C 8404 | 1068 | BZ | MKOCON | 8 WORDS IN? |
| 042E 2904E3 | 1069 | JMP | KFULL | YES => SENTENCE FULL |
| 0431 4C | 1070 MKOCON | LR | A,IX | |
| 0432 1F | 1071 | INC | | |
| 0433 54 | 1072 | LR | 4,A | |
| 0434 5C | 1073 | LR | IX,A | |
| 0435 2012 | 1074 | LI | 18 | |
| 0437 0B | 1075 | LR | IS,A | |
| 0438 44 | 1076 | LR | A,4 | |
| 0439 5C | 1077 | LR | IX,A | BUMP COUNT OF WORDS |
| 043A 70 | 1078 | CLR | | |
| 043B 56 | 1079 | LR | 6,A | CLEAR CHAR COUNT |
| 043C 2903F3 | 1080 | JMP | MKC4 | DO THE NEW CHAR |
| | 1081 $TITLE ('BACKSPACE ') | | | |
| 043F 48 | 1082 KBS | LR | A,8 | |
| 0440 2180 | 1083 | NI | H'80' | IS CLEARED FLAG SET? |
| 0442 941C | 1084 | BNZ | COMPL | |
| 0444 48 | 1085 | LR | A,8 | |
| 0445 2110 | 1086 | NI | H'10' | TRANS FLAG? |
| 0447 9414 | 1087 | BNZ | MAINY | |
| 0449 2020 | 1088 | LI | H'20' | A SPACE |
| 044B 50 | 1089 | LR | 0,A | |
| 044C 1A | 1090 | DI | | |
| 044D 28019F | 1091 | PI | ROTATE | ROTATE DISPLAY RIGHT |
| 0450 280134 | 1092 | PI | COPY | |
| 0453 1B | 1093 | EI | | |
| 0454 70 | 1094 | CLR | | |
| 0455 C6 | 1095 | AS | 6 | GET CHAR COUNT |
| 0456 8402 | 1096 | BZ | MAINX | |
| 0458 36 | 1097 | DS | 6 | DECREMENT COUNT |
| 0459 290416 | 1098 MAINX | JMP | DELAY | |
| 045C 2903D1 | 1099 MAINY | JMP | MAIN | |

| Addr | Code | Line | | Op | Operand | Comment |
|---|---|---|---|---|---|---|
| 045F | 48 | 1100 | COMPL | LR | A,8 | |
| 0460 | 2202 | 1101 | | XI | 2 | COMPLEMENT SOURCE FLAG |
| 0462 | 50 | 1102 | | LR | 8,A | |
| 0463 | 13 | 1103 | | SL | 1 | |
| 0464 | 2104 | 1104 | | NI | 4 | |
| 0466 | 54 | 1105 | | LR | 4,A | |
| 0467 | 20FB | 1106 | | LI | H'FB' | TURN OFF OLD PASS FLAG |
| 0469 | F8 | 1107 | | NS | 8 | |
| 046A | C4 | 1108 | | AS | 4 | |
| 046B | 50 | 1109 | | LR | 8,A | COPY SOURCE TO PASS FLAG |
| 046C | 290009 | 1110 | | JMP | START | |
| | | 1111 | $TITLE ('FUNCTION KEY - PROMO') | | | |
| 046F | | 1112 | KFUNC* | JMP | DEBUG | |
| 046F | 1A | 1113 | | DI | | |
| 0470 | 28014D | 1114 | | PI | CLIMAG | START WITH A CLEAN SCREEN |
| 0473 | 1B | 1115 | | EI | | |
| 0474 | 2A06F9 | 1116 | KFUN1 | DCI | PROMO | |
| 0477 | 1A | 1117 | KFLOOP | DI | | |
| 0478 | 280117 | 1118 | | PI | GETKEY | ANY KEYS? |
| 047B | 1B | 1119 | | EI | | |
| 047C | 8404 | 1120 | | BZ | KFCON | |
| 047E | 2903B6 | 1121 | | JMP | HKEYIN | YES => HANDLE THEM |
| 0481 | 201E | 1122 | KFCON | LI | 30 | |
| 0483 | 06 | 1123 | | LR | IS,A | GET 4HZ TIKKER |
| 0484 | 70 | 1124 | | CLR | | |
| 0485 | CC | 1125 | | AS | IX | |
| 0486 | 217F | 1126 | | NI | H'7F' | |
| 0488 | 94EE | 1127 | | BNZ | KFLOOP | |
| 048A | 3C | 1128 | | DS | IX | CHANGE TIKKER |
| 048B | 16 | 1129 | | LM | | GET NEXT BYTE |
| 048C | 2200 | 1130 | | OI | 0 | |
| 048E | 84E5 | 1131 | | BZ | KFUN1 | END => START OVER |
| 0490 | 1A | 1132 | | DI | | |
| 0491 | 50 | 1133 | | LR | 8,A | |
| 0492 | 280179 | 1134 | | PI | SHIFT | |
| 0495 | 280124 | 1135 | | PI | COPY | |
| 0498 | 1B | 1136 | | EI | | |
| 0499 | 9000 | 1137 | | BR | KFLOOP | |
| | | 1138 | $TITLE ('STEP') | | | |
| | | 1139 | * | | | |
| 049B | | 1140 | KSTEP* | | | |
| | | 1141 | * | | | |
| 049B | 48 | 1142 | | LR | A,8 | GET FLAGS 1 |
| 049C | 21FE | 1143 | | NI | H'FE' | RESET SCROLL FLAG |
| 049E | 50 | 1144 | | LR | 8,A | |
| 049F | 2110 | 1145 | | NI | H'10' | IS TRANS FLAG SET? |
| 04A1 | 8404 | 1146 | | BZ | KSTCON | |
| 04A3 | 290525 | 1147 | | JMP | KSTRAN | |
| 04A6 | 48 | 1148 | KSTCON | LR | A,8 | |
| 04A7 | 2120 | 1149 | | NI | H'20' | IS QUERY FLAG SET? |
| 04A9 | 9446 | 1150 | | BNZ | KSQURY | |
| 04AB | 70 | 1151 | | CLR | | |
| 04AC | C6 | 1152 | | AS | 6 | CHAR COUNT |
| 04AD | 8442 | 1153 | | BZ | NOTFND | |
| 04AF | 1A | 1154 | | DI | | |
| 04B0 | 2A09FB | 1155 | | DCI | MESS5 | |
| 04B3 | 2801A7 | 1156 | | PI | MESSAG | |
| 04B6 | 2802A9 | 1157 | | PI | SSETUP | SET UP STORAGE AND PORTS |
| 04B9 | 2805D9 | 1158 | | PI | SEARCH | |
| 04BC | 1B | 1159 | | EI | | |
| 04BD | 2013 | 1160 | | LI | 19 | GET FLAGS 2 |
| 04BF | 0B | 1161 | | LR | IS,A | |
| 04C0 | 4E | 1162 | | LR | A,IXD | |
| 04C1 | 2102 | 1163 | | NI | 2 | |
| 04C3 | 842C | 1164 | | BZ | NOTFND | NO MATCH? |
| 04C5 | 1A | 1165 | | DI | | |

| | | | | | |
|---|---|---|---|---|---|
| 04C6 28020F | 1166 | | PI | SAVPNT | SAVE POINTER IN TABLE |
| 04C9 280134 | 1167 | | PI | COPY | |
| 04CC 1B | 1168 | | EI | | |
| 04CD 2017 | 1169 | | LI | 23 | |
| 04CF 0B | 1170 | | LR | IS,A | |
| 04D0 4C | 1171 | | LR | A,IX | GET WORD # |
| 04D1 2103 | 1172 | | NI | 8 | IS IT 8? |
| 04D3 940F | 1173 | | BNZ | KFULL | |
| 04D5 4C | 1174 | | LR | A,IX | |
| 04D6 1F | 1175 | | INC | | |
| 04D7 54 | 1176 | | LR | 4,A | |
| 04D8 5C | 1177 | | LR | IX,A | |
| 04D9 2012 | 1178 | | LI | 18 | |
| 04DB 0B | 1179 | | LR | IS,A | |
| 04DC 44 | 1180 | | LR | A,4 | |
| 04DD 5C | 1181 | | LR | IX,A | BUMP IT |
| 04DE 70 | 1182 | | CLR | | |
| 04DF 56 | 1183 | | LR | 6,A | CLEAR CHAR COUNT |
| 04E0 290416 | 1184 | | JMP | DELAY | |
| | 1185 | * | | | |
| 04E3 2A0806 | 1186 KFULL | | DCI | MESS1 | DISPLAY 'FULL SENTENCE' |
| 04E6 1A | 1187 KF1 | | DI | | |
| 04E7 2801A7 | 1188 | | PI | MESSAG | |
| 04EA 1B | 1189 | | EI | | |
| 04EB 70 | 1190 | | CLR | | |
| 04EC 56 | 1191 | | LR | 6,A | CLEAR CHAR COUNT |
| 04ED 290416 | 1192 | | JMP | DELAY | |
| | 1193 | * | | | |
| 04F0 2A02FB | 1194 NOTFND | | DCI | MESS2 | DISPLAY 'NOT FOUND' |
| 04F3 90F2 | 1195 | | BR | KF1 | |
| | 1196 | * | | | |
| 04F5 2013 | 1197 KSQURY | | LI | 19 | |
| 04F7 0B | 1198 | | LR | IS,A | GET FLAGS 2 |
| 04F8 4C | 1199 | | LR | A,IX | |
| 04F9 2201 | 1200 | | OI | 1 | SET QUERY STEPPED FLAG |
| 04FB 5C | 1201 | | LR | IX,A | |
| 04FC 1A | 1202 KSQ | | DI | | |
| 04FD 2A09FB | 1203 | | DCI | MESS5 | |
| 0500 2801A7 | 1204 | | PI | MESSAG | |
| 0503 280509 | 1205 | | PI | SEARCH | |
| 0506 1B | 1206 | | EI | | |
| 0507 2013 | 1207 | | LI | 19 | |
| 0509 0B | 1208 | | LR | IS,A | GET FLAGS 2 |
| 050A 4C | 1209 | | LR | A,IX | |
| 050B 2102 | 1210 | | NI | 2 | MATCH |
| 050D 8411 | 1211 | | BZ | KSQNOT | |
| 050F 1A | 1212 | | DI | | |
| 0510 28020F | 1213 | | PI | SAVPNT | SAVE POINTER IN WORD TABLE |
| 0513 2801F8 | 1214 | | PI | GETADD | |
| 0516 280122 | 1215 | | PI | CLDISP | CLEAR DISPLAY |
| 0519 280158 | 1216 | | PI | DWORD | DISPLAY FOUND WORD |
| 051C 290416 | 1217 | | JMP | DELAY | |
| | 1218 | * | | | |
| 051F 48 | 1219 KSQNOT | | LR | A,8 | |
| 0520 21DF | 1220 | | NI | H'DF' | RESET QUERY FLAG |
| 0522 58 | 1221 | | LR | 8,A | |
| 0523 90CC | 1222 | | BR | NOTFND | DISPLAY 'NOT FOUND' |
| | 1223 | * | | | |
| 0525 1A | 1224 KSTRAN | | DI | | |
| 0526 2801B8 | 1225 | | PI | DWORD | |
| 0529 1B | 1226 | | EI | | |
| 052A 2012 | 1227 | | LI | 18 | |
| 052C 0B | 1228 | | LR | IS,A | |
| 052D 4C | 1229 | | LR | A,IX | GET WORD # |
| 052E 2207 | 1230 | | XI | 7 | IS IT 7? |

```
0530 8411    1231         BZ    KSEOP   YES => END OD PASS
0532 4C      1232         LR    A,IX    INCREMENT WORD #
0533 1F      1233         INC
0534 2107    1234         NI    7
0536 5C      1235         LR    IX,A
0537 54      1236         LR    4,A
0538 2017    1237         LI    23      GET TOTAL WORDS
053A 02      1238         LR    IS,A
053B 4C      1239         LR    A,IX
053C E4      1240         XS    4
053D 8404    1241         BZ    KSEOP
053F 290416  1242         JMP   DELAY
             1243  *
0542 2012    1244  KSEOP  LI    18
0544 0E      1245         LR    IS,A
0545 70      1246         CLR
0546 5C      1247         LR    IX,A    CLEAR WORD #
0547 48      1248         LR    A,8
0548 2204    1249         XI    4       COMPLEMENT PASS FLAG
054A 58      1250         LR    8,A
054B 290416  1251         JMP   DELAY
             1252  $TITLE ('QUERY')
             1253  *
054E         1254  KQUERY*
             1255  *
054E 48      1256         LR    A,8     GET FLAGS 1
054F 2120    1257         NI    H'20'   IS QUERY FLAG ALREADY SET?
0551 9410    1258         BNZ   KQTRAN  YES => DISPLAY TRANSLATION
0553 70      1259         CLR
0554 06      1260         AS    6
0555 849A    1261         BZ    NOTFND  NO CHARS
0557 48      1262         LR    A,8
0558 2220    1263         OI    H'20'   SET FLAG
055A 58      1264         LR    8,A
055B 1A      1265         DI
055C 2803A3  1266         PI    SSETUP  SET UP PORTS AND STORAGE
055F 1B      1267         EI
0560 9699    1268         BR    KSQ
             1269  *
0562 48      1270  KQTRAN LR    A,8
0563 2204    1271         XI    4       COMPLEMENT PASS FLAG
0565 58      1272         LR    8,A
0566 1A      1273         DI
0567 2801B8  1274         PI    DWORD   DISPLAY THAT WORD
056A 1B      1275         EI
056B 48      1276         LR    A,8
056C 2204    1277         XI    4       RESTORE PASS FLAG
056E 58      1278         LR    8,A
056F 290416  1279         JMP   DELAY
             1280  $TITLE ('DEFINE ENTRY')
             1281  *
             1282  *
0572         1283  KXLAT*
             1284  *
             1285  *
0572 48      1286         LR    A,8     GET FLAGS1
0573 2110    1287         NI    H'10'   IS TRANSLATION FLAG SET?
0575 9445    1288         BNZ   KXSPRL
0577 48      1289         LR    A,8
0578 2120    1290         NI    H'20'   WERE WE QUERIED?
057A 942E    1291         BNZ   KXQ
057C 70      1292         CLR
057D 06      1293         AS    6       CHAR COUNT
057E 8437    1294         BZ    KXOLD
0580 1A      1295         DI
0581 2802A3  1296         PI    SSETUP  SET UP PORTS AND STORAGE
```

```
0584 1A      1297 KYSER    DI
0585 2A09FE  1298         PCI    MESS5
0588 2901A7  1299         PI     MESSAG
058B 299509  1300         PI     SEARCH
058E 1B      1301         EI
058F 2013    1302         LI     19
0591 08      1303         LR     IS,A      POINT TO FLAGS 2
0592 4C      1304         LR     A,IX
0593 2102    1305         NI     2         IS MATCH FLAG SET?
0595 9404    1306         BNZ    KYSCON
0597 2904F8  1307         JMP    NOTFND    DISPLAY NOT FOUND AND
             1308 *                        CLEAR CHAR COUNT
0599 2017    1309 KYSCON  LI     23
059C 08      1310         LR     IS,A
059D 4C      1311         LR     A,IX
059E 1F      1312         INC
059F 5C      1313         LR     IX,A
05A0 1A      1314         DI
05A1 2920AF  1315         PI     SAVPNT
05A4 2D0134  1316         PI     COPY
05A7 1B      1317         EI
05A8 9017    1318         BR     IXOCON
             1319 *
05AA 2017    1320 KXD     LI     23
05AC 08      1321         LR     IS,A
05AD 4C      1322         LR     A,IX
05AE 1F      1323         INC
05AF 54      1324         LR     4,A
05B0 5C      1325         LR     IX,A
05B1 2012    1326         LI     18
05B2 08      1327         LR     IS,A
05B4 44      1328         LR     A,4
05B5 5C      1329         LR     IX,A
05B6         1330 KXDLD
05B6 2017    1331         LI     23
05B8 08      1332         LR     IS,A
05B9 70      1333         CLR
05BA CC      1334         AS     IX
05BB 9404    1335         BNZ    IXOCON
05BC 2321F0  1336         JMP    NOTFND
05C0         1337 IXOCON
05C0 48      1338         LR     A,8
05C1 2210    1339         OI     H'10'     SET TRANSLATION FLAG
05C3 58      1340         LR     8,A
             1341 *
05C4 48      1342 KYSERL  LR     A,8
05C5 2201    1343         OI     1         SET SCROLL FLAG
05C7 58      1344         LR     8,A
05C8 2012    1345         LI     18
05CA 08      1346         LR     IS,A
05CB 70      1347         CLR
05CC 5C      1348         LR     IX,A      CLEAR WORD POINTER
05CD 56      1349         LR     6,A       CLEAR CHAR COUNT
05CE 1A      1350         DI
05CF 290140  1351         PI     CLIMAG
05D2 1B      1352         EI
05D3 2012    1353         LI     18
05D5 08      1354         LR     IS,A
05D6 290355  1355         JMP    NEWSC     NEW SCROLL
             1356 *
             1357 *
             1358 $TITLE ('SEARCH ROUTINE')
             1359 *
             1360 *
05D9         1361 SEARCH DICTIONARY, STARTING AT THE CONTENTS OF 2122, FOR
             1362 *      CHAR-COUNT CHARACTERS WHICH MATCH THE
```

|        |        | 1263 * |       | RIGHT JUSTIFIED ARGUMENT IN IMAGE |                              |
|--------|--------|--------|-------|-----------------------------------|------------------------------|
|        |        | 1264 * |       |                                   |                              |
|        |        | 1265 * |       |                                   |                              |
| 05D8   | 08     | 1266   | LR    | K,P                               | SAVE RETURN ADDRESS          |
| 05D9   | 00     | 1267   | LR    | A,KU                              | IN A SAFE PLACE              |
| 05DA   | 06     | 1268   | LR    | QU,A                              |                              |
| 05DC   | 01     | 1269   | LR    | A,KL                              |                              |
| 05DD   | 07     | 1270   | LR    | QL,A                              |                              |
| 05DE   | 2013   | 1271   | LI    | 19                                |                              |
| 05E0   | 08     | 1272   | LR    | IS,A                              |                              |
| 05E1   | 4C     | 1273   | LR    | A,IX                              |                              |
| 05E2   | 21FC   | 1274   | NI    | H'FC'                             | CLEAR SEARCH RESULT FLAGS    |
| 05E4   | 5C     | 1275   | LR    | IX,A                              |                              |
| 05E5   | 2015   | 1276   | LI    | 21                                |                              |
| 05E7   | 0B     | 1277   | LR    | IS,A                              |                              |
| 05E8   | 280225 | 1278   | PI    | POMADD                            | LOAD STARTING ADDRESS INTO PORTS |
| 05EB   | 70     | 1279   | CLR   |                                   |                              |
| 05EC   | C6     | 1280   | AS    | 6                                 | IS COUNT = 0?                |
| 05ED   | 8417   | 1281   | BZ    | SEXIT                             | YES => NO MATCH              |
| 05EF   | 55     | 1282   | LR    | 5,A                               | SAVE CHARACTER COUNT         |
| 05F0   | 241F   | 1283   | AI    | 31                                |                              |
| 05F2   | 54     | 1284   | LR    | 4,A                               | SEARCH IMAGE POINTER         |
| 05F3   | 48     | 1285   | LR    | A,8                               |                              |
| 05F4   | 2102   | 1286   | NI    | 2                                 |                              |
| 05F6   | 940F   | 1287   | BNZ   | SEACK                             |                              |
| 05F8   | 2001F0 | 1288 SFORD | PI | GETADD                          | SAVE CURRENT ROM ADDRESS     |
| 05FB   | 280256 | 1289   | PI    | GETROM                            | GET NEXT BYTE                |
| 05FE   | 2014   | 1290   | LI    | 20                                |                              |
| 0600   | 08     | 1291   | LR    | IS,A                              |                              |
| 0601   | 4C     | 1292   | LR    | A,IX                              | GET 1ST LETTER               |
| 0602   | E7     | 1293   | XS    | 7                                 | IS IT = LATEST ROM?          |
| 0603   | 8416   | 1294   | BZ    | FINDX                             |                              |
| 0605   | 0D     | 1295 SEXIT | LR | F0,Q                            | EXIT                         |
|        |        | 1296 * |       |                                   |                              |
| 0606   | 2201F0 | 1297 SEACK | PI | GETADD                          | SAVE CURRENT ROM ADDRESS     |
| 0609   | 280256 | 1298   | PI    | GETROM                            | GET NEXT ROM CHAR            |
| 060C   | 70     | 1299   | CLR   | A                                 |                              |
| 060D   | C7     | 1400   | AS    | 7                                 | WORD MARK?                   |
| 060E   | 84F6   | 1401   | BZ    | SEXIT                             |                              |
| 0610   | 280256 | 1402 SPSCAN | PI | GETROM                         | SCAN PAST NEXT WORD MARK     |
| 0613   | 70     | 1403   | CLR   | A                                 |                              |
| 0614   | C7     | 1404   | AS    | 7                                 |                              |
| 0615   | 945A   | 1405   | BNZ   | SPSCAN                            |                              |
|        |        | 1406 * |       |                                   |                              |
|        |        | 1407 * |       |                                   |                              |
|        |        | 1408 * |       | SEARCH - MAIN LOOP                |                              |
|        |        | 1409 * |       |                                   |                              |
|        |        | 1410 * |       |                                   |                              |
| 0617   |        | 1411 FINDIT |  |                                   |                              |
|        |        | 1412 * |       |                                   |                              |
|        |        | 1413 * |       |                                   |                              |
| 0617   | 280256 | 1414   | PI    | GETROM                            | GET NEXT ROM CHAR            |
| 061A   | 70     | 1415 FINDX | CLR |                                 |                              |
| 061B   | C7     | 1416   | AS    | 7                                 | WORD MARK?                   |
| 061C   | 8414   | 1417   | BZ    | NEXTWD                            | YES => CHECK FOR NEXT WORD   |
| 061E   | 41     | 1418   | LR    | A,1                               | CURRENT IMAGE POINTER        |
| 061F   | 0B     | 1419   | LR    | IS,A                              |                              |
| 0620   | 4C     | 1420   | LR    | A,IX                              | GET NEXT IMAGE CHAR          |
| 0621   | E7     | 1421   | XS    | 7                                 | EQUAL ROM?                   |
| 0622   | 9407   | 1422   | BNZ   | NOMAT                             |                              |
| 0624   | 31     | 1423   | DS    | 1                                 | DECREMENT IMAGE POINTER      |
| 0625   | 35     | 1424   | DS    | 5                                 | DECREMENT THIS CHAR COUNT    |
| 0626   | 94F0   | 1425   | BNZ   | FINDIT                            |                              |
|        |        | 1426 * |       |                                   |                              |
|        |        | 1427 * |       |                                   |                              |
| 0628   | 9022   | 1428   | BR    | SMATCH                            |                              |

```
             1429 *
862A 280256  1430 NOMAT   PI     GETROM
862D 70      1431         CLR
862E C7      1432         AS     7
862F 94FA    1433         BNZ    NOMAT    SCAN PAST WORD MARK
8631 48      1434 NEXTRD  LR     A,8       FLAGS1
8632 2102    1435         NI     2
8634 940F    1436         BNZ    NEXTBK
8636 280256  1437 NXSCAN  PI     GETROM
8639 70      1438         CLR
863A C7      1439         AS     7
863B 94FA    1440         BNZ    NXSCAN   SCAN PAST WORD MARK
863D 46      1441         LR     A,6
863E 55      1442         LR     5,A      CURRENT CHAR COUNT
863F 241F    1443         AI     31
8641 51      1444         LR     1,A      IMAGE POINTER
8642 9085    1445         BR     SFORD
             1446 *
8644 46      1447 NEXTBK  LR     A,6
8645 55      1448         LR     5,A      CURRENT CHAR COUNT
8646 241F    1449         AI     31
8648 51      1450         LR     1,A      IMAGE POINTER
8649 908C    1451         BR     SBACK
             1452 *
864B 48      1453 SMATCH  LR     A,8      FLAGS1
864C 2120    1454         NI     H'20'    QUERY?
864E 941F    1455         BNZ    SQRY
8650 280256  1456         PI     GETROM   GET NEXT ROM CHAR
8653 70      1457         CLR
8654 C7      1458         AS     7
8655 8420    1459         BZ    SOK       END OF WORD & IMAGE => OK
8657 9002    1460         BR    NOMAT     NOT ENOUGH IMAGE
8659 280256  1461 SM1     PI    GETROM
865C 70      1462         CLR
865D C7      1463         AS    7
865E 94FA    1464         BNZ   SM1       SCAN PAST WORD MARK
8660 48      1465 SM2     LR    A,8
8661 2102    1466         NI    2         BACKWARD?
8663 9408    1467         BNZ   SMEXIT    YES => EXIT
8665 280256  1468 SOK     PI    GETROM
8668 70      1469         CLR
8669 C7      1470         AS    7
866A 94FA    1471         BNZ   SOK       SCAN PAST WORD MARK
866C 00      1472 SMEXIT  LR    P0,Q      EXIT
             1473 *
866D 2013    1474 SQRY    LI    19
866F 68      1475         LR    IS,A
8670 4C      1476         LR    A,IX
8671 2202    1477         OI    2
8672 5C      1478         LR    IX,A      SET MATCH FLAG
8674 90E4    1479         BR    SM1
             1480 *
8676 2013    1481 SOK     LI    19
8678 68      1482         LR    IS,A
8679 4C      1483         LR    A,IX
867A 2202    1484         OI    2
867C 5C      1485         LR    IX,A      SET MATCH FLAG
867D 90E2    1486         BR    SM2
             1487 $TITLE ('SPANISH ROM TABLES')
             1488 *
             1489 *
             1490 *       MULTIPLE CHARACTER TABLE
             1491 *
867F 4845    1492 MCT     DC    HL2'4845'    FD - 29 -HE
8681 4348    1493         DC    HL2'4348'    FE - 30 -CH
8683 5645    1494         DC    HL2'5645'    FF - 31 -YE
```

```
                1495 *
                1496 *      ROM TRANSLATE TABLE    CODE    CHAR
                1497 *
0685 00         1498 ROMTT  DC      H'00'          0       - ALWAYS WORD MARK
0686 45         1499        DC      H'45'          1       E
0687 41         1500        DC      H'41'          2       A
0688 4F         1501        DC      H'4F'          3       O
0689 52         1502        DC      H'52'          4       R
068A 49         1503        DC      H'49'          5       I
068B 54         1504        DC      H'54'          6       T
068C 53         1505        DC      H'53'          7       S
068D 4E         1506        DC      H'4E'          8       N
068E 4C         1507        DC      H'4C'          9       L
068F 43         1508        DC      H'43'          10      C
0690 44         1509        DC      H'44'          11      D
0691 55         1510        DC      H'55'          12      U
0692 4D         1511        DC      H'4D'          13      M
0693 50         1512        DC      H'50'          14      P
0694 80         1513        DC      H'80'          15      - ALWAYS EXTENSION FLAG
0695 48         1514 ROMEXT DC      H'48'          F0      H
0696 20         1515        DC      H'20'          F1      SPACE
0697 42         1516        DC      H'42'          F2      B
0698 47         1517        DC      H'47'          F3      G
0699 59         1518        DC      H'59'          F4      Y
069A 46         1519        DC      H'46'          F5      F
069B 56         1520        DC      H'56'          F6      V
069C 57         1521        DC      H'57'          F7      W
069D 4B         1522        DC      H'4B'          F8      K
069E 4A         1523        DC      H'4A'          F9      J
069F 51         1524        DC      H'51'          FA      Q
06A0 5A         1525        DC      H'5A'          FB      Z
06A1 58         1526        DC      H'58'          FC      X
06A2 FF         1527        DC      H'FF'          FD      NOT FLAG
06A3 FF         1528        DC      H'FF'          FE      NOT FLAG
06A4 FF         1529        DC      H'FF'          FF      NOT FLAG
                1530 *TITLE ' '
                1531 *
                1532 *
06A5            1533 DIT    DICTIONARY INDEX TABLE
                1534 *
06A5 0000       1535        DC      HL2'0000'      A
06A7 02C1       1536        DC      HL2'02C1'      B
06A9 06F3       1537        DC      HL2'06F3'      C
06AB 0C1E       1538        DC      HL2'0C1E'      D
06AD 0F3E       1539        DC      HL2'0F3E'      E
06AF 1107       1540        DC      HL2'1107'      F
06B1 1431       1541        DC      HL2'1431'      G
06B3 15D5       1542        DC      HL2'15D5'      H
06B5 1A36       1543        DC      HL2'1A36'      I
06B7 1D09       1544        DC      HL2'1D09'      J
06B9 1D54       1545        DC      HL2'1D54'      K
06BB 1D98       1546        DC      HL2'1D98'      L
06BD 2021       1547        DC      HL2'2021'      M
06BF 22EE       1548        DC      HL2'22EE'      N
06C1 24F7       1549        DC      HL2'24F7'      O
06C3 2648       1550        DC      HL2'2648'      P
06C5 298C       1551        DC      HL2'298C'      Q
06C7 29CB       1552        DC      HL2'29CB'      R
06C9 2C90       1553        DC      HL2'2C90'      S
06CB 350C       1554        DC      HL2'350C'      T
06CD 3A30       1555        DC      HL2'3A30'      U
06CF 3AFC       1556        DC      HL2'3AFC'      V
06D1 3B88       1557        DC      HL2'3B88'      W
06D3 3F81       1558        DC      HL2'3F81'      X
06D5 3F81       1559        DC      HL2'3F81'      Y
06D7 3FE3       1560        DC      HL2'3FE3'      Z
```

|  |  |  |  |  |  |
|---|---|---|---|---|---|
|  | 1561 |  | $TITLE ('MESSAGES') |  |  |
|  | 1562 | * |  |  |  |
| 06D9 BA51 | 1563 | MESS3 | DC | HL2'BA51' | EN |
| 06DB B983 | 1564 |  | DC | HL2'B983' | GL |
| 06DD B6AC | 1565 |  | DC | HL2'B6AC' | IS |
| 06DF B7DF | 1566 |  | DC | HL2'B7DF' | H- |
| 06E1 DFAA | 1567 |  | DC | HL2'DFAA' | -S |
| 06E3 AFEE | 1568 |  | DC | HL2'AFEE' | PA |
| 06E5 B186 | 1569 |  | DC | HL2'B186' | NI |
| 06E7 AC87 | 1570 |  | DC | HL2'AC87' | SH |
| 06E9 ACAF | 1571 | MESS4 | DC | HL2'ACAF' | SP |
| 06EB BEB1 | 1572 |  | DC | HL2'BEB1' | AN |
| 06ED B6AC | 1573 |  | DC | HL2'B6AC' | IS |
| 06EF B7DF | 1574 |  | DC | HL2'B7DF' | H- |
| 06F1 DFAA | 1575 |  | DC | HL2'DFAA' | -E |
| 06F3 B1B3 | 1576 |  | DC | HL2'B1B3' | NG |
| 06F5 B386 | 1577 |  | DC | HL2'B386' | LI |
| 06F7 AC87 | 1578 |  | DC | HL2'AC87' | SH |
|  | 1579 | * |  |  |  |
|  | 1580 | * |  |  |  |
|  | 1581 | * |  |  |  |
| 06F9 | 1582 | PROMO* |  |  |  |
|  | 1583 | * |  |  |  |
| 06F9 4920414D | 1584 |  | DC | C'I AM T' |  |
| 06FD 2054 | 1585 |  |  |  |  |
| 06FF 4845204C | 1586 |  | DC | C'HE LEX' |  |
| 0703 4558 | 1587 |  |  |  |  |
| 0705 49434F4E | 1588 |  | DC | C'ICON L' |  |
| 0709 204C | 1589 |  |  |  |  |
| 070B 49333030 | 1590 |  | DC | C'I3000 ' |  |
| 070F 3020 | 1591 |  |  |  |  |
| 0711 57495448 | 1592 |  | DC | C'WITH ' |  |
| 0715 20 | 1593 |  |  |  |  |
| 0716 54484520 | 1594 |  | DC | C'THE EN' |  |
| 071A 454E | 1595 |  |  |  |  |
| 071C 47 | 1596 |  | DC | C'G' |  |
| 071D 4C495348 | 1597 |  | DC | C'LISH-S' |  |
| 0721 2D53 | 1598 |  |  |  |  |
| 0723 5041454E | 1599 |  | DC | C'PANISH' |  |
| 0727 5348 | 1600 |  |  |  |  |
| 0729 20545241 | 1601 |  | DC | C' TRANS' |  |
| 072D 4E53 | 1602 |  |  |  |  |
| 072F 4C415449 | 1603 |  | DC | C'LATION' |  |
| 0733 4F4E | 1604 |  |  |  |  |
| 0735 20434152 | 1605 |  | DC | C' CARTR' |  |
| 0739 5452 | 1606 |  |  |  |  |
| 073B 49444745 | 1607 |  | DC | C'IDGE  ' |  |
| 073F 2E20 | 1608 |  |  |  |  |
| 0741 20492043 | 1609 |  | DC | C' I CON' |  |
| 0745 4F4E | 1610 |  |  |  |  |
| 0747 5441494E | 1611 |  | DC | C'TAIN O' |  |
| 074B 204F | 1612 |  |  |  |  |
| 074D 56455220 | 1613 |  | DC | C'VER 22' |  |
| 0751 3232 | 1614 |  |  |  |  |
| 0753 30302045 | 1615 |  | DC | C'00 ENG' |  |
| 0757 4E47 | 1616 |  |  |  |  |
| 0759 4C495348 | 1617 |  | DC | C'LISH A' |  |
| 075D 2041 | 1618 |  |  |  |  |
| 075F 4E442053 | 1619 |  | DC | C'ND SPA' |  |
| 0763 5041 | 1620 |  |  |  |  |
| 0765 4E495348 | 1621 |  | DC | C'NISH T' |  |
| 0769 2054 | 1622 |  |  |  |  |
| 076B 52414E53 | 1623 |  | DC | C'RANSLA' |  |
| 076F 4C41 | 1624 |  |  |  |  |
| 0771 54494F4E | 1625 |  | DC | C'TIONS ' |  |
| 0775 532E | 1626 |  |  |  |  |

```
0777 202A20   1627      DC      C' * '
077A 594F2053 1628      DC      C'YO SOY'
077E 4F59     1629
0780 204C4558 1630      DC      C' LEXIC'
0784 4943     1631
0786 4F4E204C 1632      DC      C'ON LK3'
078A 4B33     1633
078C 30303020 1634      DC      C'000 CO'
0790 434F     1635
0792 4E205355 1636      DC      C'N SU C'
0796 2043     1637
0798 41525455 1638      DC      C'ARTUCH'
079C 4348     1639
079E 4F204445 1640      DC      C'O DE T'
07A2 2054     1641
07A4 52414455 1642      DC      C'RADUCC'
07A8 4342     1643
07AA 494F4E45 1644      DC      C'IONES '
07AE 5320     1645
07B0 454E2049 1646      DC      C'EN IN'
07B4 4E47     1647
07B6 4C45532F 1648      DC      C'LES/ES'
07BA 4553     1649
07BC 50414E4F 1650      DC      C'PANOL '
07C0 4C2E     1651
07C2 2043454E 1652      DC      C' CONTE'
07C6 5445     1653
07C8 4E49454E 1654      DC      C'NIEND0'
07CC 444F     1655
07CE 20323230 1656      DC      C' 2290 '
07D2 3020     1657
07D4 54524144 1658      DC      C'TRADUC'
07D8 5543     1659
07DA 43494F4E 1660      DC      C'CIONES'
07DE 4553     1661
07E0 20454E20 1662      DC      C' EN IN'
07E4 494E     1663
07E6 474C4553 1664      DC      C'GLES Y'
07EA 2059     1665
07EC 20455350 1666      DC      C' ESPAN'
07F0 414E     1667
07F2 4F4C20   1668      DC      C'OL '
07F5 2A20     1669      DC      C'* '
07F7 00       1670      DC      H'0'
07F8          1671      END

ASSEMBLY COMPLETE    0 ERRORS
```

```
ACTIV 00070H  CILOO 00152H  CLDIS 00122H  CLILU 00125H  CLIMA 0014DH  CLNOR 00150H  COMPL 0045FH  COPLU 00138H
COPY  00134H  CXLOO 00167H  DELAY 00416H  DISPL 00163H  DIT   005A5H  DNEND 001EFH  DNLOO 001DCH  DWORD 00189H
DWSCR 00105H  ERSP  00365H  EQVAL 00285H  FIND1 00517H  FINDX 003E8H  FLASH 002EEH  FLNEX 002FFH  GETAD 001F0H
GETKE 00117H  GETRO 00259H  GREXT 00274H  GROET 00291H  GROOD 002A2H  GROOT 002E6H  GROXA 002E8H  HL    00008H
HJ    00200H  IX    0006CH  I/D   0006EH  IXI   00060H  KBS   0043FH  KBTBL 00088H  KF1   004E6H  KFCON 00401H
KFLOO 00477H  KFULL 004E3H  KFUNA 00474H  KFUNC 0046FH  KOTRA 00562H  KOUER 0054EH  KSEOP 00542H  KSO   004FCH
KSONO 0051FH  KSQUP 004F5H  KSTCO 004A6H  KSTEP 00490H  KSTRA 00525H  KXLAT 00572H  KXOCO 005C0H  KXOLD 00586H
IOO   005A0H  IOSCO 0059AH  IOSER 0058DH  IOSSR 005D4H  MAIN  00201H  MAIN2 00330H  MAINX 00459H  MAINY 0045CH
MCHEC 0041FH  MOON  0020EH  MCT   0067FH  MESS1 00068H  MESS2 0006BH  MESS3 00609H  MESS4 006E9H  MESS5 008FBH
MESSA 001A7H  MK1   0043FH  MK2   0040CH  MKC2   0030AH  MKC3   00302H  MKC4   003F3H  MKC5   003EEH  MKC6   003E2H
MKC7   003BEH  MKCON 003CAH  MKEY1 00386H  MKO   00426H  MKOCO 00431H  MLOOP 001B3H  NEWKE 0055FH  NEWSC 00355H
NEXTE 00644H  NEXTH 00621H  NKCO  0050CH  NKC1  00957H  NKC2  00851H  NKC3  0004BH  NOMAT 0062AH  NOTFN 004F0H
NOSCA 00636H  PROND 006F9H  RESTR 00945H  RLOOP 00192H  ROHAD 00225H  ROHEX 00695H  ROMTT 0068SH  ROTAT 0018FH
RREXI 00255H  RROM  0023AH  SAVFN 0020FH  SBACK 00605H  SBSCR 00610H  SCROL 0031AH  SEARC 005D9H  SEOP  00370H
SEXIT 0060SH  SFORD 005F8H  SHIFT 0017BH  SLANG 0235FH  SLOOP 0017CH  SM1   00659H  SM2   00668H  SMATC 0064BH
SREXI 0066CH  SOK   00676H  SP1   001F5H  SPXX  0020EH  SORY  00660H  SSBAC 002CAH  SSCAN 00364H  SSETU 002A8H
START 00089H  SW1   00338H  SXXX  00665H  ZEROO 00088H  ZONIT 0016CH  ZOXIT 0178H   ZX    00096H
```

SYMBOL LISTING COMPLETE

Other capabilities such as a digital clock and a calendar or providing a game, can of course, be incorporated without departing from the scope of the invention. Many other changes and modifications in the above-described embodiment of the invention can, of course, be carried out without departing from the scope thereof. Accordingly, that scope is intended to be limited only by the scope of the appended claims.

What is claimed is:

1. An information storage and retrieval apparatus comprising:
    a hand-held housing comprising:
        a plurality of display means disposed on said housing, each for displaying an alpha-numeric character, and
        a keyboard on said housing and having a plurality of keys each associated with an alpha-numeric character or command for entering a sequence of alpha-numeric characters and commands, and producing command signals and sequences of character signals, each character signal identifying a character;
    memory means for storing characters entered by said keyboard; and
    a plug-in module removably, mechanically, and electrically connected with said hand-held housing, said plug-in module comprising:
        a central processor within said plug-in module connected to said display means and to said keys for searching said keyboard and causing the storage and display of entered and stored characters,
        at least a first read/only memory (ROM) within said plug-in module connected to said central processor for storing a plurality of pairs of sequences of alpha-numeric characters,
        said processor including means responsive to first and second given commands entered by said keyboard, for searching said first ROM to compare, one pair after another, one sequence of each pair with the sequence entered by said keyboard following entry of said first given command until a match is made, and for causing, subsequent to a match, the matching pairs of sequences to be displayed, the character in each said display varying in time without any manual operation of said keyboard so that the number of characters in said matching pairs can exceed the number of said display means, searching and causing means searching, following entry of said second given command, to compare said other sequence of each pair with said entered sequence until a match is made and causing said matching pairs of sequences to be displayed,
        a second read/only memory (ROM) within said plug-in module and connected to said processor for storing instructions for searching said first ROM and causing said pair of sequences to be displayed, and searching said keyboard, and
        said plug-in module permitting change of said pairs of sequences.

2. An apparatus as in claim 1 wherein:
    said searching and causing means causes the sequences of said matching pairs that were searched to be displayed prior to the display of the sequences of said matching pairs that were not searched; and
    said apparatus further comprises a read/write memory connected to each of said display means, said central processor and said second read/only memory for storing at least each character being currently displayed.

3. An apparatus storage and retrieval information comprising:
    a hand-held unit comprising:
        a plurality of display means disposed on said unit, each for displaying an alpha-numeric character, and
        a keyboard on said unit and having a plurality of keys associated with an alpha-numeric character or command for entering a sequence of alpha-numeric characters and commands, and producing command signals and sequences of character signals, each character signal identifying a character;
    read/write memory means for storing at least each character being currently displayed and each character entered by said keyboard; and
    a plug-in module, removably, mechanically, and electrically connected to said hand-held unit, said plug-in module comprising:
        a central processor connected to said read/write memory means, to said display means and to said keys for searching said keyboard and causing storage and the display of entered and stored characters,
        at least a first read/only memory (ROM) removably connected to said central processor for storing a plurality of sequences of pairs of alpha-numeric characters,
        said processor including means responsive to first and second given commands entered by said keyboard, for searching said first ROM to compare, one sequence of each pair of sequences with a sequence entered by said keyboard following entry of said first given command until a match is made, and for causing, subsequent to a match, the matching pairs of sequences to be displayed with said one sequence preceding the other sequence in said matching pairs, the character in each said display means varying in time so that the number of characters in said matching pairs can exceed the number of said display means, said searching and causing means searching, following entry of said second given command, to compare said other sequence of each pair with said entered sequence until a match is made and causing said matching pairs of sequences to be displayed with said other sequences preceding said one sequences,
        a second read/only memory (ROM) within said plug-in module and connected to said read/only memory and said processor for storing instructions for searching said first ROM and causing said pair of sequences to be displayed, storing in said read/write memory, and searching said keyboard, and
        said plug-in module permitting change of said pairs of sequences.

4. An apparatus as in claim 1 or 3 wherein: said memory means is a random access memory (RAM) having a plurality of first storage locations each storing a character being currently displayed, each storage location being associated with one of said plurality means; and said apparatus further comprises a further memory means having a plurality of second storage locations each storing the location in said first ROM of one of said pairs of sequences, said second ROM including display instructions for changing characters stored in said first location to sequentially substitute characters from the ROM location stored in said second locations following entry of said first given command.

5. An apparatus as in claim 4 wherein said display instructions include instructions for periodically shifting the character of each said first storage location to another location, except for the one character that has been stored for the longest time, which one character is removed from storage, and placing a character from said first ROM in the location which did not receive a shifted character so as to roll the pair of sequences through said display means.

6. An apparatus as in claim 5 wherein entry of a given character after a clear command and before any other commands shifts each of the other characters entered after said clear command to another of said first locations.

7. An apparatus as in claim 5 wherein said display instructions include instructions for placing characters from each of said one sequences at the locations of said first ROM stored at said second locations in said first locations and then placing characters from each of said other sequences at the locations in said first ROM stored at said second locations so that each of the words entered into said keyboard are displayed one after another followed by the corresponding sequences in said first ROM.

8. An apparatus as in claim 5 wherein said central processor includes means for producing a periodic interrupt signal, and a counter responsive to said interrupt signal to initiate said periodic shifting of display characters.

9. An apparatus as in claim 8 wherein said second ROM includes instructions for checking a row of keyboard keys associated with a count in said counter.

10. An apparatus as in claim 1 or 3 wherein each said display means includes a sixteen segment LED display.

11. An apparatus as in claim 1 or 3 wherein said second ROM and processor are formed on a semi-conductor chip.

12. An apparatus as in claim 1 or 3 wherein said first ROM stores an initial message and said instructions in said second ROM cause the display of said message each time a clear command is entered and each time the apparatus becomes operative.

* * * * *